(12) United States Patent
Nishikawa et al.

(10) Patent No.: US 8,540,431 B2
(45) Date of Patent: Sep. 24, 2013

(54) SENSOR-EQUIPPED BEARING FOR WHEEL

(75) Inventors: Kentarou Nishikawa, Iwata (JP); Toru Takahashi, Iwata (JP); Takayuki Norimatsu, Iwata (JP); Kentaro Ikki, Iwata (JP)

(73) Assignee: NTN Corporation, Osaka (JP)

( * ) Notice: Subject to any disclaimer, the term of this patent is extended or adjusted under 35 U.S.C. 154(b) by 98 days.

(21) Appl. No.: 13/138,712

(22) PCT Filed: Mar. 18, 2010

(86) PCT No.: PCT/JP2010/054685
§ 371 (c)(1),
(2), (4) Date: Sep. 21, 2011

(87) PCT Pub. No.: WO2010/110173
PCT Pub. Date: Sep. 30, 2010

(65) Prior Publication Data
US 2012/0014632 A1    Jan. 19, 2012

(30) Foreign Application Priority Data

Mar. 26, 2009  (JP) ................................ 2009-076762
Apr. 1, 2009   (JP) ................................ 2009-089042
Apr. 8, 2009   (JP) ................................ 2009-093581
Apr. 8, 2009   (JP) ................................ 2009-093582
Jul. 13, 2009  (JP) ................................ 2009-164474

(51) Int. Cl.
*F16C 41/00*   (2006.01)
*F16C 32/00*   (2006.01)
*G01L 3/24*    (2006.01)

(52) U.S. Cl.
USPC ....... 384/448; 384/544; 73/862.322; 324/173

(58) Field of Classification Search
USPC .................. 384/448, 544, 586, 589; 73/115,
73/7, 862.041, 862.05, 862.322; 701/34.4;
702/42; 324/76.13
See application file for complete search history.

(56) References Cited

U.S. PATENT DOCUMENTS 6,634,208 B2 * 10/2003 Salou et al. ................. 73/11.07
6,920,801 B2    7/2005 Van Leeuwen et al.
(Continued)

FOREIGN PATENT DOCUMENTS

CN    1488072    4/2004
CN    1748091    3/2006
(Continued)

OTHER PUBLICATIONS

International Preliminary Report on Patentability mailed Oct. 27, 2011 issued in corresponding International Application No. PCT/JP2010/054685.

(Continued)

*Primary Examiner* — Marcus Charles

(57) ABSTRACT

A sensor-equipped wheel support bearing assembly includes a sensor unit provided in an outer member, which serves as a stationary member. The sensor unit has a strain generator and a sensor for detecting a strain occurring in the generator. A principal load estimator estimates the load acting on the wheel, with the use of an average value of a signal from the sensor, and an amplitude processed load estimator estimates the load, using amplitude of a signal wave outputted from the sensor, resulting from passage of rolling elements. A drift amount estimator estimates a drift amount of an estimated load output utilizing the average value and the amplitude, which is used to correct the estimated load.

10 Claims, 47 Drawing Sheets

(56) References Cited

U.S. PATENT DOCUMENTS

| | | |
|---|---|---|
| 7,216,551 B2 | 5/2007 | Koyagi et al. |
| 8,167,499 B2 | 5/2012 | Taniguchi et al. |
| 2004/0261543 A1 | 12/2004 | Van Leeuwen et al. |
| 2006/0061352 A1 | 3/2006 | Koyagi et al. |
| 2006/0278022 A1 | 12/2006 | Ono |
| 2008/0273823 A1 | 11/2008 | Taniguchi et al. |
| 2009/0097791 A1* | 4/2009 | Ozaki et al. .................. 384/448 |
| 2010/0129016 A1 | 5/2010 | Isobe et al. |
| 2010/0202718 A1 | 8/2010 | Isobe et al. |
| 2010/0262383 A1 | 10/2010 | Isobe et al. |

FOREIGN PATENT DOCUMENTS

| | | | |
|---|---|---|---|
| JP | 2003-530565 | | 10/2003 |
| JP | 2005048823 A | * | 2/2005 |
| JP | 2005-331496 | | 12/2005 |
| JP | 2007057299 A | * | 3/2007 |
| JP | 2007064778 A | * | 3/2007 |
| JP | 2007-271005 | | 10/2007 |
| JP | 2008-275507 | | 11/2008 |
| JP | 2008-542735 | | 11/2008 |
| JP | 2009-1201 | | 1/2009 |
| JP | 2010-43901 | | 2/2010 |
| WO | 01/77634 A2 | | 10/2001 |
| WO | 2006/128878 A1 | | 12/2006 |
| WO | 2008/093491 A1 | | 8/2008 |
| WO | 2008/096525 A1 | | 8/2008 |
| WO | 2009/037823 A1 | | 3/2009 |
| WO | 2009/016829 A1 | | 5/2009 |
| WO | 2009/069272 A1 | | 6/2009 |

OTHER PUBLICATIONS

International Search Report for PCT/JP2010/054685, mailed Jun. 22, 2010.

Chinese Office Action issued Dec. 5, 2012 in corresponding Chinese Patent Application No. 201080013931.5.

Japanese Office Action mailed May 7, 2013 for corresponding Japanese Application No. 2009-164474.

Japanese Decision of Grant mailed May 7, 2013 for corresponding Japanese Application No. 2009-093582.

* cited by examiner

SENSOR-EQUIPPED BEARING FOR WHEEL

CROSS REFERENCE TO RELATED APPLICATIONS

This application claims the benefit under 35 U.S.C. Section 371, of PCT International Application No. PCT/JP2010/054685, filed Mar. 18, 2010, which claimed priority to Japanese Application Nos. 2009-076762, filed Mar. 26, 2009; Japanese patent application No. 2009-089042, filed Apr. 1, 2009; Japanese patent application No. 2009-093581, filed Apr. 8, 2009; Japanese patent application No. 2009-093582, filed Apr. 8, 2009; and Japanese patent application No. 2009-164474, filed Jul. 13, 2009, in the Japanese Patent Office, the disclosures of which are hereby incorporated by reference.

BACKGROUND OF THE INVENTION

1. Field of the Invention

The present invention relates to a sensor equipped wheel support bearing assembly having a load sensor built therein for detecting a load acting on a bearing unit of a vehicle wheel.

2. Description of Related Art

As a technique for detecting a load imposed on each of vehicle wheels of an automotive vehicle, a wheel support bearing assembly has been suggested, in which a strain gauge is pasted to an outer ring flange of the wheel support bearing assembly for detecting a strain. (See, for example, the patent document 1 listed below.) A calculating method of estimating the load acting on a vehicle wheel from output signals of a plurality of strain sensors provided in the vehicle wheel has also been suggested. (See, for example, the patent document 2 listed below.)

[Patent Document 1] JP Published Int'l Application No. 2003-530565

[Patent Document 2] JP Published Int'l Application No. 2008-542735

SUMMARY OF THE INVENTION

Where the load acting on the vehicle wheel with the use of a strain sensor is to be measured such as taught in the patent documents 1 and 2 listed above, not only a temperature dependent characteristic of the strain sensor itself but also a temperature induced strain of an object to be measured tend to affect the output signal of the strain sensor and, therefore, a drift occurs in such output signal.

In such case, it is possible to reduce the error in the output signal to a certain extent when the output signal is compensated with temperature. FIG. 46 illustrates a block diagram showing a schematic structure of a suggested example of a load estimating section that is applicable where the load is desired to be estimated by correcting the output signal of the strain sensor, provided in an outer ring of the wheel support bearing assembly, with a detection signal of a temperature sensor.

According to the suggested example referred to above, the amplitude value of the output signal of the strain sensor 70 is calculated by an amplitude value calculator 72 and the average value of the output signal of the strain sensor 70 is calculated by an average value calculator 73. Since the output signal of the strain sensor 70 represents a waveform approximate to that of the sinusoidal wave under the influence of rolling elements moving in the vicinity of a strain sensor installation site in the bearing outer ring, the amplitude value calculator 72 determines the amplitude value (alternating current component) of such sinusoidal wave and the average value calculator 73 determines the average value (direct current component) of such sinusoidal wave. A temperature dependent drift contained in the average value so determined is corrected by a compensating section 74 using an output signal of a temperature sensor 71 which detects the temperature prevailing in the vicinity of, for example, the strain sensor 70. Using the average value so corrected and the amplitude value determined by the amplitude value calculator 72, the load acting on the vehicle wheel is estimated by a load estimator 75. In the load estimator 75, using the amplitude value and the corrected average value as respective variables, the load is estimated according to a linear equation formed by multiplying a predetermined correction coefficient by those variables.

Even the suggested example discussed above has been found involving such a problem that where a plurality of strain sensors are installed, a temperature sensor comes to be required in the vicinity of each of those strain sensors and, accordingly, the space for installation, the space for wiring and the cost tend to increase.

Also, considering that the wheel support bearing assembly is used in service for a prolonged period of time and is apt to be subjected to a considerable vibration and an impact load, change in condition of installation of the strain sensors, for example, in a bonding condition may possibly result in generation of a drift in output signals.

As discussed above, once the drift occurs in the output signals of the strain sensors, an error in the result of load calculation will become large and the accurate detection of the load will be no longer accomplished.

An object of the present invention is to provide a sensor equipped wheel support bearing assembly of a type in which a drift component that cannot be remedied with the temperature correction can be corrected and the load acting on the vehicle wheel can be accurately estimated without accompanying an undesirable reduction in detecting accuracy even though the ambient changes and/or the bearing assembly is used in service for a prolonged period of time.

To describe a sensor equipped wheel support bearing assembly of the present invention with the aid of reference numerals used in the drawings to facilitate an easy understanding thereof, the sensor equipped wheel support bearing assembly of the present invention is a wheel support bearing assembly for rotatably supporting a vehicle wheel. The bearing assembly includes an outer member 1 having its inner periphery formed with a plurality of rolling surfaces 3, an inner member 2 having an outer periphery formed with rolling surfaces 4 held in face-to-face relation with the respective rolling surfaces 3, and a plurality of rows of rolling elements 5 interposed between the rolling surfaces 3 in the outer member 1 and the rolling surfaces 4 in the inner member 2. The bearing assembly also includes a sensor unit 20 for detecting a load acting on one of the outer member 1 and the inner member 2 that serves as a stationary member. The sensor unit 20 includes a strain generating member 21, which has two or more contact fixing segment 21a adapted to be fixed to the stationary member, and one or more sensors 22 fitted to the strain generating member 21 for detecting a strain induced in the strain generating member 21. The bearing assembly further includes a load estimation processing section 30 of the following construction for estimating the load, acting on the vehicle wheel, from an output signal of the sensor unit 20.

The load estimation processing section 30 includes a principal load estimating section 31 for estimating the load, acting on the vehicle wheel, the principal load estimating section 31 having an average value calculating section 32 for calculating an average value of an output signal of the sensor 22 of the sensor unit 20 and being operable to correct the average value, which has been calculated by the average value calculating section 32, by means of a correcting section 33; an amplitude processed load estimating section 36 for calculating an amplitude processed load estimated value s2, which corresponds to the load acting on the vehicle wheel, from an amplitude value of a signal waveform of the output signal of the sensor 22, which is caused by passage of the rolling elements; and a drift amount estimating section 37 for estimating a drift amount of the output signal of the sensor 22 appearing in an estimated load output s1, by comparing the estimated load output s1, which is a value estimated by the principal load estimating section 31, and the amplitude processed load estimated value s2 with each other. The correcting section 33 of the principal load estimating section 31 is operable to correct a load estimated output with the drift amount estimated by the drift amount estimating section 37.

When the load acts between a tire of the vehicle wheel and a road surface, such load is also transmitted to the stationary member (for example, the outer member 1) of the wheel support bearing assembly, resulting in deformation. Since in the present invention, the two or more contact fixing segments 21a of the strain member 21 of the sensor unit 20 are fixed to the outer member 1, such strain in deformation is detected by the sensor 22 with a high sensitivity.

The principal load estimating section 31 estimates the load acting on the vehicle wheel, by determining the average value of the strain, induced in the strain generating member 21 and detected by the sensor 22 in the manner described above, and then correct such average value with the correcting section 33. Since the strain, detected by the sensor 22, and the load acting on the vehicle wheel has a certain relation, if such relation is determined beforehand, the load acting on the vehicle wheel can be estimated. The strain detected by the sensor 22 represents a vibration waveform which becomes large each time the rolling elements 5 move in the vicinity of the sensor 22, but if the average value due to be a direct current component thereof is determined, the value of the strain not affected by the passage of the rolling elements 5 can be obtained. The load of the automotive vehicle so estimated from the average value in the way as described above accompanies a phenomenon of a drift caused by a temperature dependent characteristic of the strain sensor itself as well as by a temperature strain of the strain generating member 21 or the like and/or a change of a condition of installation such as, for example, a condition in which the sensor 22 is held in tight contact during a prolonged time of use.

However, in the present invention, the amount of drift of the output signal of the sensor 22 appearing in the estimated load output s1 is estimated by calculating the amplitude processed load estimated value, which corresponds to the load acting on the vehicle wheel, from the amplitude value of the signal waveform of the output signal of the sensor 22, resulting from the passage of the rolling elements, by means of the amplitude processed load estimating section 36 and then comparing the estimated load output s1 of the principal load estimating section 31 and the amplitude processed load estimated value s2 with each other by means of the drift amount estimating section 37. The drift amount so estimated as described above is fed back to the principal load estimating section 31 and the average value is then corrected by the correcting section 33.

Since the amplitude value referred to above change in dependence on the load acting on the bearing unit, the load acting on the vehicle wheel can be estimated also from the amplitude value. Also, the amplitude signal which has detected a local strain is less sensitive to the influence of temperature or the like, the use of the amplitude processed load estimated value s2 makes it possible to estimate the drift amount which is a drift component of the estimated load output s1 utilizing the average value. Since the drift amount is estimated for correction in this manner, any error occurring in the estimated load output s1 is reduced and the accurate load can be detected.

In the present invention, the principal load estimating section 31 referred to above may include a combined use estimating section 34 for calculating the estimated load output with the use of both of the average value, which has been corrected by the correcting section 33, of the output signal of the sensor 22, and the amplitude value of the output signal of the sensor 22. For example, each of the average value after the correction and the amplitude value is multiplied by a suitable coefficient, which will become a weight, and the sum of those two values is rendered to be the estimated load output s1.

When both of the average value and the amplitude value are utilized, the load acting on the vehicle wheel can be calculated further accurately. The drift amount estimating section 37 referred to above estimates the drift amount in the estimated load output s1, which has been calculated with the utilization of both of the average value and the amplitude value as described above, and then feed the drift amount back to enable the correcting section 33 to perform the correction.

In the present invention, the sensor unit 20 may be provided in three or more, in which case the load estimation processing section 30 estimates a forward and rearward oriented load Fx, a vertically oriented load Fz and an axially oriented load Fy of the load acting on the vehicle wheel, from respective output signals of the sensors 22 in the three or more sensor units 20. The sensor 22 in each of the sensor units 20 has a component of the load acting in the forward and rearward direction and the vertical direction, both of which will become a radial direction of the wheel support bearing assembly, and the axial direction, in dependence on, for example, the position of installation of the sensor unit 20. For this reason, if for each of the sensors 22, whether or not the use is made in estimation of the load in each of those directions and a coefficient to be used in estimation of the load in each of those directions when the use is made is suitably determined, the estimation of the forward and rearward acting load, the vertically acting load and the axially acting load can be accomplished. The coefficient referred to above can be determined as a suitable value by means of, for example, experiments.

In the present invention, the sensor unit 20 may be disposed at each of upper, lower, right and left surface portions of an outer diametric surface of the stationary member, which correspond respectively to top, bottom, right and left positions relative to a tire tread.

Positioning of the four sensor units 20 in the manner described above is effective to estimate the vertically oriented load Fz, the load Fx which will become the driving force or the braking force, and the axially oriented load Fy, which loads act on the wheel support bearing assembly.

In the present invention, at least one of the sensor units 20 may be provided with a temperature sensor 28, in which case the principal load estimating section 31 includes a temperature correcting section 33A for correcting the average value, which has been calculated by the average value calculating section 32 and is to be inputted to the correcting section 33, with a temperature detected by the temperature sensor 28. Correction by the temperature correcting section 33A can be accomplished if coefficients and calculating equations appropriate to the temperature are determined beforehand.

In the case of the above described construction, since after the average value has been temperature corrected, the correction is carried out by the correcting section 33 with the use of the drift amount estimated value given by the drift amount estimating section 37, the further accurate estimated load output s1 can be obtained. Also, since the estimated load output s1, obtained by performing the temperature correction, and the amplitude processed load estimated value s2 are compared with each other to estimate the drift amount, the estimation of the most accurate drift amount can be performed by the drift amount estimating section 37. In addition, the temperature dependent drift of the output signal of the strain sensor 22 can be corrected with no need to use any temperature sensor 28 in all of the strain detecting sensors 22.

In the present invention, the sensor unit 30 may include three or more contact fixing segments 21a and two sensors 22 for detecting the strain induced in the strain generating member 21, one of the sensors 22 being fitted between the neighboring first and second contact fixing segments 21a and the other of the sensors 22 being fitted between the neighboring second and third contact fixing segments 21a, and in which the distance between the neighboring contact fixing segments 21a or the distance between the neighboring sensors 22 in a circumferential direction of the stationary member is chosen to be a multiplication of [½+n], n being an integer, and the average value calculating section 32 of the principal load estimating section 31 utilizes the sum of respective output signals of the two sensors 22 as an average value.

In the case of the above described construction, the respective output signals of the two sensors 22 have a phase difference of about 180° and the average value thereof will be a value from which a component of change brought about by passage of the rolling elements 5 has been cancelled. Also, the amplitude value will become accurate with the influence of temperature and the influence of a surface slippage between the knuckle and the flange surface having been removed.

In the present invention, the drift amount estimating section 37 may determine a relation between an amplitude processed load estimated value s2, which is outputted by the amplitude processed load estimating section 36, and an estimated load output s1, which is outputted by the principal load estimating section 31, by applying a least square estimation and then estimates the drift amount of the estimated load output s1 from this relation.

While there is a limit on the accuracy of the load estimation value relying on only the amplitude, if the load condition is limited, the correspondence relation between the amplitude processed load estimated value s2 and the estimated load output s1, comprised of the average value mainly, will represent a linear relation with a good accuracy. For this reason, with respect to the amplitude processed load estimated value s2 and the estimated load output s1 utilizing the average value, when such relation is determined by the application of the least square estimation, the drift amount of the estimated load output s1 relying on the average value can be accurately determined.

Where the drift amount estimating section 37 of the kind capable of applying the least square estimation is employed, it is recommended to use a load condition limiting section 37a for determining from an output signal of one or more sensors provided in a vehicle body, that is, a vehicle mounted sensor 29 as to whether or not a condition of the load acting on the bearing unit during travel of the automotive vehicle satisfies a preset load condition, and extracting in accordance with a preset extracting condition, an amplitude processed load estimated value s2, which the drift amount estimating section 37 utilized in an estimating process of a drift amount, out from amplitude processed load estimated values s2 outputted by the amplitude processed load estimating section 36 in the event that the condition of the load acting on the bearing unit fails to satisfy the preset load condition. For the vehicle mounted sensors 29, G sensors (acceleration sensors), yaw rate sensors, throttle sensors, or ABS sensors (rotational speed detecting sensors used in the anti-lock brake system) can be employed.

Determination of the load condition during the travel by the load condition limiting section 37a is preferably performed to comprehensively determine with the concurrent use of various sensor signals as described above. This comprehensive determination may be carried out, for example, to limit a preset allowable range for each of the outputs of the individual vehicle mounted sensors and then to determine whether or not all fall within such range, or to determine a value obtainable by combining respective signals of the plural vehicle mounted sensors 29 according to a predetermined processing and then to compare such value with the preset allowable range. Also, the preset extracting condition of the load condition limiting section 37a may be determined suitably by, for example, extracting only the amplitude processed load estimated value s2 which has been outputted while the preset load condition is satisfied.

In the event of occurrence of an abrupt change of the load, for example, collision with a curb stone or an abrupt temperature change, a signal of the sensor output will be possibly drifted. The amount of such drift is estimated by comparing the output s1 of the principal estimating section and the amplitude processed load estimated value s2, but in order to accomplish this estimation further accurately, it is necessary to limit the input load condition in order for the correspondence relation between s1 and s2 to represent a linear relation. With the limiting function, the estimating accuracy of the drift amount increases and the detection error can be suppressed by accurately correcting the signal drift. The drift amount so detected is fed back to the load calculating estimation process and, therefore, the error of the detected load can be suppressed.

In the present invention, the load estimation processing section 30 may be connected with an intra-vehicle communication bus so that the drift amount estimated by the drift component estimating section 37 and the estimated load output s1 from the principal load estimating section 31 can be outputted through an intra-vehicle communication bus to an external monitor 38 to allow the drift amount or the like to be monitored with such external monitor.

In this case, it is recommended that the load estimation processing section 30 may be connected with a vehicle mounted input device 39 through the intra-vehicle communication bus, so that the load estimation processing section 30 can respond to an input from the input device 39 to enable the drift amount estimating section 37 to set parameters to be used in calculation in estimating the load acting on the vehicle wheel, including estimation of the drift amount by the drift amount estimating section 37. Thereby, in the event of any change in the sensor signal as a result of repair and/or replacement of component parts, update can be made to a proper drift amount through the intra-vehicle communication bus.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A first embodiment of the present invention will be hereinafter described in detail with particular reference to FIGS. 1 to 8. This first embodiment is directed to an inner ring rotating model of a third generation type and is applied to a wheel support bearing assembly for the support of a vehicle drive wheel. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

Figure 1:
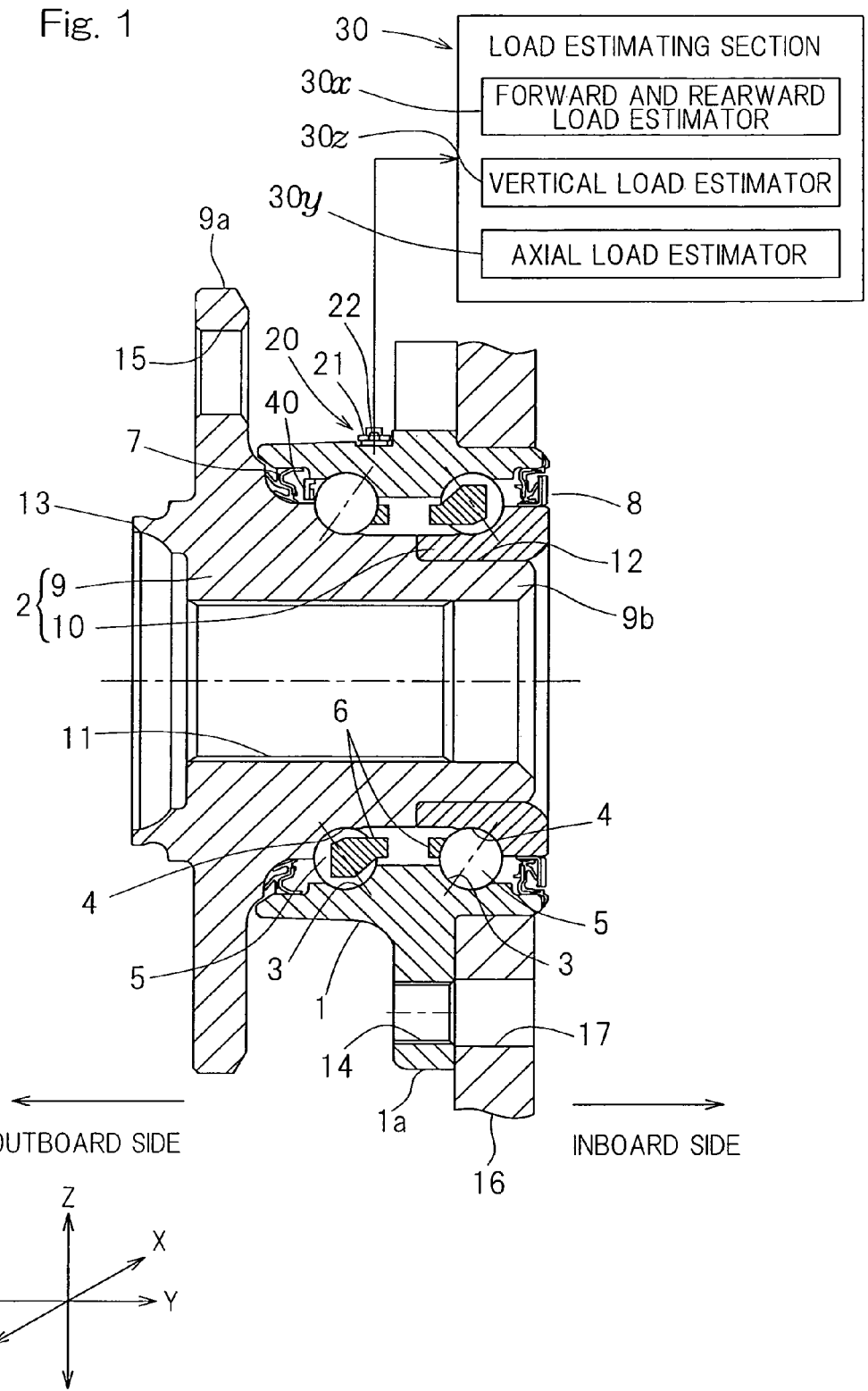
FIG. 1 is a diagram showing a sectional view of a sensor equipped wheel support bearing assembly according to a first preferred embodiment of the present invention, shown together with a block diagram of a conceptual construction of a detecting system therefor.

A bearing unit in this wheel support bearing assembly includes, as shown in FIG. 1 in a sectional view, an outer member 1 having an inner periphery formed with a plurality of rolling surfaces 3, an inner member 2 having an outer periphery formed with rolling surfaces 4 in face-to-face relation with the respective rolling surfaces 3, and a plurality of rows of rolling elements 5 interposed between the plurality of those rolling surfaces 3 and 4. This wheel support bearing assembly is rendered to be a double row angular contact ball bearing design, in which the rolling elements 5 are employed in the form of balls and retained by a retainer 6 employed for each of the rows. The rolling surfaces 3 and 4 referred to above have a sectional shape representing an arcuate shape and are so formed as to permit the ball contact angles to assume a back-to-back relation to each other. Opposite ends of a bearing space delimited between the outer member 1 and the inner member 2 are sealed respectively by sealing devices 7 and 8.

The outer member 1 is of a type that serves as a stationary member and is of one piece construction including a vehicle body fitting flange 1a defined in an outer periphery thereof and adapted to be secured to a knuckle 16 of a suspension system (not shown) of an automotive vehicle. The vehicle body fitting flange 1a has threaded holes 14 defined therein at a plurality of locations spaced in a direction circumferentially thereof and, therefore, the vehicle body fitting flange 1a can be secured to the knuckle 16 when knuckle bolts (not shown) inserted from an inboard side into respective bolt insertion holes 17 defined in the knuckle 16 are threaded into the corresponding threaded holes 14.

The inner member 2 is of a type that serves as a rotating member and includes a hub unit 9 having a wheel mounting hub flange 9a formed therein, and an inner ring 10 mounted on an outer periphery of an inboard end of a hub axle 9b of the hub unit 9. The rolling surfaces 4 referred to above are formed respectively in the hub unit 9 and the inner ring 10. An outer periphery of an inboard end of the hub unit 9 is provided with an inner ring mounting surface 12 that is stepped radially inwardly to render it to have a reduced diameter, with the inner ring 10 mounted on this inner ring mounting surface 12. The hub unit 9 has a center portion formed with a throughhole 11 extending completely therethrough. The hub flange 9a is provided with a plurality of press fitting holes 15 defined at respective circumferential locations, spaced in a direction circumferentially thereof, for receiving corresponding hub bolts (not shown). In a periphery of a root portion of the hub flange 9a of the hub unit 9, a cylindrical pilot portion 13 for guiding a vehicle wheel and a brake component (not shown) protrudes towards the outboard side.

Figure 2:
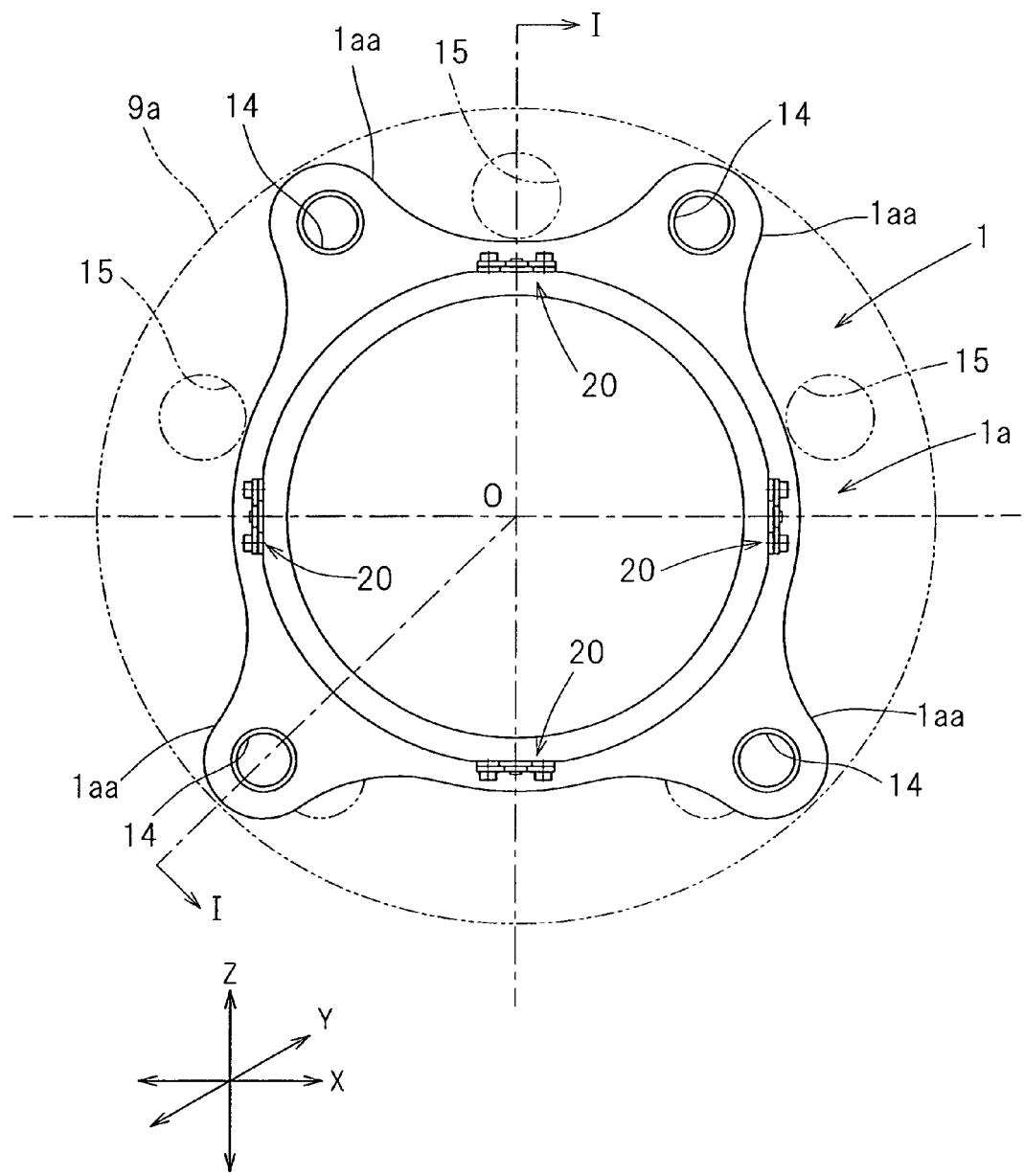
FIG. 2 is a front elevational view showing an outer member, employed in the sensor equipped wheel support bearing assembly in FIG. 1, as viewed from an outboard side.

FIG. 2 illustrates a front elevational view showing the outer member 1 of the wheel support bearing assembly as viewed from the outboard side. It is to be noted that FIG. 1 illustrates a cross sectional view taken along the arrow headed line I-I in FIG. 2. As best shown in FIG. 2, the vehicle body fitting flange 1a referred to previously has projecting lugs 1aa at respective circumferential locations where the corresponding threaded holes 14 are defined, which protrude in a direction radially outwardly beyond the remaining area.

The outer member 1 serving as the stationary member has an outer diametric surface on which four sensor units 20 are mounted. In the instance as shown, two of those four sensor units 20 are mounted on top and bottom surface portions of the outer diametrical surface of the outer member 1, which correspond respectively to the vertically top and bottom position of the outer diametric surface of the outer member 1 relative to the tire tread, and the remaining two sensor units 20 are mounted on left and right surface portions of the outer diametric surface of the outer member 1, which correspond respectively to the horizontally left and right position of the outer diametric surface of the outer member 1 relative to the tire tread.

Figure 3:
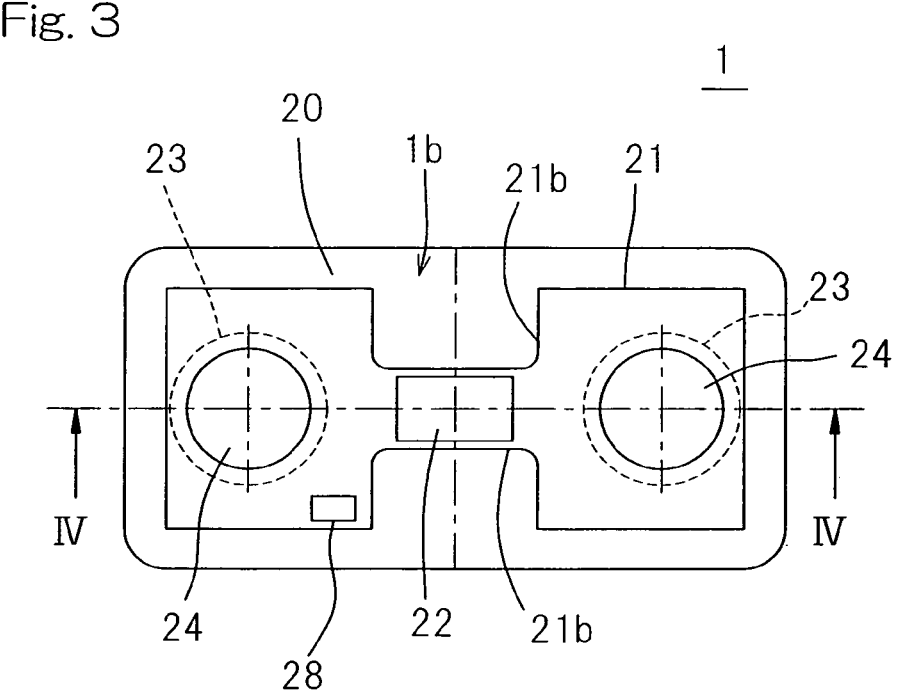
FIG. 3 is an enlarged plan view of a sensor unit employed in the sensor equipped wheel support bearing assembly in FIG. 1.
Figure 4:
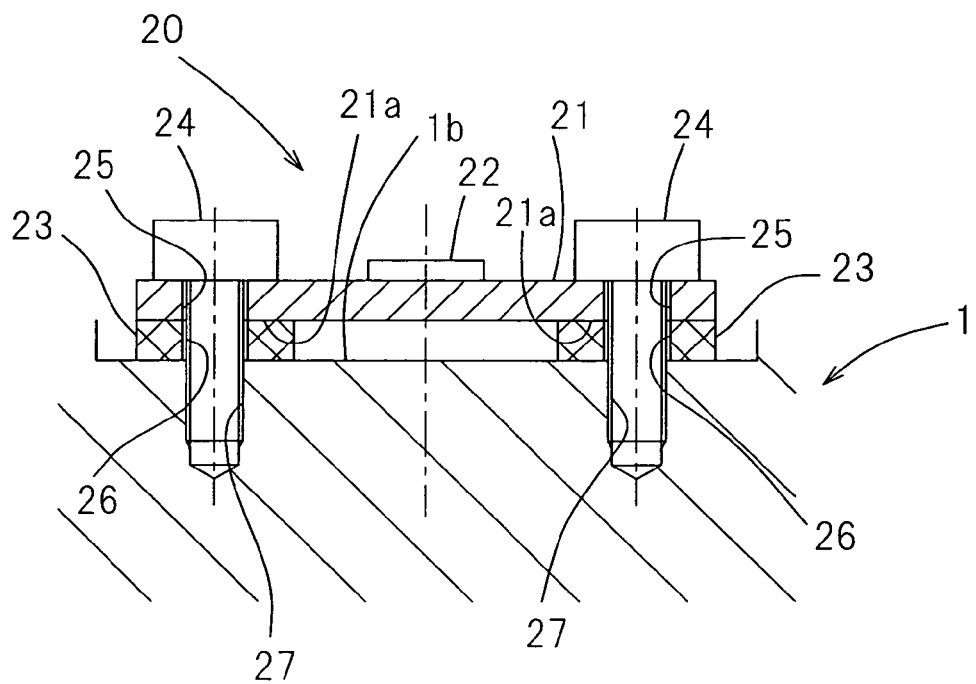
FIG. 4 is a cross sectional view taken along the line IV-IV in FIG. 3.
Figure 5:
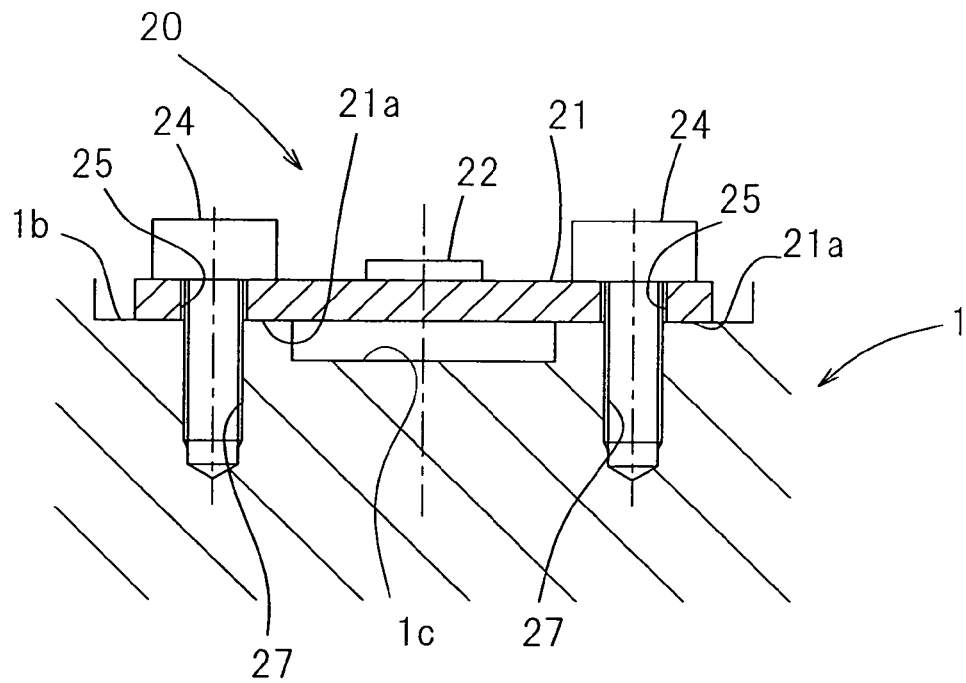
FIG. 5 is a sectional view showing another example of installation of the sensor unit.

Each of those sensor units 20 includes, as shown in an enlarged top plan view and an enlarged sectional view shown respectively in FIGS. 3 and 4, a strain generating member 21 and a strain sensor 22 fitted to the strain generating member 21 for detecting a strain induced in the strain generating member 21. The strain generating member 21 is in the form of an elastically deformable thin plate made of a metallic material such as, for example, a steel material and having a wall thickness not greater than 2 mm and has a strip shape of a uniform width over the entire length thereof in a plan view, with cutouts 21b formed at its opposite side edge portions. Each of the cutouts 21 referred to above has corners rendered to represent an arcuately sectioned shape. Also, the strain generating member 21 in each of the sensor units 20 has its opposite end portions forming respective contact fixing segments 21a defined therein and adapted to be fixed to the outer diametric surface of the outer member 1 through respective spacers 23 in contact therewith. It is to be noted that depending on the shape of the strain generating member 21 in each of the sensor units 20, the number of the contact fixing segments 21 may be three or more, rather than two as shown and described, and also the cutouts 21b may be dispensed with.

The strain sensor 22 is pasted to a portion of the strain generating member 21, where a considerable strain can be induced relative to a load acting in various directions. In the instance as shown, for that portion of the strain generating member 21 to which the strain sensor 22 is pasted, an outer surface of the constricted bridge portion left by the formation of the cutouts 21b is chosen and, accordingly, the strain sensor 22 so pasted can detect a circumferentially occurring strain induced in the vicinity of the cutouts 21b. It is to be noted that the strain generating member 21 is preferably of a type incapable of deforming plastically even when the maximum expected force is applied as a force acting on the outer member 1, which serves as the stationary member, or as a working force acting between the vehicle tire and the road surface. This is because once the plastic deform occurs in the strain generating member 21, the deformation of the outer member 1 will not be transmitted to the sensor unit 20, with the strain measurement being consequently affected adversely. The maximum expected force means the highest force within the range of force with which, for example, the wheel support bearing assembly will not be impaired even when such force acts thereon, but will readily assume a normal functioning once such force is removed.

The sensor unit 20 referred to above is so positioned that the two contact fixing segments 21a of the strain generating member 21 thereof are spaced in a direction circumferentially of the outer member 1 from each other at respective positions of the same dimension in a direction axially of the outer member 1, and those contact fixing segments 21a of the strain generating member 21 so positioned as described above are fixed to the outer diametric surface of the outer member 1 through the associated spacers 23 by means of bolts 24. Those bolts 24 are, after having been passed through bolt insertion holes 25, defined in the respective contact fixing segments 21, again passed through corresponding bolt insertion holes 26, defined in the respective spacers 23, threadingly engaged in internally threaded holes, or bolt holes 27 defined in an outer peripheral portion of the outer member 1. With the contact fixing segments 21a having been fixed to the outer diametric surface of the outer member 1 through the respective spacers 23 in the manner as hereinabove described, the bridge portion of the strain generating members 21 of a thin plate configuration, where the associated cutout 21b are formed, are held in position spaced from the outer diametric surface of the outer member 1 and, accordingly, a deformation induced by strain may occur easily in the vicinity of those cutouts 21b.

For the axial position where each of the contact fixing segments 21a is arranged, an axial position in the vicinity of the rolling surface 3 of the outboard row may be selected in the instance as shown. The vicinity of the rolling surface 3 of the outboard row referred to above means a region ranging from a middle position between the rolling surface 3 of the inboard row and the rolling surface 3 of the outboard row, to an area in which the rolling surface 3 of the outboard row is formed. In order for the sensor unit 20 to be stably fixed to the outer diametric surface of the outer member 1, an area of the outer diametric surface of the outer member 1, on which the respective spacer 23 is fixed in contact therewith, is formed as a flat surface area 1b.

Other than that described above, as shown in FIG. 5 in a sectional view, a portion of the outer diametric surface of the outer member 1, which lies intermediate between the two portions thereof where the two contact fixing segments 21a of the strain generating member 21 are fixed, may be provided with a groove 1c to enable the use of the spacer 23 to be dispensed with and, at the same time, to separate that intermediate portion between the two contact fixing segments 21a in the strain generating member 21, where the cutouts 21b are located, from the outer diametric surface of the outer member 1.

For each of the strain sensors 22, any suitable sensor can be employed. For example, each of the strain sensors 22 may be employed in the form of a metal foil strain gauge. In such case, the metal foil strain gauge is generally fixed in position on the strain generating member 21 by means of bonding. Also, the strain sensor can be formed on the strain generating member 21 in the form of a thick film resistance element.

The stain sensor 22 in each of the sensor units 20 is connected with a load estimation processing section 30 for estimating a load, acting on the vehicle wheel, from an output signal of the strain sensor 22. The load estimation processing section 30 includes a forward and rearward direction load estimator 30x for estimating a radial load, which is one of loads acting on the vehicle wheel in various directions and will become a forward and rearward acting load Fx, a vertical direction load estimator 30z for estimating a radial load, which is another one of the loads acting on the vehicle wheel in the various directions and will become a vertically (up and down) acting load Fz, and an axial direction load estimator 30y for estimating an axially acting load Fy. The forward and rearward direction load estimator 30x, the vertical direction load estimator 30z and the axial direction load estimator 30y may be provided separately and independently from each other or may be in the form of a single estimator designed to operate on a time sharing basis or the like to estimate the loads Fx, Fz and Fy in the various directions one at a time.

The strain sensor 22 in each of the sensor units 20 detects a component or components of the load acting in a forward and rearward direction and a vertical direction, both of which will become a radial direction of the wheel support bearing assembly, and an axial direction, depending on the position of installation or the like of the corresponding sensor unit 20. For this reason, the forward and rearward, vertical and axial direction load estimators 30x, 30z and 30y are so designed as to make use of an input of which one of those sensors 22 or have a coefficient by which an input signal is multiplied for each of the sensors 22 used, and, accordingly, can estimate the forward and rearward acting load Fx, the vertically acting load Fz and the axially acting load Fy, respectively. The coefficient referred to above is determined as a suitable value by means of, for example, an experiment.

Since each of the sensor units 20 is provided at an axial positions which will becomes a neighbor of the raceway surface 3 of the outboard row of the outer member 1, an output signal of the corresponding strain sensor 22 is affected by the rolling elements 5 then passing in the vicinity of the site of installation of the respective sensor unit 20. In other words, the amplitude of the output signal will be a maximum value when the rolling elements 5 move the position closest to the strain sensor 22 in the respective sensor unit 20, but will decrease as the rolling elements 5 move away from that position. Accordingly, the output signal of the strain sensor 22 during the rotation of the wheel support bearing assembly has an amplitude representing a waveform approximate to the sinusoidal wave, which changes at the cycle determined by the pitch of arrangement of the rolling elements 5.

The average value, which will become a direct current component, and the amplitude value of an alternating current component, both of which are contained in the output signal of the strain sensor 22, are signals enabling to estimate the load acting on the vehicle wheel, but they have characteristics which will be advantages and disadvantages. Although the average value enables to estimate the load over a wide range, but a drift tends to occur in it as hereinbefore described. For this reason, the load estimation processing section 30 is of a type in which a function of correcting the average value by mainly estimating the drift amount of the output is mounted, by analyzing the average value and the amplitude value in the manner as will be described subsequently.

Figure 7:
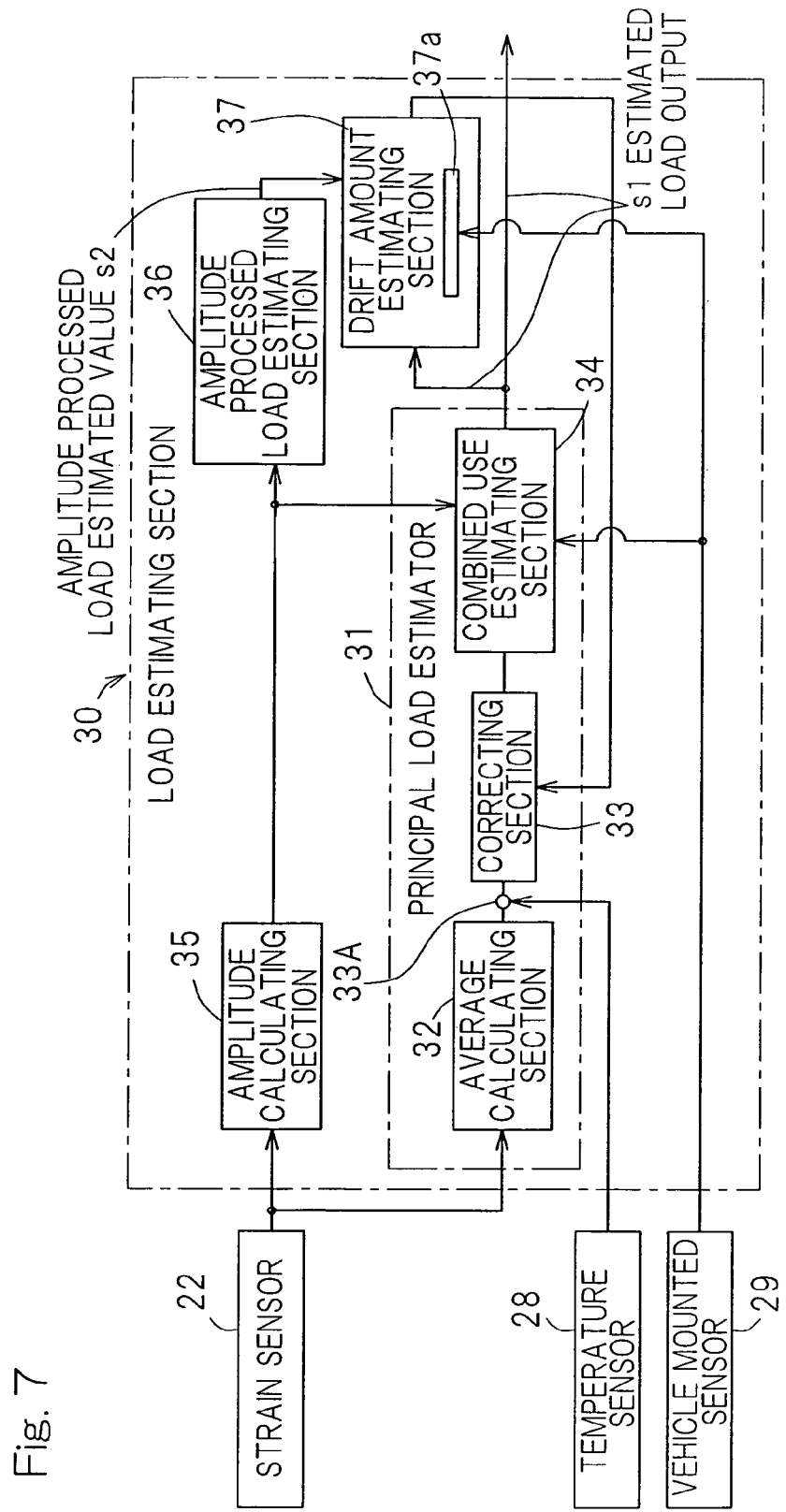
FIG. 7 is a block diagram showing an example of construction of an estimating section used in the sensor equipped wheel support bearing assembly.

FIG. 7 illustrates a block diagram showing an example of construction of the load estimation processing section 30. In this figure, only one of the forward and rearward direction load estimator 30x, the vertical direction load estimator 30z and the axial direction load estimator 30y is shown as a representative example. Also, the strain sensor 22 shown in this figure is shown as a representative of the plural strain sensors 22.

In the example of construction shown in FIG. 7, the load estimation processing section 30 includes a principal load estimating section 31 for calculating a load acting on the vehicle wheel, an amplitude value calculating section 35, an amplitude processed load estimating section 36 for calculating from the amplitude value, an amplitude processed load estimated value s2 corresponding to the load acting on the vehicle wheel, and a drift amount estimating section 37. The principal load estimating section 31 is made up of an average value calculating section 32, a temperature correcting section 33A, a correcting section 33, and a combined use estimating section 34 and is operable to output an estimated load output s1 which is an estimated value of the load acting on the vehicle wheel.

The average value calculating section 32 is a section configured to calculate the average value of the output signal of the strain sensor 22. Calculation of this average value may be accomplished by either passing through a low pass filter to extract a direct current component or calculating the sum of the two strain sensors 22 in which a reverse phase relation appears, or calculating the movement average or the like of the output signal of the strain sensor 22.

The temperature correction section 33A is a section configured to correct the average value, calculated by the average value calculating section 32, with a temperature detected by a temperature sensor 28. The temperature sensor 28 is provided in the strain generating member 21 of at least one of the sensor units 20 as shown in FIG. 3. Since the strain and the temperature exhibit an approximately proportional relationship with each other, the temperature correcting section 33A corrects the average value relying on such a relation between the strain and the temperature.

The correcting section 33 is a section configured to perform a correction corresponding to the drift amount estimated by the drift amount estimating section 37. For example, the estimated drift amount or the value of the estimated drift amount multiplied by a suitable coefficient is added to the average value.

The concomitance use estimating section 34 is a section configured to calculate the estimated load output s1 with the use of the average value after correction, which has been corrected by the correcting section 33, and the amplitude value of the output signal of the strain sensor 22. This concomitance use estimating section 34 is operable, for example, to multiply the average value after the correction and the amplitude value by the respective suitable coefficients, which will become weights to them, to render the sum of those two values to be the estimated load output s1.

The amplitude value calculating section 35 is a section configured to calculate the amplitude value of the alternating current component of the signal waveform resulting from the passage of the rolling elements of the output signal of the strain sensor 22. This calculation is rendered to be a process of extracting the alternating current component of, for example, the signal waveform. The amplitude value calculated by the amplitude value calculating section 35 is inputted to the combined use estimating section 34.

The amplitude processed load estimating section 36 is a section configured to calculate the amplitude processed load estimated value s2, which corresponds to the load acting on the vehicle wheel, from the amplitude value obtained from the amplitude value calculating section 35. Since the amplitude value changes depending on the load acting on the bearing unit, the load acting on the vehicle wheel can also be estimated from the amplitude value.

The drift amount estimating section 37 is operable to compare the estimated load output s1, which is an estimated value from the principal load estimating section 31, and the amplitude processed load estimated value s2, which has been estimated by the amplitude processed load estimating section 36, with each other to thereby estimate the drift amount of the output signal of the strain sensor 22 appearing in the estimated load output s1. The drift amount estimating section 37 is operable to estimate the drift amount by determining the difference between the estimated load output s1 and the amplitude processed load estimated value s2 through a statistical work to thereby estimate the drift amount. By way of example, the relation between the amplitude processed load estimated value s2 and the estimated load output s1 is determined and, then, apply a least squares estimation method to thereby estimate the drift amount of the estimated load output s1 from such relation.

Figure 6:
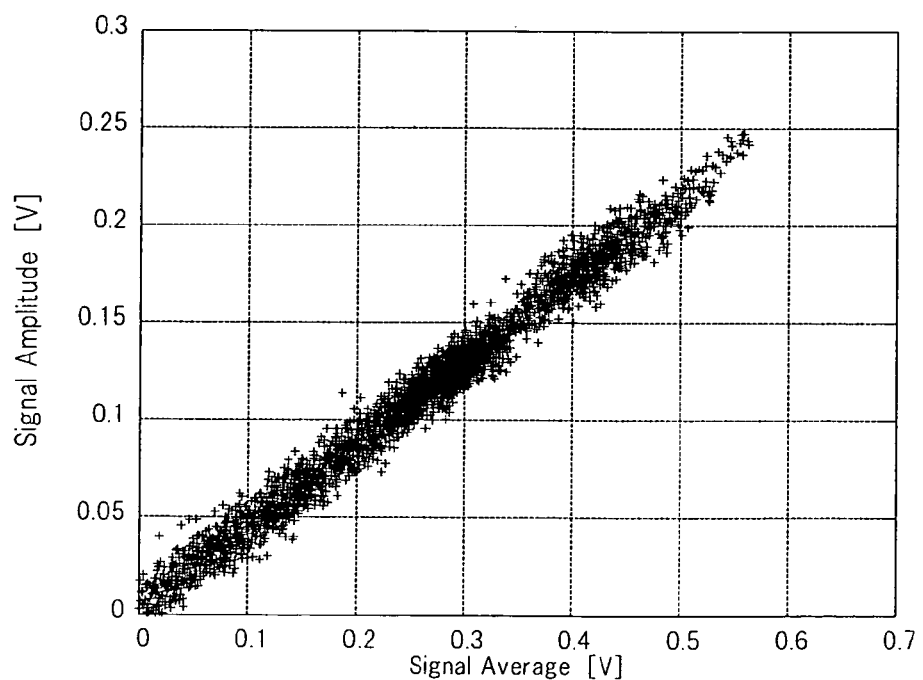
FIG. 6 is a diagram showing the relation between an average value and an amplitude value of a strain sensor output signal in the sensor unit.

In the event that a difference occurs between the outputs s1 and s2 (in the event that the average value has an offset, that is, the average value deviates from a normal value), the relation between the amplitude and the average value shown in FIG. 6 breaks up. This difference (an offset component of the average value) is corrected for each sensor. More specifically, the following procedures take place.

If the average value is expressed by a vector A, the amplitude value is expressed by a vector B and weighting factors used in the calculation are expressed by M1 and M2, the output of the principal load estimating section 31 can be expressed by $s1=M_1A+M_2B$. The amplitude processed load estimated value s2 and s1 will be equal to each other, that is s1=s2 if some conditions are limited and, therefore, a linear relation establishes in a manner similar to the graph shown in FIG. 6.

If a drift Δ occurs in the signal, the average value vector will be A+Δ and the estimated value will change as expressed by s1'=s1+M$_1$Δ. In other words, it changes in such a relation as s1'=s2+M$_1$Δ.

For that reason, the relation between s1' and s2 will in such a condition in which the graph shown in FIG. 6 is moved parallel. If the relation between s1' and s2 for a certain period is statistically processed and a move component of a segment is calculated according to the least square estimation, M$_1$Δ can be determined. Accordingly, subtraction is applied to the result of calculation to establish s1'−M$_1$Δ, an influence brought about by the drift can be removed. Also, once the value of M$_1$Δ is determined, the drift Δ of the sensor signal can be estimated as Δ=M$_1^{-1}$·M$_1$Δ (wherein M$_1^{-1}$ represents a generalized inverse matrix). Accordingly, by subtracting A from the average value signal A, correction may be carried out before inputting to the combined use estimating section 34.

The drift amount estimating section 37 is provided with a load condition limiting section 37a. This load condition limiting section 37a is operable to determine from an output signal of one or more sensors provided in the automotive body, that is, a vehicle mounted sensor 29, whether or not the status of the load acting on the bearing unit during the travel of the automotive vehicle satisfies a preset load condition and to extract the amplitude processed load estimated value s2, which is used in estimation processing of the drift amount by the drift amount estimating section 37, out from the amplitude processed load estimated values s2 outputted by the amplitude processed load estimating section 36, in accordance with a preset extraction condition. For the vehicle mounted sensor 29, a G sensor (acceleration sensor), a yaw rate sensor, a throttle sensor, an ABS sensor (a rotational speed sensor for the antilock brake system) or the like can be employed.

The operation of the sensor equipped wheel support bearing assembly of the structure hereinabove described will now be described. When a load acts between a tire of the vehicle wheel and a road surface, such load is applied also to the outer member 1, which is the stationary member, of the wheel support bearing assembly, resulting in deformation. Since in the instance as shown and described, the two or more contact fixing segments 21a of the strain generating member 21 in each of the sensor units 20 is fixed to the outer member 1 in contact therewith, the strain induced in the outer member 1 is apt to be transmitted to the strain generating member 21 after having been amplified and such strain is subsequently detected by the strain sensor 22 with a high sensitivity and the hysteresis occurring in an output signal thereof is also reduced. The load acting on the vehicle wheel is estimated by the load estimation processing section 30 from the output of the strain sensor 22 so detected in the manner described above.

The operation of the load estimation processing section 30 will be described in detail hereinafter. By the forward and rearward direction load estimator 30x, the vertical direction load estimator 30z and the axial direction load estimator 30y, all shown in FIG. 1, and using the output of the strain sensor 22 in each of the plural sensor units 20, the forward and rearward acting load Fx, the vertically acting load Fz and the axially acting load Fy are estimated, respectively. In the estimation of the loads Fx, Fz and Fy in those directions, by analyzing the sensor signal average value and amplitude, the signal drift amount is estimated and corrected by the respective means shown in FIG. 7.

In other words, from the amplitude value obtained by the amplitude value calculating section 35 connected to the strain sensor, the amplitude processed load estimated value s2 corresponding to the load acting on the vehicle wheel is calculated by the amplitude processed load estimating section 36. The principal load estimating section 31 calculates the average value of the output signal of the strain sensor 22 by the average value calculating section 32, performs various corrections and then outputs the estimated load output s1. The drift amount estimating section 37 compares the estimated load output s1, which is the estimated value from the principal load estimating section 31, and the amplitude processed load estimated value s2, which has been estimated by the amplitude processed load estimating section 36, with each other so that the difference therebetween can be determined by a statistical processing with a high accuracy, thereby estimating the drift amount of the output signal of the sensor 22 appearing in the estimated load output s1. At this time, whether or not that the load condition during the travel of the automotive vehicle is a load condition with which the above described comparison can be performed is determined by the load condition limiting section 37a and, of the amplitude processed load estimated values s2, the value that is determined that can be compared is extracted so that the drift amount can be estimated by the drift amount estimating section 37.

The drift amount so estimated in the manner described above is fed back to the principal load estimating section 31 and the principal load estimating section 31 further corrects the average value calculated by the average value calculating section 32 (more specifically, the average value corrected by the temperature correcting section 33A) with the above described drift amount. To the average value so corrected further as described above, the estimated load output s1, which will be the value attained by adding the average value and the amplitude value together in a predetermined proportion, is calculated and outputted. This estimated load output s1 becomes an output of the load estimation processing section 30.

Figure 8:
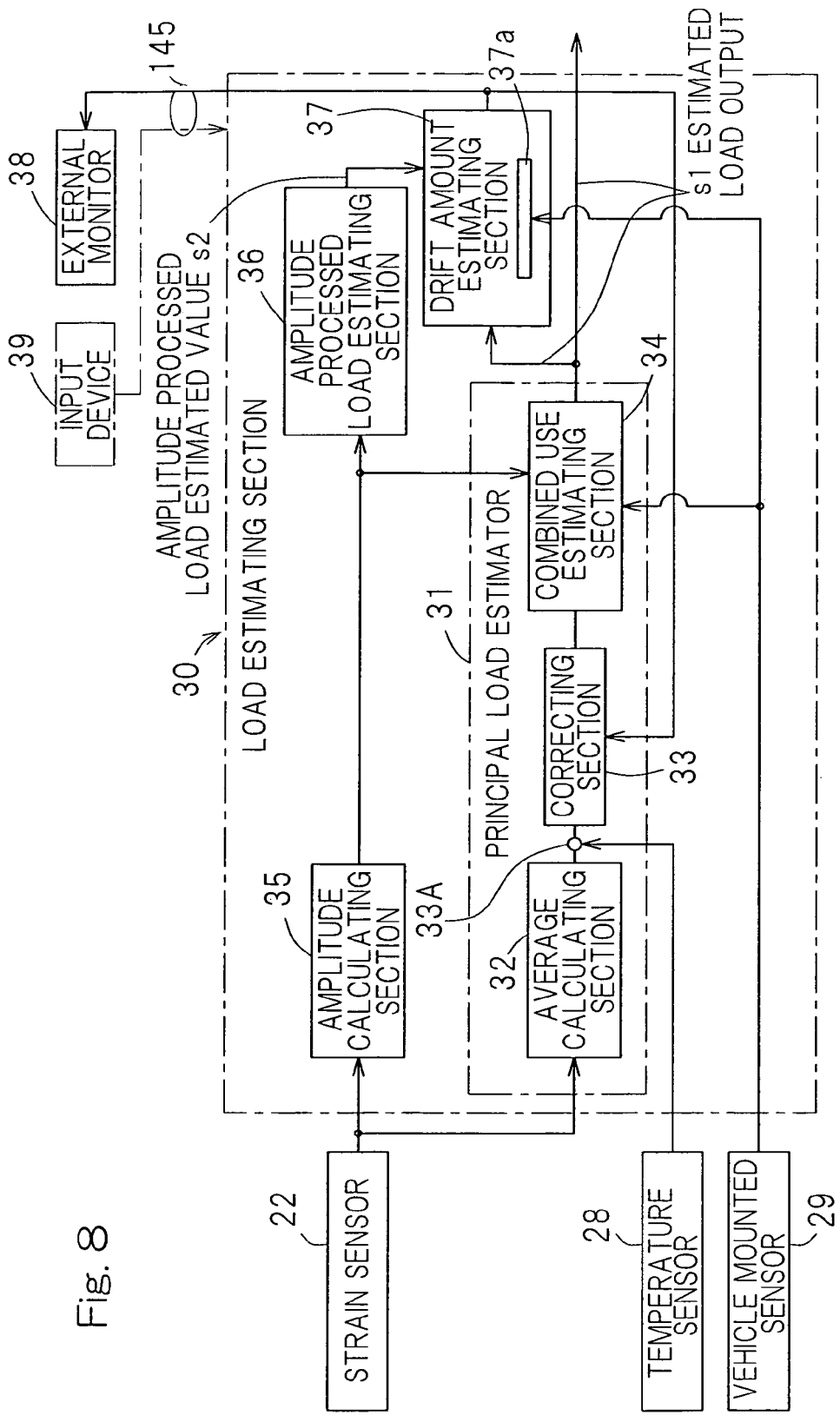
FIG. 8 is a block diagram showing another example of construction of the estimating section used in the sensor equipped wheel support bearing assembly.

Also, as shown in FIG. 8, it is recommended that the load estimation processing section 30 is connected with an intra-vehicle communication bus 145 so that the drift amount estimated by the drift component estimating section 37 and the estimated load output s1 resulting from the principal load estimating section 31 can be outputted to an external monitor 38 through the vehicle communication bus 145. It is also recommended that the load estimation processing section 30 is connected with a vehicle mounted input device 39 through an intra-vehicle communication bus 145 so that in the load estimation processing section 30 a variety of parameter can be set, which are to be used in calculation in estimation of the load acting on the vehicle wheel, including estimation of the drift amount by the drift amount estimating section 37, in response to an input from the input device 39.

According to the above described construction, the drift component of the estimated load output s1, which is mainly the average value, is estimated and corrected with the amplitude value, and since an amplitude signal having detected a local strain is seldom affected by an influence such as, for example, temperature or the like, the drift component of the average value of the sensor signal can be estimated with the use of load information obtained by calculating and processing the amplitude.

With the estimated drift component so corrected, an error in the average value information can be reduced and, using the average value information so corrected and amplitude information, the load calculating accuracy of the estimated load output s1 can be increased.

Also, a signal of the temperature sensor 28 and a signal of any other vehicle mounted sensor 29 during the travel of the automotive vehicle are analyzed and correction of known parameters such as temperature dependent influences is performed. Moreover, the amplitude processed load estimated value s2, which is an input load estimated from the condition of the signal amplitude, and the value of the estimated load output s1, which is mainly the signal average value for the estimated load condition thereof, are compared to calculate a displacement amount. For this reason, the most accurate drift amount can be estimated.

Although the accuracy of the amplitude processed load estimated value s2, which is the load estimated value resulting from only the amplitude, is limited, the correspondence relation between the amplitude value and the signal average value (more specifically, the estimated load output s1), if the load condition is limited, will be represented by a linear relation in a good accuracy as shown in FIG. 6. FIG. 6 illustrates the relation between the average value and the amplitude value (noting a condition of Fy>0). Since as discussed above the linear relation can be obtained, with respect to data on the estimated load output s1, which is mainly the signal average value, and the amplitude processed load estimated value s2, when such relating is determined by the application of the least squares estimation, the drift amount of the average value data (estimated load output s1) can be accurately determined.

It is, however, to be noted that since the above described linear relation establishes under the limited load condition, the use of the load condition limiting section 37a for estimating the load condition during the travel of the automotive vehicle is made to limit a condition under which the drift amount estimation processing is performed.

For predication of the load condition during the travel of the automotive vehicle, it is desirable that it be comprehensively judged with the concurrent use of signals of various sensors mounted on the vehicle body such as, for example, a G sensor, a yaw rate sensor, a throttle sensor, a steering sensor and an ABS sensor. In such case, the load estimation processing section 30 has to be connected with an intra-vehicle communication bus such as, for example, a CAN bus (control area network bus) so that necessary information can be used.

In the event that an abrupt change in load occurs by reason of, for example, collision with a curb stone, the signal of the strain sensor 22 may possibly change correspondingly abruptly. If no correcting function exhibited by the load condition limiting section 37a is available, a detection error continues to occur at all times thereafter, but in view of the correction functioning properly, it is possible to suppress the detection error by correcting the signal drift in a short length of time.

The detected drift amount is fed back to the principal load estimating section 31 and, therefore, the error in detected load can be reduced.

The drift amount so fed back is stored in a storage section (not shown) of the load estimation processing section 30 and can be monitored through an external monitor 38 to which information is fed through the above described intra-vehicle communication bus. Also, in the event that any change occur in the sensor signal as a result of, for example, repair and/or replacement of component parts, a proper drift amount can be updated by an input device 39 similarly through the communication bus.

Also, since the embodiment of the present invention now under discussion the four sensor units 20 are employed and are disposed so as to assume the top, bottom, right and left positions, respectively, relative to the tire tread in a fashion equidistantly spaced 90° in phase difference from each other in a circumferential direction, the vertically acting load Fz which will become the vertically acting load Fz acting on the wheel support bearing assembly, the load Fx which will become the driving force or the braking force, and the axially acting load Fy can be estimated.

According to the sensor equipped wheel support bearing assembly of the structure hereinbefore described, the drift component that cannot be corrected only with the temperature sensor 28 can also be corrected. The drift of the sensor signal resulting from the impact load and/or aging of the wheel support bearing assembly can also be cancelled and the detecting accuracy can be maintained for a prolonged period of time. In addition, even when the temperature sensor 28 is not arranged in the vicinity of all of the strain sensors 22, it will become good.

It is to be noted that in the practice of the above described embodiment of the present invention, the use may be made, on an inner periphery of the outer member 1, of a rolling element detecting sensor 40 for detecting the position of the rolling elements 5 as shown in FIG. 1 so that a detection signal from this rolling element detecting sensor 40 can be inputted to the correcting section 33 shown in FIG. 7 or FIG. 8. Thus, it will readily be understood that where as the data used for the correction performed by the correcting section 33, position data of the rolling elements 5 detected by the rolling element detecting sensor 40 are added, the influence brought about by passage of the rolling elements 5 can be eliminated from the average value calculated by the average value calculating section 32 and, therefore, the detection error of the load can be further reduced.

FIG. 9 to FIG. 14 illustrate a second preferred embodiment of the present invention. The sensor equipped wheel support bearing assembly shown in those figures is similar to that shown in and described with reference to FIGS. 1 to 8 in connection with the first embodiment of the present invention, but differs therefrom in that each of the sensor units 20A is so constructed as described subsequently. In this case, each of the sensor units 20A includes, as shown in an enlarged top plan view of FIG. 11 and an enlarged sectional view of FIG. 12, a strain generating member 21 and two strain sensors 22 fitted to the strain generating member 21 for detecting a strain occurring in the strain generating member 21. The strain generating member 21 has three contact fixing segments 21a adapted to be fixed to the outer diametric surface of the outer member 1 through associated spacers 23. Those three contact fixing segments 21a of the strain generating member 21 in each of the sensor units 20A are arranged in a row in a direction conforming to the lengthwise direction of the corresponding strain generating member 21.

Figure 11:
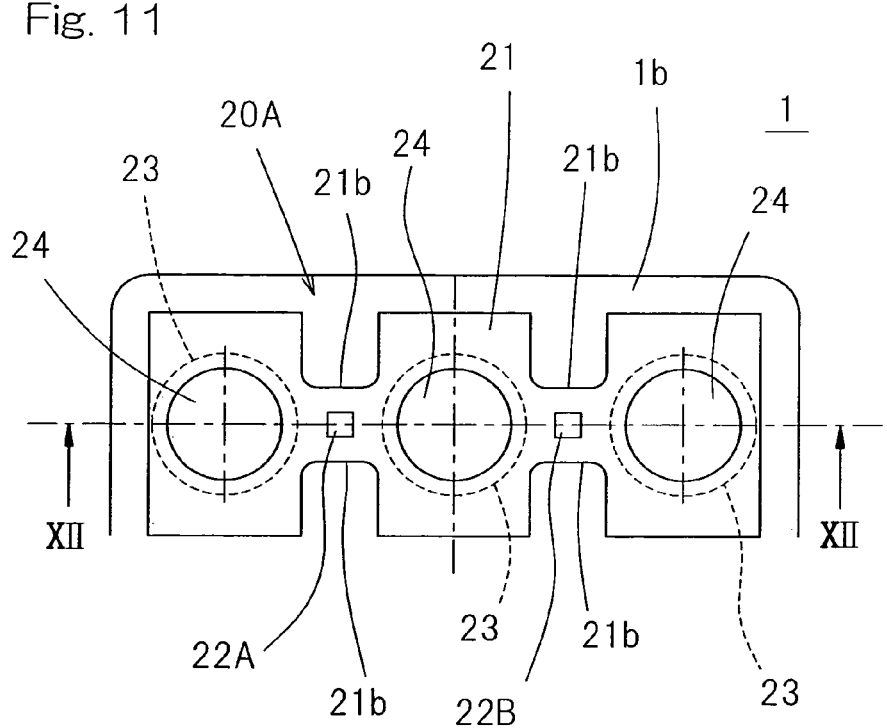
FIG. 11 is an enlarged plan view of the sensor unit employed in the sensor equipped wheel support bearing assembly in FIG. 9.
Figure 12:
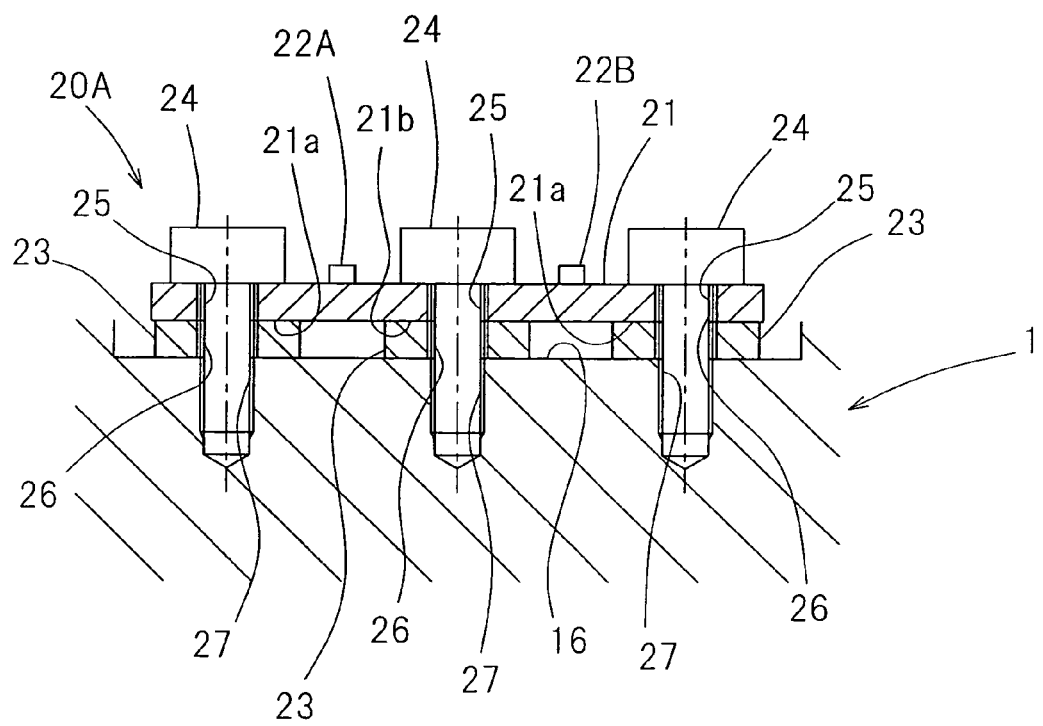
FIG. 12 is a cross sectional view taken along the line XII-XII in FIG. 11.
Figure 13:
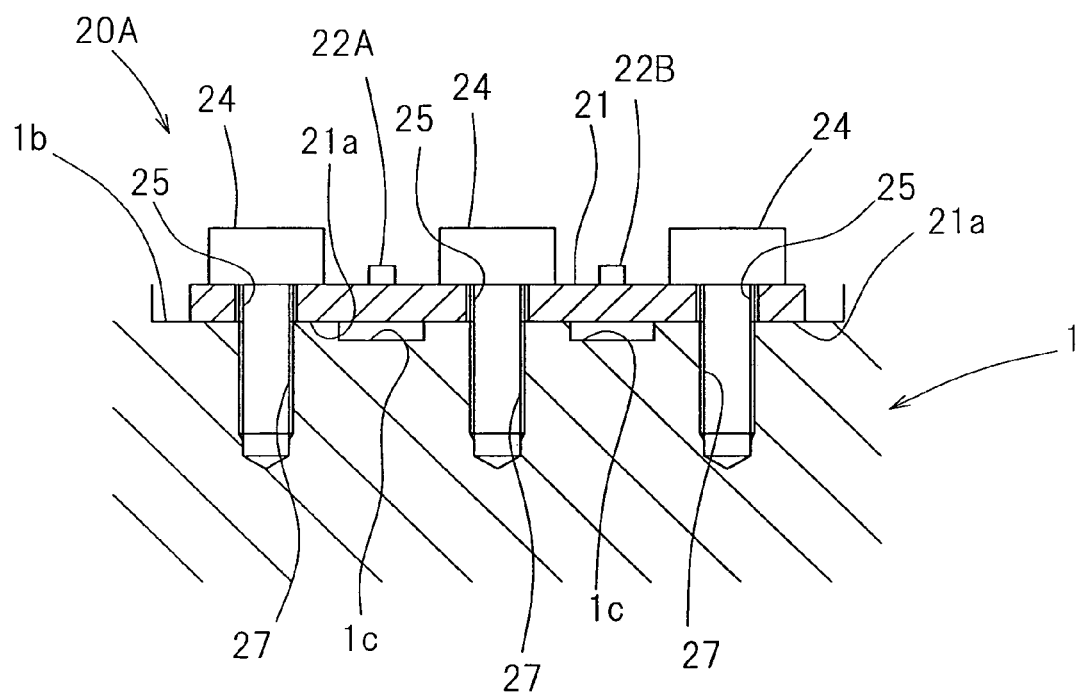
FIG. 13 is a sectional view showing another example of installation of the sensor unit.

One of the strain sensors 22A of the two strain sensors 22 is arranged, in FIG. 12, between the left contact fixing segment 21a and the intermediate contact fixing segment 21a, and the other of the strain sensors 22B is disposed between the intermediate contact fixing segment 21a and the right contact fixing segment 21a. Opposite side portions of the strain generating member 21 on respective sides of each of the strain sensors 22A and 22B are formed with respective pairs of the cutouts 21b as best shown in FIG. 11.

The sensor units 20A are so arranged as to permit the three contact fixing segments 21a of each of the corresponding strain generating members 21 may be held at respective positions of the same dimensions in a direction axially of the outer member 1 and, at the same time, each of the contact fixing segments 21a may be spaced a distance from each other in the circumferential direction, and those contact fixing segments 21*a* are fixed to the outer diametric surface of the outer member 1 through the respective spacer 23 by means of associated bots 24.

Other than that described above, as shown in FIG. 13 in a sectional view, a portion of the outer diametric surface of the outer member 1, which lies intermediate between the neighboring portions thereof where the three contact fixing segments 21*a* of the strain generating member 21 are fixed, may be provided with grooves 1*c* to enable the use of the spacers 23 to be dispensed with and, at the same time, to separate that intermediate portion between the neighboring contact fixing segments 21*a* in the strain generating member 21, where the cutouts 21*b* are located, from the outer diametric surface of the outer member 1. Other structural features of each of the sensor units 20A and the arrangement of the sensor units 20A are similar to those shown in and described with particular reference to FIGS. 1 to 8 in connection with the first embodiment of the present invention.

In the case of the second embodiment of the present invention described above, in the average value calculating section 32 of the load estimation processing section 30 in the first embodiment shown in and described with reference to FIGS. 1 to 8, the sum of respective output signals of the two strain sensors 22A and 22B in each of the sensor units 20A are calculated and such sum is extracted as the average value. Also, in the amplitude value calculating section of the load estimation processing section 30, the difference between the respective output signals of the two strain sensors 22A and 22B is calculated and the value of such difference is extracted as the amplitude value.

Figure 14:
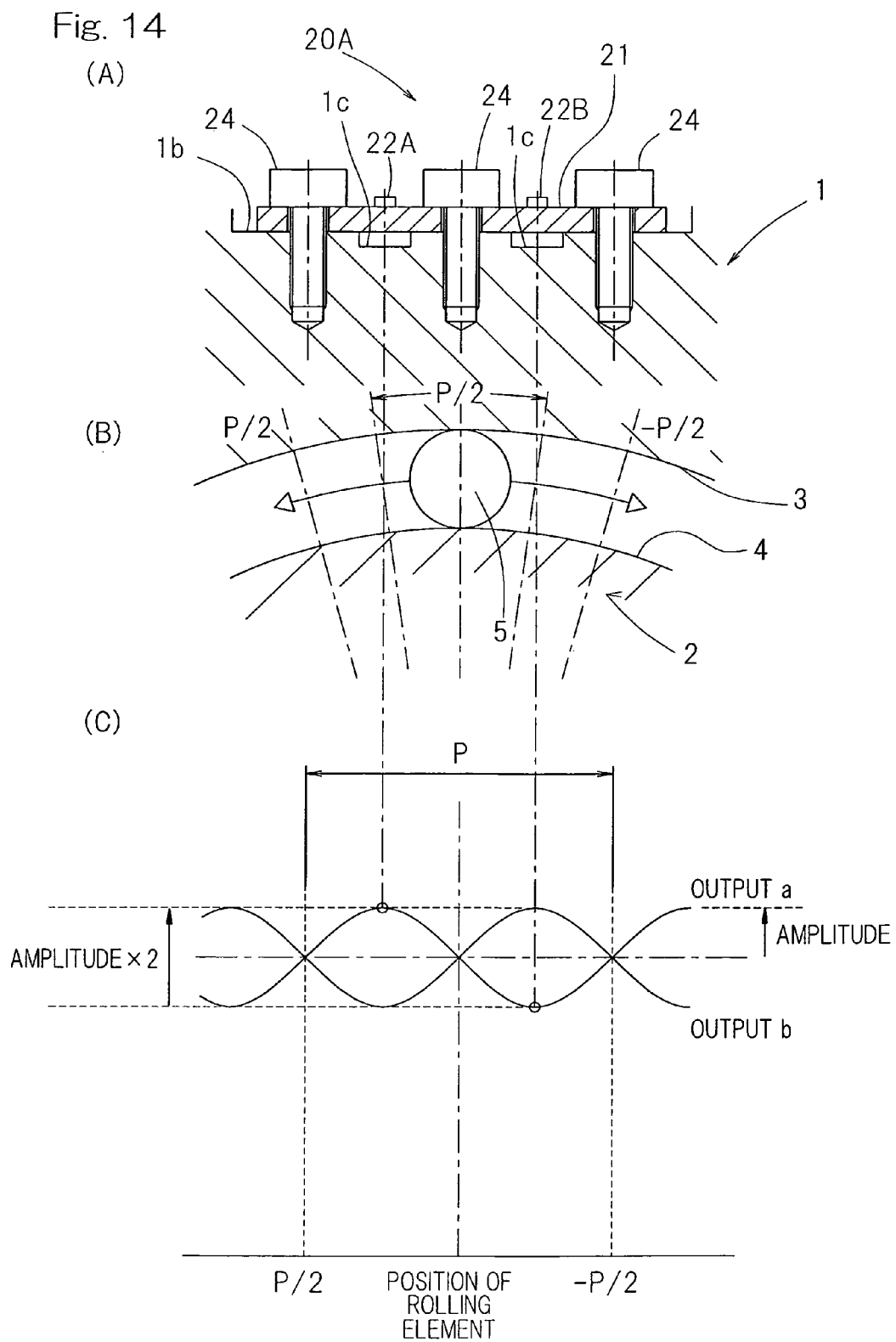
FIG. 14 is an explanatory diagram used to explain how the position of rolling elements affects an output signal from the sensor unit.

Since the sensor unit 20A is provided at an axial position which is in the vicinity of the outboard rolling surface 3 of the outer member 1, the respective output signals a and b of the strain sensors 22A and 22B are affected by the rolling element 5 moving in the vicinity of the site where the sensor unit 20A is installed as shown in FIG. 14. Also, even at the halt of the bearing unit, the respective output signals a and b of the strain sensors 22A and 22B are affected by the position of the rolling elements 5. In other words, as the rolling elements 5 move past the position closest to the strain sensors 22A and 22B in the sensor unit 20A (or, the rolling elements 5 are held at that position), the respective amplitudes of the output signals a and b of the strain sensors 22A and 22B attain the maximum value, but as the rolling elements 5 move away from that position as shown in FIG. 14, diagrams A and B (or, the rolling elements 5 are held at a position distant from that position), the amplitudes decrease. Since during the rotation of the bearing unit, the rolling elements successively move past respective positions of installation of the sensor units 20A at a predetermined pitch P of arrangement, the amplitudes of the output signals a and b of the strain sensors 22A and 22B represent waveforms each approximate to the sinusoidal wave, which changes cyclically, as shown in FIG. 14, diagram C, at the cycle determined by the pitch P of arrangement of the rolling elements 5.

Figure 9:
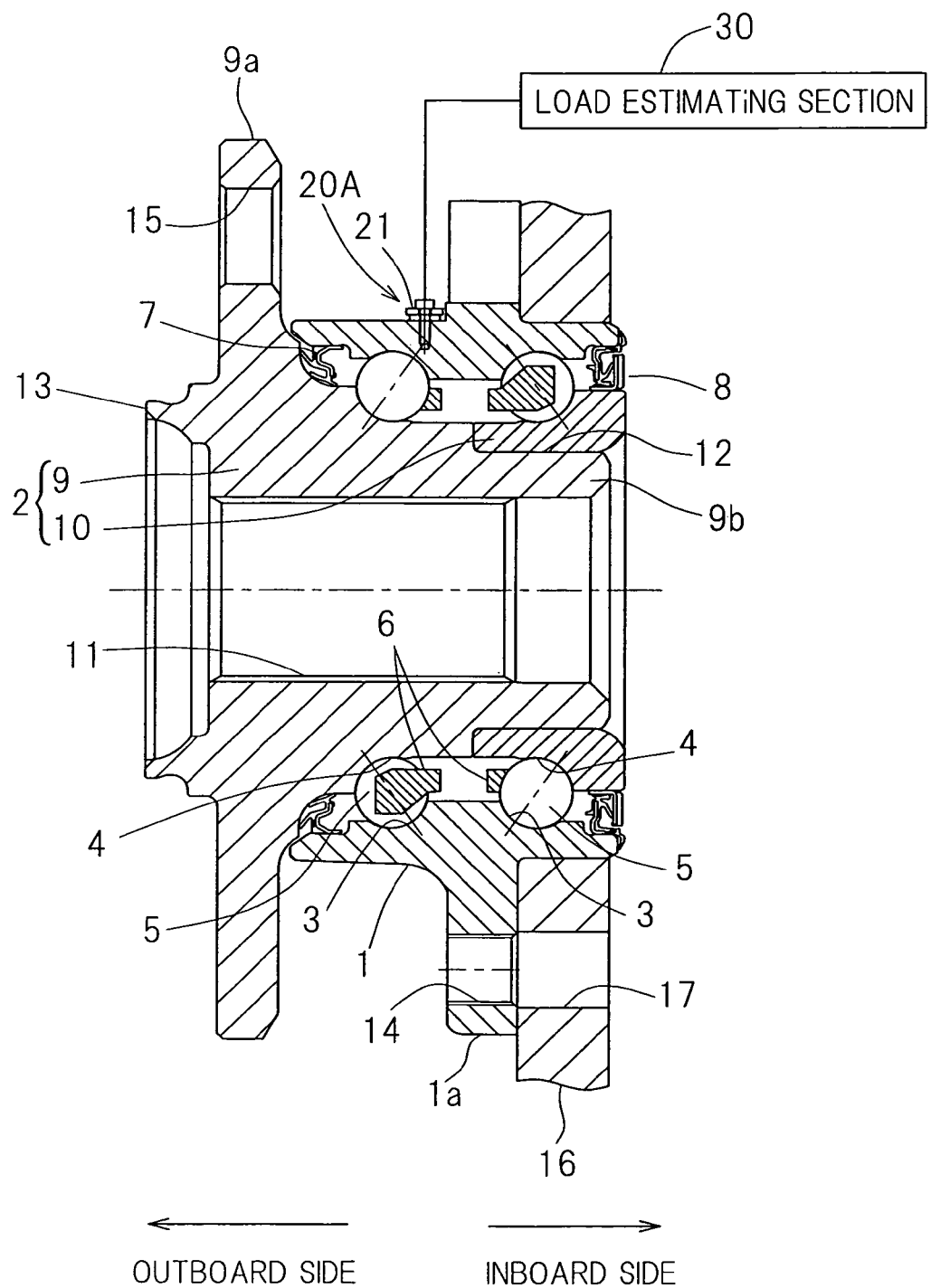
FIG. 9 is a diagram showing a sectional view of the sensor equipped wheel support bearing assembly according to a second preferred embodiment of the present invention, shown together with a block diagram of a conceptual construction of the detecting system therefor.
Figure 10:
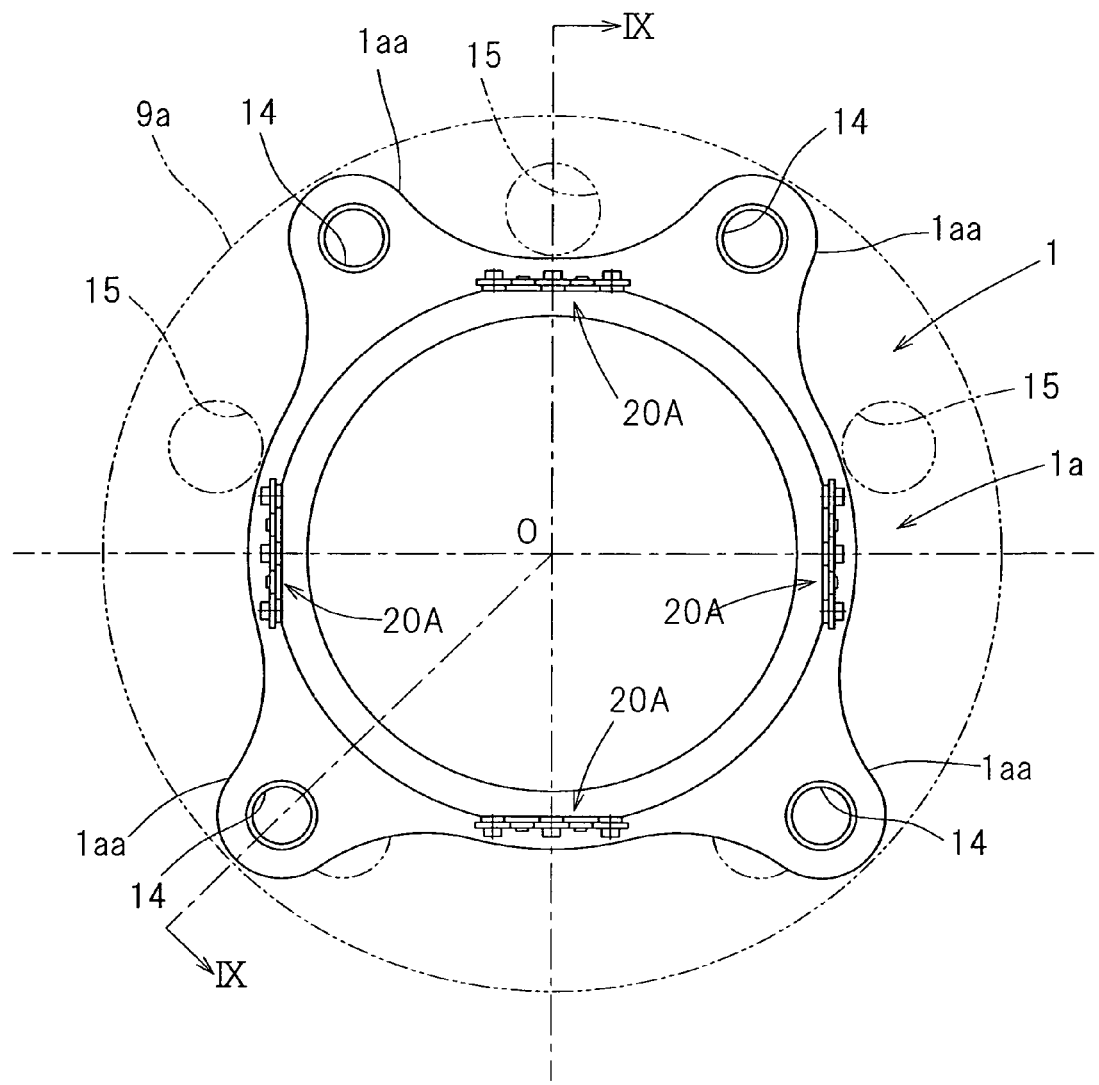
FIG. 10 is a front elevational view showing the outer member, employed in the sensor equipped wheel support bearing assembly in FIG. 9, as viewed from an outboard side.

The amplitudes of the output signals a and b of the strain sensors 22A and 22B are also affected by the hysteresis resulting from the influence, brought about by temperature, and/or a surface slippage between the knuckle 16 and the vehicle body fitting flange 1*a* (best shown in FIG. 9). In the illustrated embodiment, however, the sum of the amplitudes of the output signals a and b of the two strain sensors 22A and 22B are rendered to be the average value and the difference in amplitude is rendered to be the amplitude value as hereinbefore described. Accordingly, the average value will be a value from which a change component resulting from the passage of the rolling elements 5 has been cancelled. Also, the amplitude value will be a value in which the influence brought about by temperature on the output signals a and b of the two strain sensors 22A and 22B and/or the surface slippage between the knuckle and the flange have been counterbalanced. Accordingly, when this average value and amplitude value are utilized, the load acting on the wheel support bearing assembly or the tire tread can be further accurately estimated.

As best shown in FIG. 14, two of the three contact fixing segments 21*a* arranged in the circumferential direction of the outer diametric surface of the outer member 1 serving as the stationary member, which are positioned on opposite ends of the row of arrangement of those three contact fixing segments 21*a* are spaced a distance equal to the pitch P of arrangement of the rolling elements 5. In such case, the two strain sensors 22A and 22B, each arranged at the position intermediate between the neighboring contact fixing segments 21*a* are spaced a distance equal to approximately one half of the pitch P of arrangement of the rolling elements 5. As a result, the respective output signals a and b of the two strain sensors 22A and 22B has a phase difference of 180° from each other and, hence, the average value which is obtained as the sum thereof is of a nature in which a component of change brought about by the passage of the rolling elements 5 has been cancelled. Also, the amplitude value which is obtained as the difference is a value in which the influence brought about by temperature and/or the influence brought about the surface slippage between the knuckle and the flange has been counterbalanced.

It is to be noted that in the instance as shown in FIG. 14, the distance between the contact fixing segments 21*a* which are positioned at the opposite ends, respectively, has been set to be equal to the pitch P of arrangement of the rolling elements and the strain sensors 22A and 22B have been each arranged at the position intermediate between the neighboring contact fixing segments 21*a* so that the distance between the two strain sensors 22A and 22B in the circumferential direction could be chosen to be about one half of the pitch P of arrangement of the rolling elements 5. However, separate from that described above, the distance between the two strain sensors 22A and 22B in the circumferential direction may be directly set to be one half of the pitch P of arrangement of the rolling elements 5.

In such case, the distance between the two strain sensors 22A and 22B in the circumferential direction may be set to a value which is the pitch P of arrangement of the rolling elements 5 multiplied by [½+n], wherein n represents an integer, or approximating to those values. Even in this case, the average value which can be obtained as the sum of the output signals a and b of the strain sensors 22A and 22B will be the value in which the component of change brought about by the passage of the rolling elements 5 is cancelled and the amplitude value which can be obtained as the difference will be the value in which the influence brought about by temperature and/or the influence brought about by the surface slippage between the knuckle and the flange has been counterbalanced.

Hereinafter, first to third applications, in which does not require the use of the load estimation processing section 30 forming one of subject matters of the present invention will be described. Where the strain gauge is pasted to the outer ring flange as is the case with the previously discussed patent document 1 listed above, there is a problem associated with assemblability. Also, the detecting sensitivity is low and the load cannot be detected with a high accuracy.

In view of the above, in the practice of any one of the foregoing first and second embodiments of the present invention, the sensor units 20, 20A have been shown and described as fitted to the outer diametric surface of the outer member 1 and those sensor units 20, 20A have been shown and described as each made up of the strain generating member 21 and one or more strain sensors 22, 22A and 22B, so that the assemblability onto the bearing unit, the load detecting sensitivity and the load accuracy could have been increased.

However, where the average value and the amplitude value are calculated from the output signal of the strain sensor and the load is estimated using those two values, the necessity arises that the bearing unit is rotating and the rolling elements are rotating around the rolling surfaces in order to determine the average value and the amplitude value and, hence, there arises a problem that at the time of halt or at the time of an extremely low speed condition, the error tends to increase.

In contrast thereto, the previously described second embodiment has been so designed and so configured that the load acting on the wheel support bearing assembly can be estimated from the sum (average value) of the output signals of the two strain sensors 22A and 22B and, therefore, not only can the influence brought about by the rolling elements 5, which appear in the output signal of each of the strain sensors 22A and 22B, be counterbalanced, but also the load can be detected with a high accuracy even at the time the bearing unit does not turn favorably.

Figure 48:
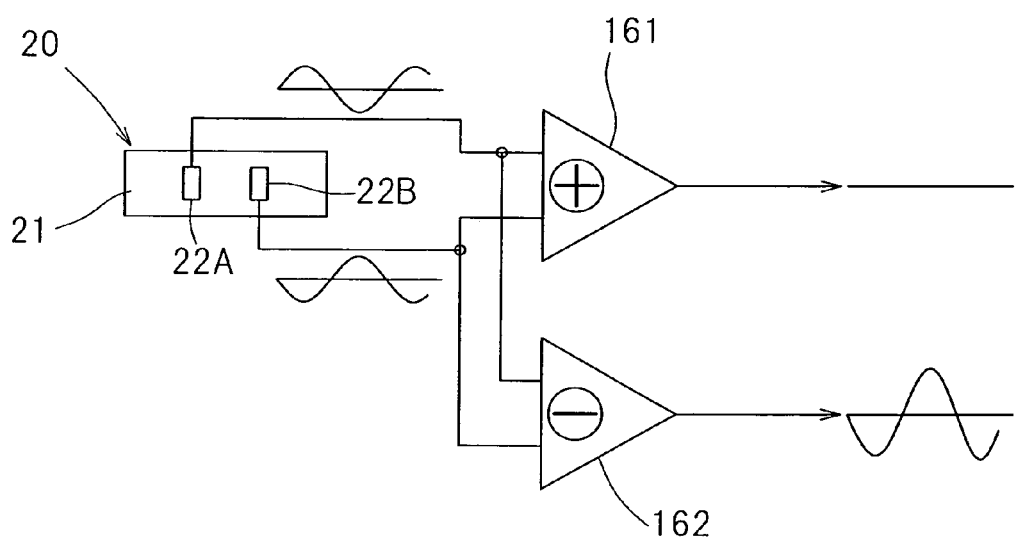
FIG. 48 is a block diagram showing an example of a calculating circuit for calculating the average value and the amplitude value of the sensor output signal.

Also, since in the second embodiment described previously, the load acting on the wheel support bearing assembly is estimated from the difference (amplitude value) of the respective output signals of the two strain sensors 22A and 22B in each of the sensor units 20A, the influence brought about by temperature in the output signal of each of the strain sensors 22A and 22B and/or the influence brought about by the surface slippage between the knuckle and the flange in such output signal of each of the strain sensors 22A and 22B can be counterbalanced and the load can therefore be detected accurately. FIG. 48 illustrates one example of a calculation processing circuit for determining the sum and the difference of the respective output signals of the previously described two strain sensors 22A and 22B. In such case, however, in the calculation for determining the amplitude value, at least an output signal of one cycle is needed and, therefore, delay in response is unavoidable.

In view of the above, an object of each of the first to third applications as will be described in detail subsequently is to provide a sensor equipped wheel support bearing assembly capable of accurately estimating the load acting on the vehicle wheel with a swift response even when the wheel support bearing assembly is halted or held in a low speed condition.

Figure 15:
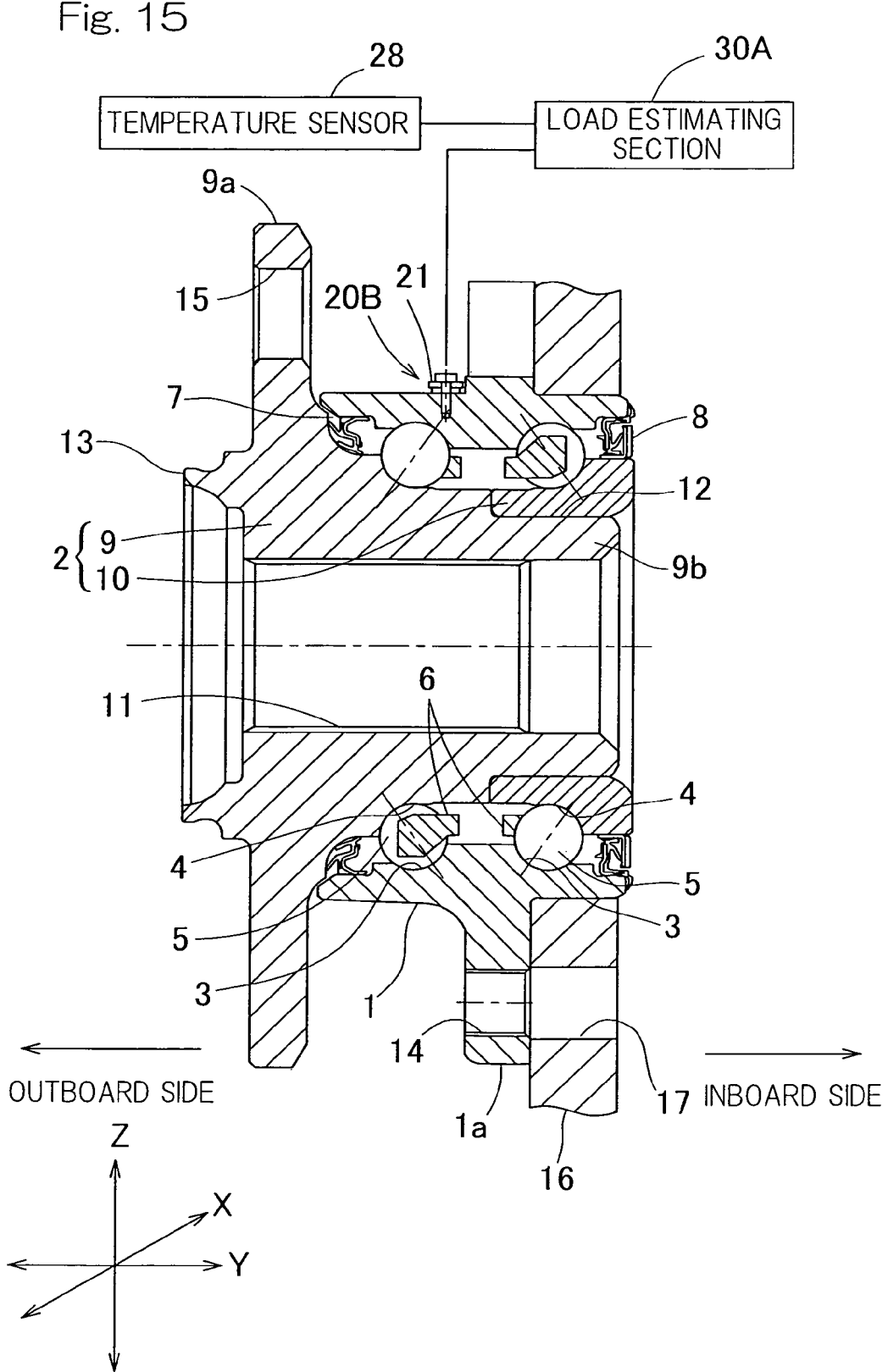
FIG. 15 is a diagram showing a sectional view of the sensor equipped wheel support bearing assembly according to a first application of the present invention, shown together with a block diagram of a conceptual construction of the detecting system therefor.
Figure 16:
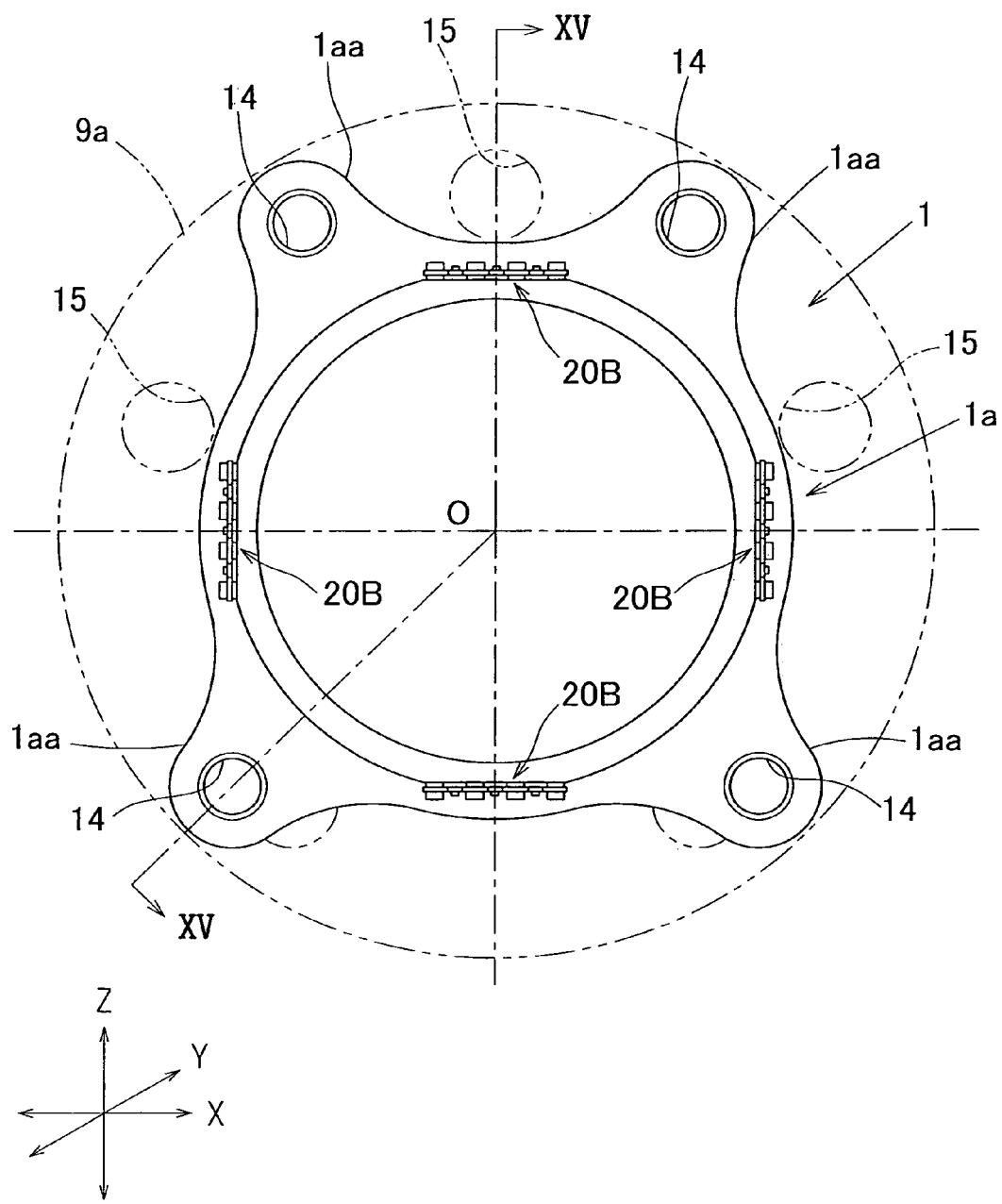
FIG. 16 is a front elevational view showing the outer member, employed in the sensor equipped wheel support bearing assembly in FIG. 15, as viewed from an outboard side.
Figure 17:
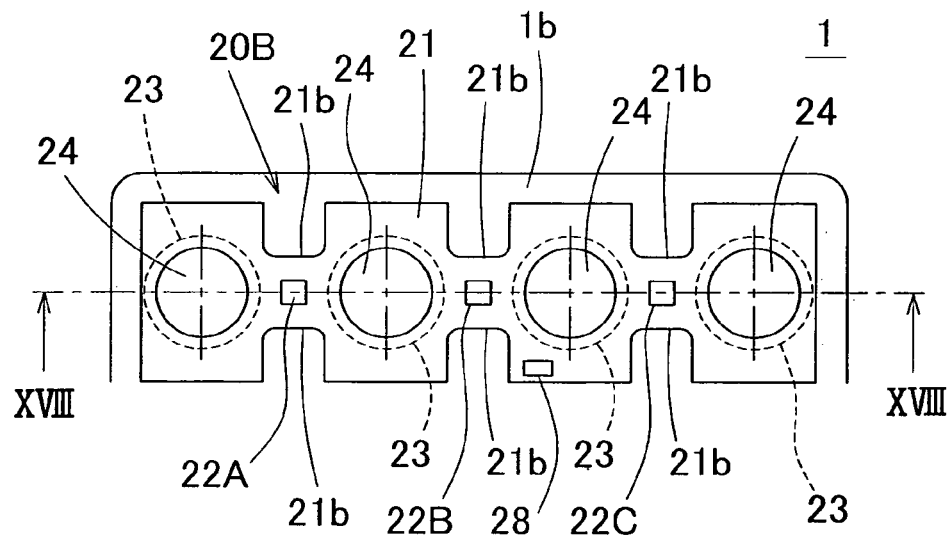
FIG. 17 is an enlarged plan view of the sensor unit employed in the sensor equipped wheel support bearing assembly in FIG. 15.
Figure 18:
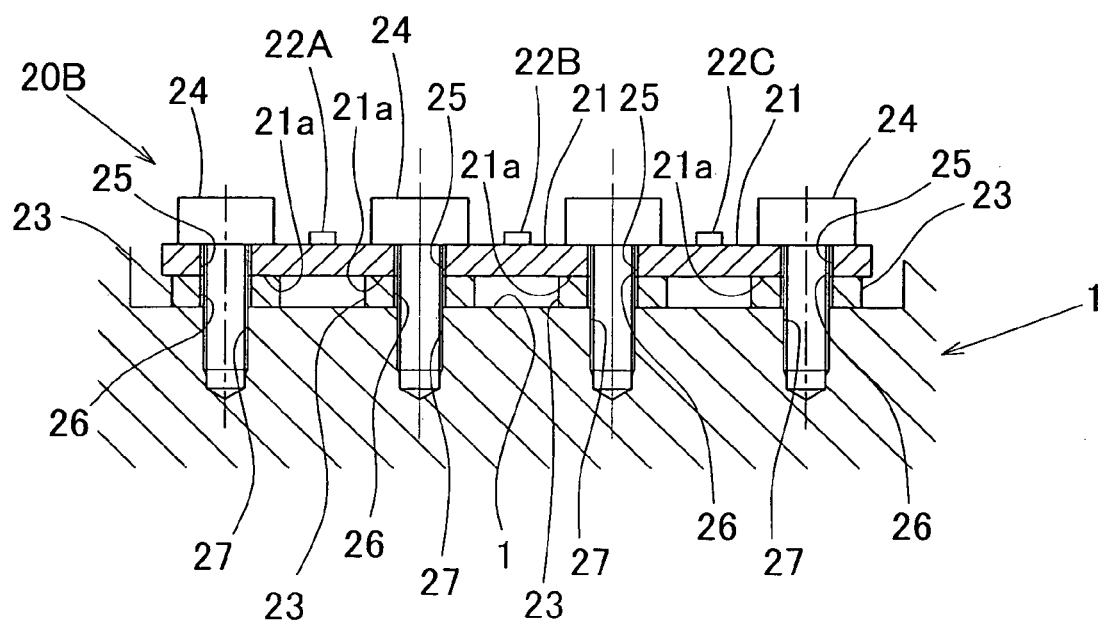
FIG. 18 is a cross sectional view taken along the line XVIII-XVIII in FIG. 17.
Figure 19:
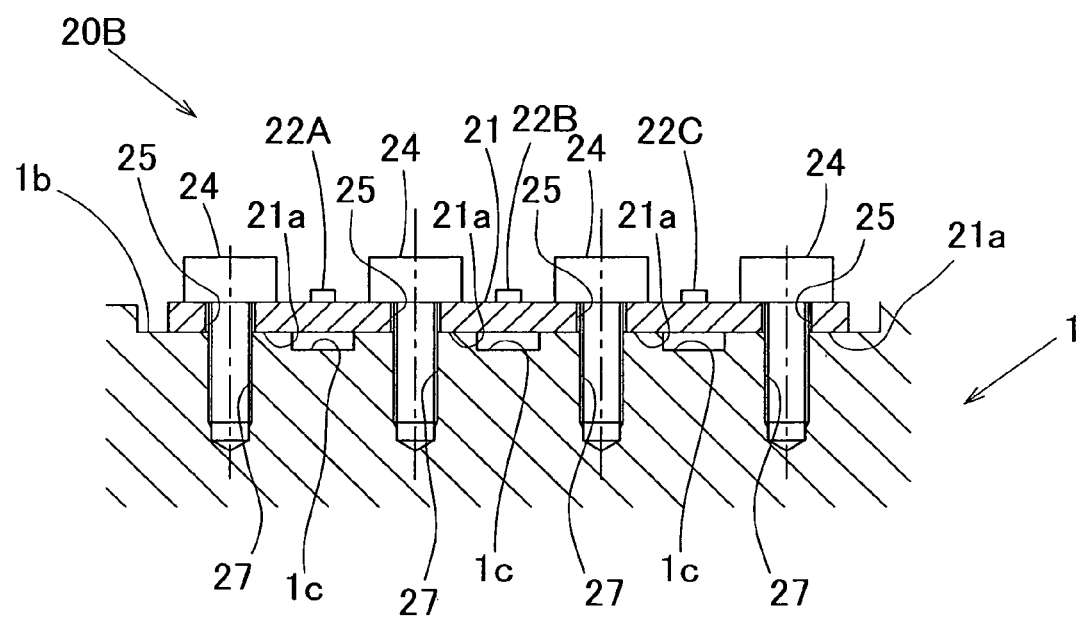
FIG. 19 is a sectional view showing another example of installation of the sensor unit.

The first application of the present invention will now be descried with particular reference to FIGS. 15 to 22. In particular, FIG. 16 illustrates a front elevational view of the outer member 1 of the wheel support bearing assembly as viewed from the outboard side and FIG. 15 illustrates a cross sectional view taken along the line XV-XV in FIG. 16. FIGS. 17 to 19 correspond respectively to FIGS. 3 to 5 that form parts of the drawings illustrating the first embodiment of the present invention.

To describe more specifically, as best shown in FIG. 15, in place of the load estimation processing section 30 shown in FIG. 1, a load estimating section 30A is employed in the practice of the first application. Also, as best shown in FIG. 16, in place of the four sensor units 20 shown in FIG. 2, four sensor units 20B are employed in the practice of the first application. As shown in FIG. 17, each of the sensor units 20B makes use of three strain sensors 22A, 22B and 22C in place of the strain sensor 22 shown in FIG. 3 and the shape of each of the strain generating members 21A is also more compli- cated than that of the strain generating member 21 shown in FIG. 3. Similarly, as best shown in FIG. 18, since the three strain sensors 22A, 22B and 22C are provided, the number of bolt insertion holes 25 and 26, the number of the bolts 24 and the number of the contact fixing segments 21a are all increased as compared with those shown in and described with particular reference to FIG. 4. Also, as best shown in FIG. 19, since in place of the strain sensor 22 shown in FIG. 5, the three strain sensors 22A, 22B and 22C are employed, the number of the grooves 1c, the number of the bolts 24, the number of the bolt insertion holes 25, the number of the threaded holes 27 and the number of the contact fixing segments 21a are all increased as compared with those shown and described with particular reference to FIG. 3. Other structural features than those described above are common and component parts similar to those shown in FIGS. 1 to 8 in connection with the previously described first embodiment of the present invention are designated by like reference and, therefore, the details thereof are not reiterated for the sake of brevity.

In this first application, the sensor unit 20B includes, as shown in FIGS. 17 and 18 showing an enlarged top plan view and an enlarged sectional view, respectively, the strain generating member 21 and the three strain sensors 22A, 22B and 22C fitted to the strain generating member 21 for detecting the strain occurring in the strain generating member 21. The strain generating member 21 is in the form of a thin plate member as is the case with that in the previously described first embodiment and has a strip shape of a uniform width over the entire length thereof in a plan view, with cutouts 21b formed at its opposite side edge portions. Each of the cutouts 21 referred to above has corners rendered to represent an arcuately sectioned shape. Also, The strain generating member 21 has four or more (four, in the illustrated instance) contact fixing segments 21a that are fixed to the outer diametric surface of the outer member 1 through respective spacers 23 in contact therewith. The four contact fixing segments 21a are arranged in a row conforming to the lengthwise direction of the strain generating member 21. The three strain generating members 22A, 22B and 22C are positioned at respective locations on the strain generating member 21, where the strain is large relative to the load acting in various directions. More specifically, they are arranged at the respective locations between the neighboring contact fixing segments 21a on an outer surface side of the strain generating member 21.

The cutouts 21b are formed at three locations on the opposite side edges of the strain generating member 21, which correspond respectively to the sites of installation of the strain sensors 22A, 22B and 22C. Accordingly, the strain sensors 22A, 22B and 22C detect respective strains acting in the lengthwise direction around the associated cutouts 21b in the strain generating member 21.

Other than that, as best shown in a sectional view in FIG. 19, the grooves 1c are each formed at an intermediate portion of the strain generating member 21 on the outer diametric surface of the outer member 1 between the neighboring sites where the associated contact fixing segments 21a are fixed to the outer diametric surface of the outer member, such that the use of the spacers 23 can be dispensed with and, at the same time, those intermediate portions between the neighboring contact fixing segments 21a in the strain generating member 21, where the cutouts 21b are located, can be spaced from the outer diametric surface of the outer member 1.

For each of the strain sensors 22A, 22B and 22C, a sensor similar to the strain sensor 22 employed in the practice of the previously described first embodiment can be employed.

The strain sensors 22A, 22B and 22C in each of the sensor units 20B are connected with the load estimating section 30A (best shown in FIG. 15) for estimating the load acting on the vehicle wheel from respective output signals thereof. In the instance now under discussion, the vertically acting load Fz acting in a vertical direction of the vehicle wheel, the load Fx which will become the driving force or the braking force, and the axially acting load Fy acting on in the axial direction can be estimated. This load estimating section 30A includes, as shown in a block diagram of FIG. 22, an average value calculator 131, an amplitude value calculator 132 and a load calculator 133. It is to be noted that although only one average value calculator 131 and only one amplitude calculator 132 are shown in the drawing, but each of the calculators 131 and 132 are in practice employed in a plural number one for each of the sensor units 20B.

Figure 20:
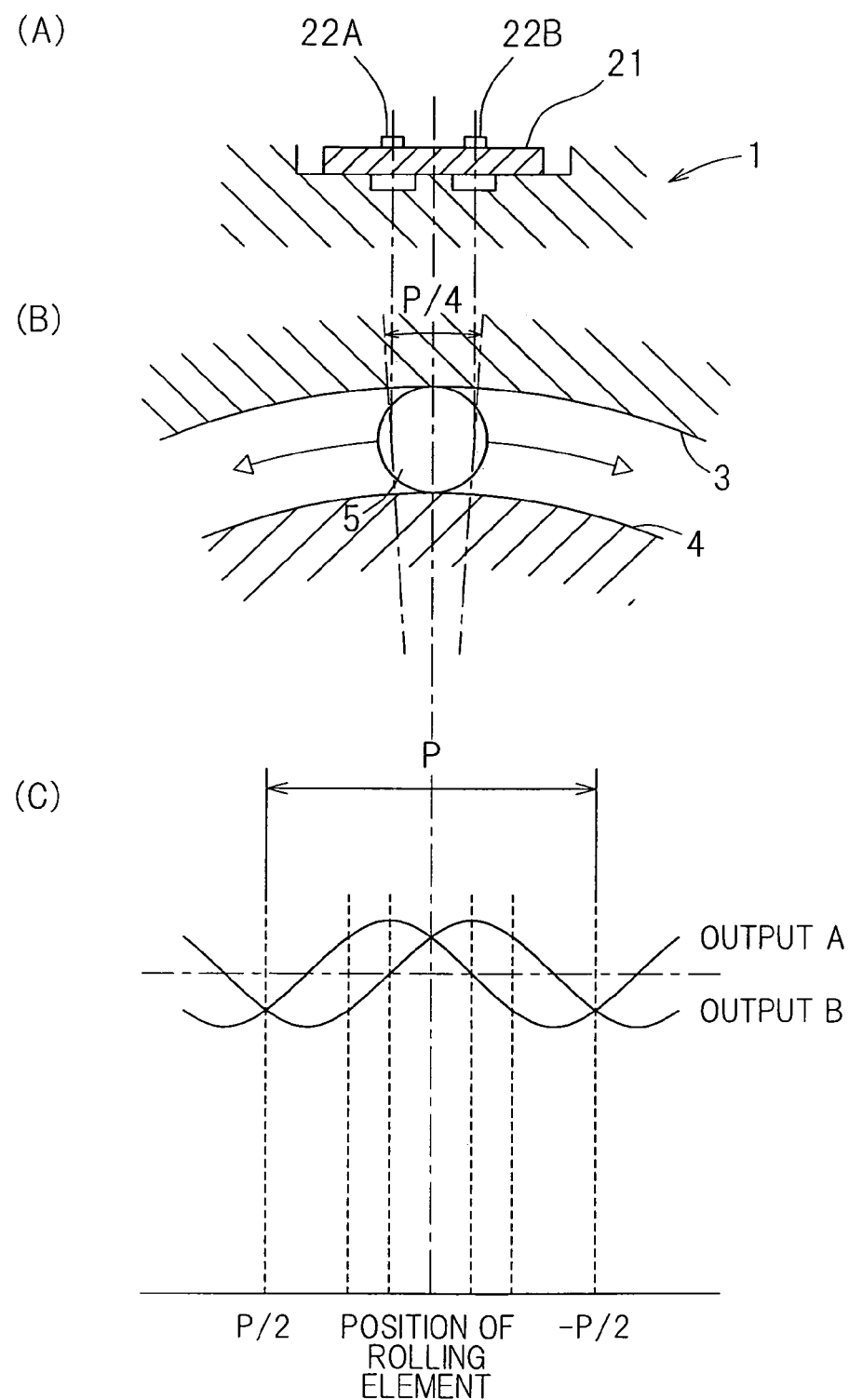
FIG. 20 is explanatory diagram used to explain an example of how the position of rolling elements affects an output signal from the sensor unit.

Since the sensor unit 20B is provided at an axial position which will become the vicinity of the rolling surface 3 of the outboard row in the outer member 1, the respective output signals of the strain sensors 22A, 22B and 22C tend to be affected by the rolling elements 5 moving in the vicinity of the site of installation of the sensor unit 20B. In other words, as the rolling elements 5 move past the position closest to the strain sensors 22A, 22B and 22C in the sensor unit 20B, those output signals attain the maximum value, but as the rolling elements 5 move away from that position, they decrease. Accordingly, during the rotation of the bearing unit, the respective output signals of the strain sensors 22A, 22B and 22C represent a waveform approximating to the sinusoidal wave, which changes cyclically, as shown in FIG. 20, diagram C or FIG. 21, diagram C, at the cycle determined by the pitch P of arrangement of the rolling elements 5.

Figure 21:
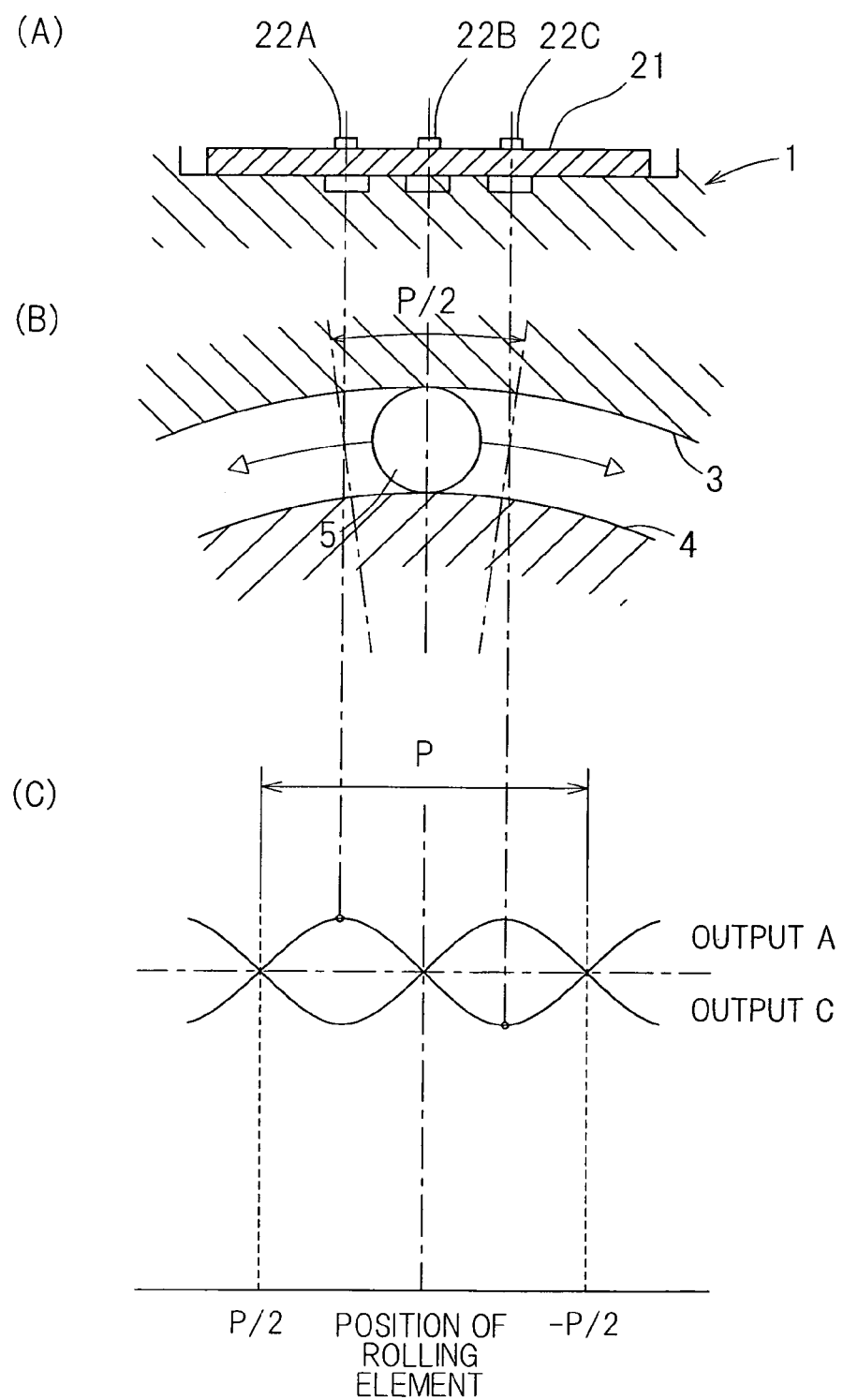
FIG. 21 is an explanatory diagram used to explain another example of how the position of rolling elements affects an output signal from the sensor unit.

In the instance now under discussion, the distance between the neighboring strain sensors 22A, 22B and 22C is chosen to be one fourth (90° in phase difference) of the pitch P of arrangement of the rolling elements 5 as shown in FIG. 21. Accordingly, the distance between the left strain sensor 22A and the right strain sensor 22C is one half (180° in phase difference) of the pitch P of arrangement of the rolling elements 5. FIG. 20 illustrates the relation between the position of the rolling element and the waveforms of the respective output signals A and B of the two strain sensors 22A and 22B which are spaced a distance equal to one fourth of the pitch P of arrangement of the rolling elements 5. A similar relation establishes between the position of the rolling element and the waveforms of the respective output signals B and C of the other two strain sensors 22B and 22C. On the other hand, FIG. 21 illustrates the relation between the position of the rolling element and the respective output signals A and C of the two strain sensors 22A and 22B, which are spaced a distance equal to one half of the pitch P of arrangement of the rolling elements 5.

The average value calculator 131 is a calculator for determining the average value of the output signal of the sensor unit 20B from the respective output signals A and C of the two strain sensors 22A and 22C. The amplitude value calculator 132 is a calculator for determining the amplitude of the output signal of the sensor unit 20B from the respective output signals B and C of the two strain sensors 22B and 22C and the average value determined by the average value calculator 131. Assuming that the phase of the position of the rolling elements 5 is θ, the output signals A, B and C are given by the following equations:

$$A = \alpha \sin\theta + \beta \quad (1)$$

$$B = \alpha \cos\theta + \beta \quad (2)$$

$$C = -\alpha \sin\theta + \beta \quad (3)$$

wherein α represents the amplitude value and β represents the average value.

Accordingly, in the average calculator 131, by determining the sum of the output signal A and the output signal C, that is, by performing the following equation (4), the average value is determined.

$$\beta = (A+C)/2 \quad (4)$$

Also, in the amplitude calculator 132, by excluding the average value β from the two output signals B and C and then determining the square root of the square sum of those values, that is, performing the calculation expressed by the following equation (5), the amplitude value α is determined.

$$\alpha = [(B-\beta)^2 + (C-\beta)^2]^{1/2} \quad (5)$$
$$= [(\alpha\cos\theta)^2 + (\alpha\sin\theta)^2]^{1/2}$$

It is to be noted that a similar result can be obtained even when the output signals A and B are utilized in this calculation.

Those calculations can be determined in a matter of minutes regardless of the position of the rolling elements 5. In other words, even when the bearing unit is halted or held at an extremely low speed condition, they can be determined with a good response.

The average value calculator 131 includes a temperature correcting section 134 for correcting the drift resulting from temperature of the calculated value so determined. The strain generating member 21 in each of the sensor units 20 is provided with such a temperature sensor 28 as shown in FIG. 17 and, based on an output signal of this temperature sensor 28, the average value is corrected in the temperature correcting section 134.

Figure 22:
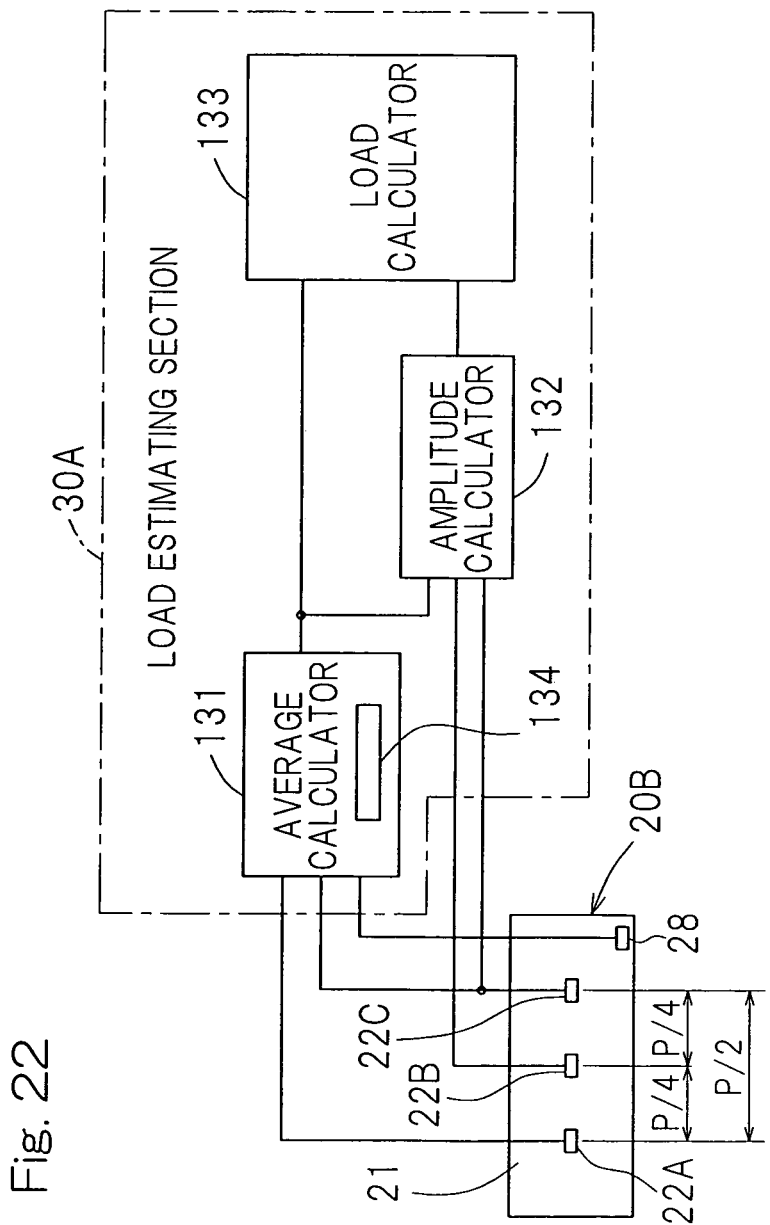
FIG. 22 is a block diagram showing an example of construction of a load estimating section employed in the sensor equipped wheel support bearing assembly.

In the load calculator 133 shown in FIG. 22, using the average value and the amplitude value corresponding to each of the sensor units 20B determined by the average value calculator 131 and the amplitude value calculator 132, respectively, as variables, the load acting on the vehicle wheel is calculated and estimated from a predetermined load equation, in which those variables are multiplied by a correction coefficient. For the load calculating equation in this case, there are provided that for calculating the vertically acting load Fz, that for calculating the forward and rearward acting load Fx which will become the driving force or the braking force, and that for calculating the axially acting load Fy. The value of the correction coefficient in each of those calculating equations is determined and set by means of a series of experiments and/or simulations beforehand.

When the load acts between the wheel tire on the vehicle wheel and the road surface, such load is applied also to the outer member 1 serving as the stationary member in the wheel support bearing assembly, resulting in deformation. In the instance now under discussion, since the four or more contact fixing segments 21a of the strain generating member 21 in each of the sensor units 20B are fixed to the outer member 1 in contact therewith, the strain occurring in the outer member 1 is apt to be transmitted to the strain generating member 21 after having been amplified and, hence, such strain is detected by the strain sensors 22A, 22B and 22C with a high sensitivity.

In particular, since in the load estimating section 30A shown in FIG. 22, by the average value calculator 131, the average value of the output signal of the sensor unit 20B is determined from the respective output signals A and C of the two strain sensors 22A and 22C in the sensor unit 20B; by the amplitude value calculator 132, the amplitude value of the output signal of the sensor unit 20B is determined from the average value and the respective output signals B and C of the two strain sensors 22B and 22C in the sensor unit 20B; and, in the load calculator 133, the loads Fz, Fx and Fy acting on the vehicle wheel is estimated by a calculating process utilizing the average value and the amplitude value, the load acting on the vehicle wheel can be accurately estimated with a good response even when the wheel support bearing assembly is halted or held at a low speed condition. Accordingly, the response and controllability of the vehicle control utilizing the estimated load values can be increased, accompanied by a further increase in safety and traveling stability.

Since in the first application described above, the four sensor units 20B are employed and disposed so as to assume the top, bottom, right and left positions, respectively, relative to the tire tread in a fashion equidistantly spaced 90° in phase difference from each other in a circumferential direction, the vertically acting load Fz which will act on the wheel support bearing assembly, the load Fx which will become the driving force or the braking force, and the axially acting load Fy can be estimated.

Also, since the temperature sensor 28 is provided in each of the sensor units 20B and, in the average value calculator 131 in the load estimating section 30A, the temperature dependent drift of the average value is corrected on the basis of the output signal of the temperature sensor by the temperature correcting section 134, the temperature dependent drift of the average value can be corrected.

Figure 23:
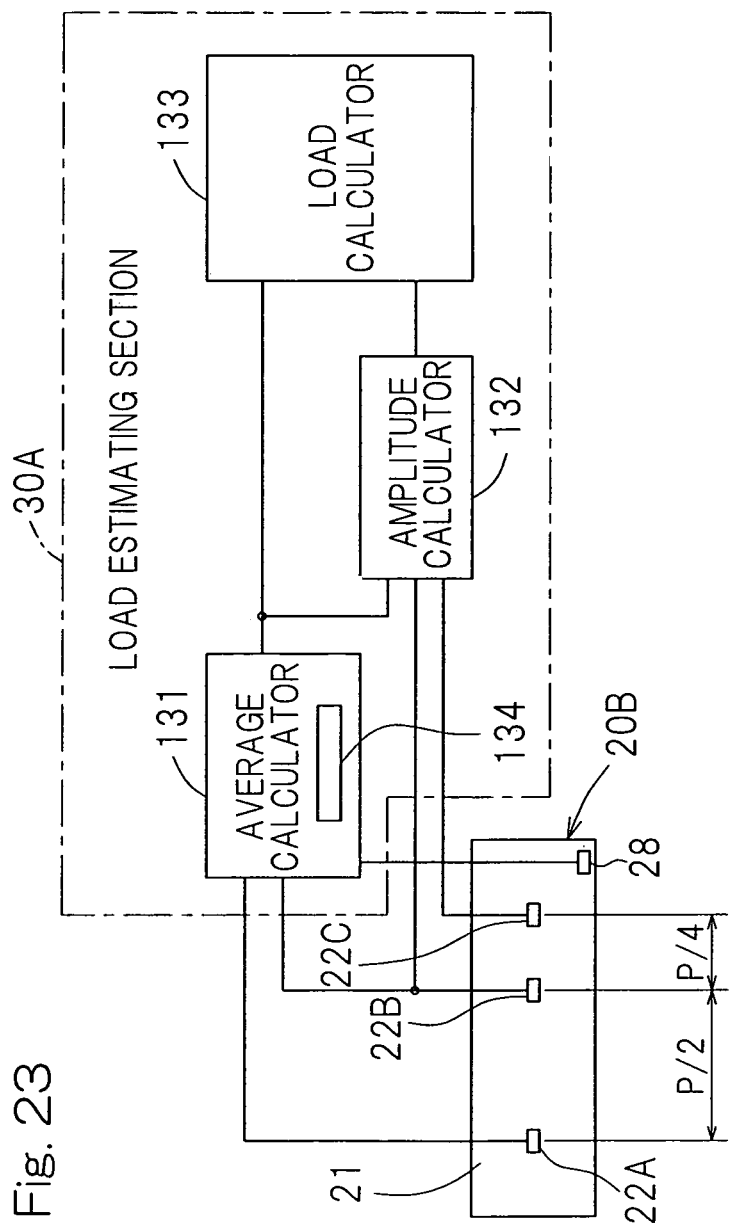
FIG. 23 is a block diagram showing another example of construction of the load estimating section employed in the sensor equipped wheel support bearing assembly according to a second application.

FIG. 23 illustrates a second application of the present invention. In the sensor equipped wheel support bearing assembly according to this second application, in the arrangement of the strain sensors 22A, 22B and 22C in each of the sensor units 20B, the distance between the left strain sensor 22A and the strain sensor 22B at the intermediate position is chosen to be one half of the pitch P of arrangement of the rolling elements and the distance between the intermediate strain sensor 22B and the right strain sensor 22C are chosen to be one fourth of the pitch P of arrangement of the rolling elements. Also, in the average value calculator 131 in the load estimating section 30A, the average value of the output signals of the sensor unit 20B is determined from the output signal A of the left strain sensor 22A and the output signal B of the strain sensor 22b at the intermediate position and, in the amplitude value calculator 132, the amplitude value of the output signal of the sensor unit 20B is determined from the average value and the output signal B of the strain sensor 22B at the intermediate position and the output signal C of the right strain sensor 22C. Other structural features are similar to those in the previously described first application.

Figure 24:
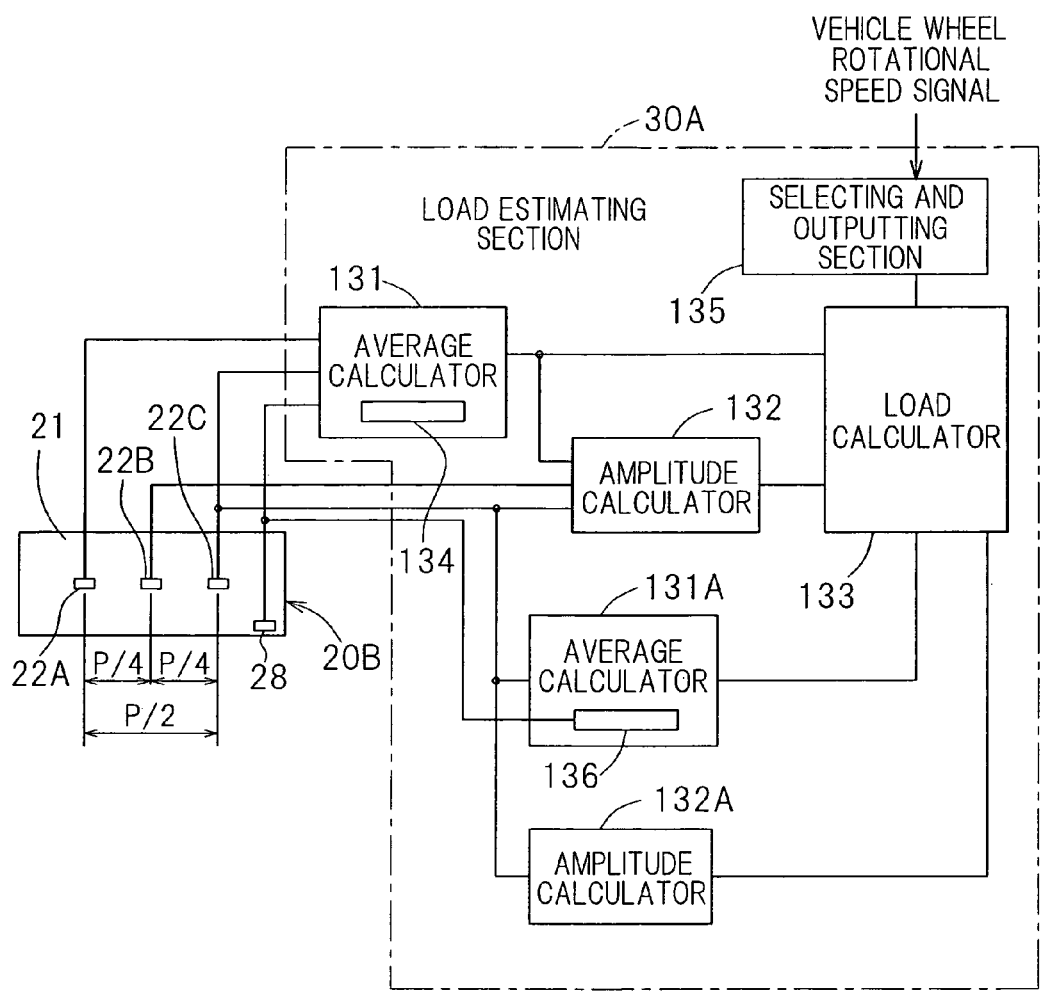
FIG. 24 is a block diagram showing another example of construction of the load estimating section employed in the sensor equipped wheel support bearing assembly according to a third application.
Figure 25:
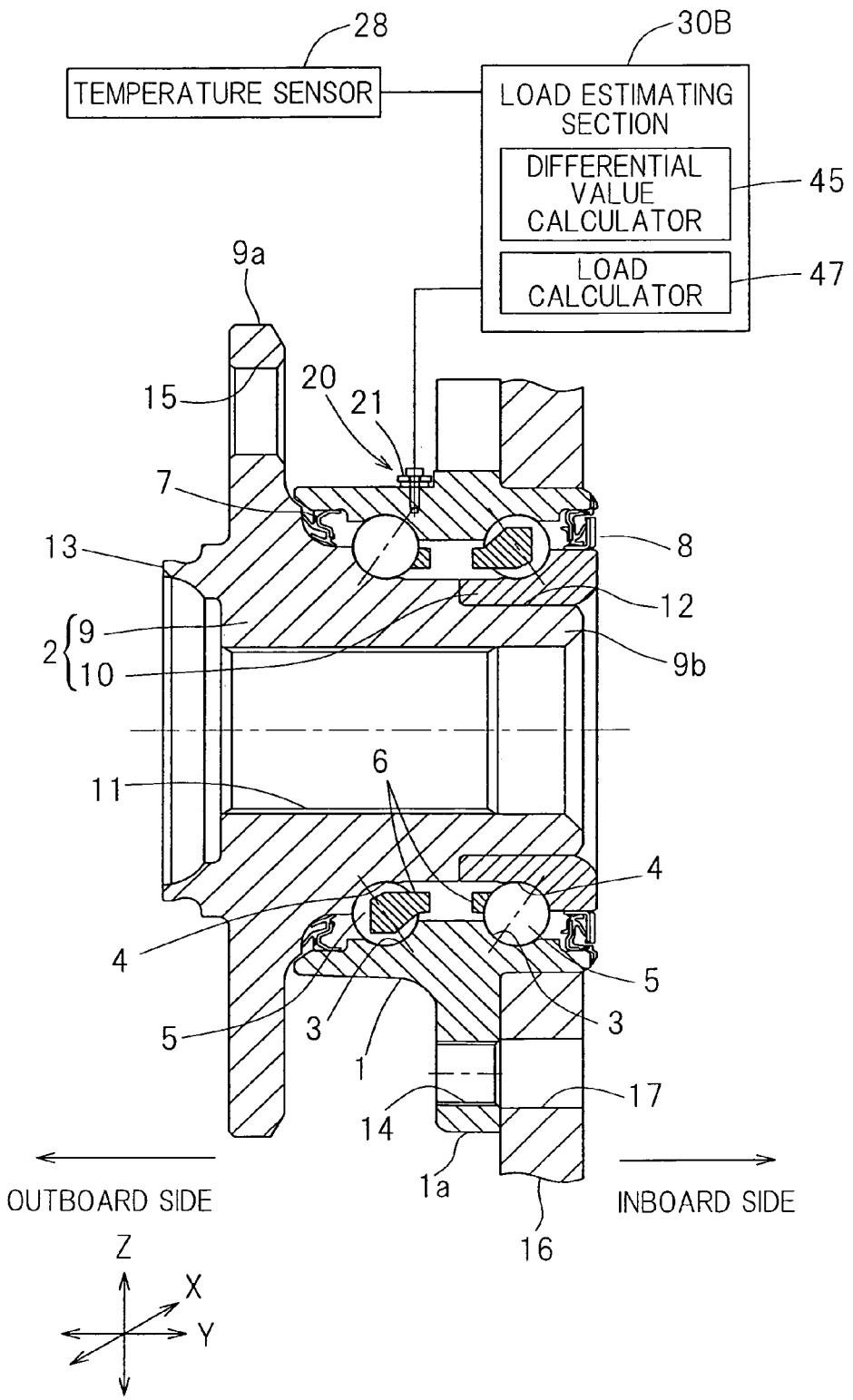
FIG. 25 is a diagram showing a sectional view of the sensor equipped wheel support bearing assembly according to a fourth application of the present invention, shown together with a block diagram of a conceptual structure of the detecting system therefor.

FIG. 24 illustrates a third application of the present invention. In the sensor equipped wheel support bearing assembly according to the third application, in the load estimating section 30A employed in the first application shown in and described with particular reference to FIGS. 15 to 22, the use is made of a second average calculator 131A and a second amplitude value calculator 132A, further to previously described the first average value calculator 131 and the first amplitude value calculator 132, and a selecting and outputting section 135. The second average value calculator 131A and the second amplitude value calculator 132A are calculators for determining the average value and the amplitude value, respectively, of the output signal of the sensor unit 20B from the output signal in a plurality of cycles determined by the pitch of arrangement of the rolling elements of one of the strain sensor (the strain sensor 22C, in the instance now under discussion) of the sensor unit 20. The average value calculator 131A includes a temperature correcting section 136 and, by this temperature correcting section 136, the temperature dependent drift of the average value can be corrected in a manner similar to that by the first average value calculator 131 described hereinbefore. The second average value calculator 131A and the second amplitude value calculator 132A in this case are also provided in a plural number, each one in each of the sensor units 20B.

As hereinabove described, in order to determine the average value and the amplitude value from the output signal of one strain sensor, data over a plurality of cycles are needed as the output signal. For this reason, the response is lowered down to a value lower than that afforded when they are determined by the first average value calculator 131 and the first amplitude value calculator 132. In view of this, calculations by the second average value calculator 131A and the second amplitude calculator 132A are so recommended as to be performed when the rotational speed of the vehicle wheel is higher than a predetermined value. This predetermined value is a speed at which the second average value calculator 131A and the second amplitude value calculator 132A can detect more accurately than the first average value calculator 131 and the first amplitude value calculator 132 and, more specifically, it is a speed equal to or lower than about the human walking speed.

In the load calculator 133, using the average value and the amplitude value corresponding to each of the sensor units 20B that are determined by the second average value calculator 131A and the second amplitude value calculator 132A, a process of calculating and estimating the load acting on the vehicle wheel from a predetermined load calculation, in which those variables are multiplied by the correction coefficient, is performed. In other words, in the load calculator 133, the load estimation with the use of the average value and the amplitude value, which are determined by the first average value calculator 131 and the first amplitude value calculator 132, respectively, and the load estimation with the use of the average value and the amplitude value, which are determined by the second average value calculator 131A and the second amplitude value calculator 132A, respectively, took place collaterally.

The selecting and outputting section 135 is a section operable to output one of two estimated load values, which are obtained by the calculating processes in the load calculator 133, after having selected such one of the two estimated load values according to the vehicle wheel rotating speed. To this selecting and outputting section 135, information on the vehicle wheel rotational speed is inputted from, for example, the outside and the selecting and outputting of the estimated load value is carried out based on this information. The term "outside" referred to above means the outside relative to the sensor equipped wheel support bearing assembly. In such case, as the information on the vehicle wheel rotational speed from the outside, the use may be made of a rotation sensor signal such as for example, an ABS sensor from the side of the vehicle body (a rotation detecting sensor used in the anti-lock brake system for detecting the rotational speed of the vehicle wheel), so that the vehicle wheel rotational speed can be estimated. Also, arrangement may be made that from a host control device connected with the intra-vehicle communication bus inside the vehicle body, in place of the information on the vehicle wheel rotational speed, the selecting and outputting section 135 can receive a switching and selecting command. Moreover, as the information on the vehicle wheel rotational speed, the vehicle wheel rotational speed may be estimated by detecting the frequency of passage of the rolling elements 5 from the respective output signals A, B and C of the strain sensors 22A, 22B and 22C.

The first to third applications hereinabove described includes the following applied mode group I (modes 1 to 12), in which the load estimation processing section 30, which is essential in the embodiments according to the present invention, is not required.

[Mode 1]

The sensor equipped wheel support bearing assembly according to the mode 1 is a wheel support bearing assembly for rotatably supporting a vehicle wheel relative to a vehicle body, which includes an outer member 1 having its inner periphery formed with a plurality of rows of raceway surfaces 3, an inner member having an outer periphery formed with raceway surfaces 4 in face-to-face relation with the raceway surfaces 3, and a plurality of rows of rolling elements 5 interposed between the raceway surfaces 3 in the outer member 1 and the raceway surface 4 in the inner member 2, in which a plurality of sensor units 20B are provided on an outer diametric surface of one of the outer member 1 and the inner member 2, which serves as a stationary member; each of the sensor units 20B includes a strain generating member 21 having four or more contact fixing segments 21a, which are fixed to the outer diametric surface of the outer diametric surface of the stationary member in contact therewith, and three or more sensors 22A, 22B and 22C fitted to the strain generating member 21 for detecting a strain induced in the strain generating member 21; and a load estimating section 30A for estimating a load acting on a vehicle wheel from a sensor output signal of the sensor unit 20B. The load estimating section 30A includes an average value calculator 131 for determining the average value of the output signal from respective output signals of at least two of the sensors in each of the sensor units 20B and an amplitude value calculator 132 for determining the amplitude of the output signal of the sensor unit 20B from the average value and the respective output signals of the at least two sensors, and a load estimator 133 for estimating the load acting on the vehicle wheel through a calculating process utilizing the average value and the amplitude value.

According to the above described construction, in the load estimating section 30A, the average value of the output signal of the sensor unit 20B is determined by the average value calculator 131 from the two sensor output signals in each of the sensor units 20B; the amplitude value of the output signal of the sensor unit 20B is determined by the amplitude value calculator 132 from the respective output signals of the two sensors in each of the sensor units 20B; and the load acting on the vehicle wheel is estimated by the load calculator 133 through the calculating process utilizing the average value and the amplitude value. For this reason, even when the wheel support bearing assembly is halted or held at a low speed condition, the load acting on the vehicle wheel can be accurately estimated with a high response. Also, since the load acting on the vehicle wheel can be quickly estimated, the response and the controllability in controlling the automotive vehicle utilizing the load so estimated as hereinabove described can be increased and the safety factor and the traveling stability can therefore be increased.

[Mode 2]

In the mode 1 described above, the sensor unit 20B referred to above is provided in three or more in number and the load estimating section 30A may be operable to estimate a radially acting load, acting in a direction radially of the wheel support bearing assembly, and an axially acting load, acting in a direction axially of the wheel support bearing assembly, from the sensor outputs of the three or more sensor units 20B.

[Mode 3]

In the mode 1 described above, the sensor units 20B may be disposed at upper, lower, right and left surface portion of the outer diametric surface of the stationary member, which correspond respectively to the top, bottom, right and left positions thereof relative to a tire tread, in a fashion equidistantly spaced 90° in phase difference from each other in a circumferential direction.

When the four sensor units 20B are arranged in the manner described above, a vertically acting load Fz, a load Fx which will become a driving force or a braking force, and an axially acting load Fy, all acting on the wheel support bearing assembly can be estimated.

[Mode 4]

In the mode 1 described above, at least two of the three or more sensors 22A, 22B and 22C in each of the sensor units 20B may be so spacedly as to be spaced a distance, which is equal to the pitch of arrangement of the rolling elements multiplied by a multiplication of $[n+\frac{1}{2}]$, n being an integer, so that the phase difference of the respective output signals may be 180°, in which case the average value calculator 131 of the load estimating section 30A is operable to calculate the sum of the respective output signals of the at least two sensors to cancel a component of change to thereby determine the average value.

[Mode 5]

In the mode 1 described above, at least two of the three or more sensors 22A, 22B and 22C in each of the sensor units 20B may be so spacedly as to be spaced a distance, which is equal to the pitch of arrangement of the rolling elements multiplied by $[n/2+\frac{1}{4}]$, n being an integer, so that the phase difference of the respective output signals may be 90°, in which case the amplitude value calculator 132 of the load estimating section 30A is operable to determine the amplitude value in the form of the square root of the square sum of the balances between the respective output signals of the at least two sensors less the average value.

[Mode 6]

In the mode 1 described above, a temperature sensor 28 may be provided in each of the sensor units 20B, in which case the average value calculator 131 of the load estimating section 30A corrects a temperature dependent drift of the average value based on an output signal of the temperature sensor 28. In the case of this construction, since the temperature dependent drift of the average value can be corrected, an estimated load error resulting from temperature can be reduced.

[Mode 7]

In the mode 1 described above, the load estimating section 30A may include a second average calculator 131A and a second amplitude value calculator 132A, further to the first average value calculator 131 and the first amplitude value calculator 132, for determining the average value and the amplitude value from the sensor output signal in a plurality of cycles of rolling element amplitudes of one of the sensors of the sensor unit 20B, where when the vehicle wheel rotational speed is higher than a predetermined value, the load calculator 133 estimates the load acting on the vehicle wheel through a calculating process utilizing the average value and the amplitude value that are determined by the second average value calculator 131A and the second amplitude value calculator 132A. The predetermined value referred to above is rendered to be a speed at which the second average value calculator 131A and the second amplitude value calculator 132A can detect more accurately than the first average value calculator 131 and the first amplitude value calculator 132 and, more specifically, it is a speed equal to or lower than about the human walking speed.

[Mode 8]

In the mode 7 described above, the load calculator 133 of the load estimating section 30A performs collaterally the calculating processes utilizing the average value and the amplitude value, which are determined by the first average value calculator 131 and the first amplitude value calculator 132, respectively, and a calculating process utilizing the average value and the amplitude value, which are determined by the second average value calculator 131A and the second amplitude value calculator 132A, respectively, and, along therewith, the use may be made of a selecting and outputting section 135 for outputting one of the two estimated load values, so that from the two estimated load values obtained by those two calculating processes, one of the estimated load values can be selected in accordance with the vehicle wheel rotational speed and be then outputted.

[Mode 9]

In the mode 8 described above, the selecting and outputting section 135 may be of a type capable of receiving information on the vehicle wheel rotational speed from outside. The term "outside" referred to previously means the outside relative to the sensor equipped wheel support bearing assembly.

[Mode 10]

In the mode 8 described above, the selecting and outputting section 135 may be of a type capable of estimating the vehicle wheel rotational speed by detection of the frequency of passage of the rolling elements from the output signal of the sensor. In the case of this construction, neither extra sensors nor wiring is required and the structure can be simplified.

[Mode 11]

In the mode 8 described above, the selecting and outputting section 135 may be of a type capable of estimating the vehicle wheel rotating speed from a rotation sensor signal supplied from a vehicle body side.

[Mode 12]

In the mode 8 described above, the selecting and outputting section 135 may be of a type capable of receiving from a control device on the vehicle body side, a switching and selection command appropriate to the vehicle wheel rotational speed.

Hereinafter, the fourth and fifth applications, which do not require the use of the load estimation processing section 30 employed in the practice of the present invention, will be described in detail.

As is the case with the previously described first application, as means for resolving the problems inherent in the patent document 1 referred to previously, the sensor equipped wheel support bearing assembly of the following construction has been suggested (in JP Patent Application No. 2008-207031). This suggested sensor equipped wheel support bearing assembly makes use of two sensor units each including a strain generating member and a strain sensor, the two sensor units being arranged on the outer diametric surface of the outer ring in a pair at respective positions spaced 180° in phase difference from each other. From the sum of two sensor output signals of the sensor unit pair, the axially acting load Fy acting on the wheel support bearing assembly is estimated and, from the difference between those two sensor output signals, the radially acting load (for example, the vertically acting load Fz or the load Fx which will become the driving force or the braking force) is estimated. Also, the two sensor units of one pair of the sensor units are disposed at the upper and lower surface portions of the outer diametric surface of the outer member so that from the differential value of the amplitudes of the sensor output signals of the sensor unit pair, the direction of the axially acting load Fy is discriminated and parameters of a calculating equation used in estimation of the axially acting load Fy are changed in dependence of the direction so discriminated.

Figure 49:
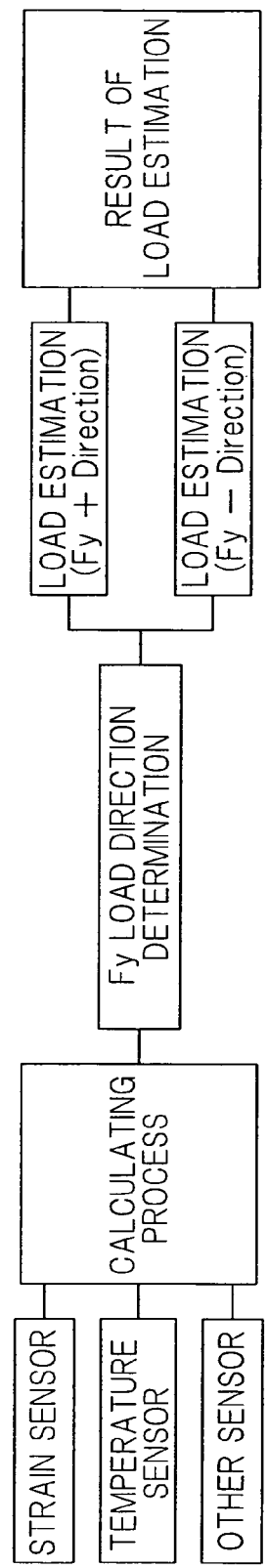
FIG. 49 is an explanatory diagram showing the flow of the load calculating process in the suggested example.
Figure 50:
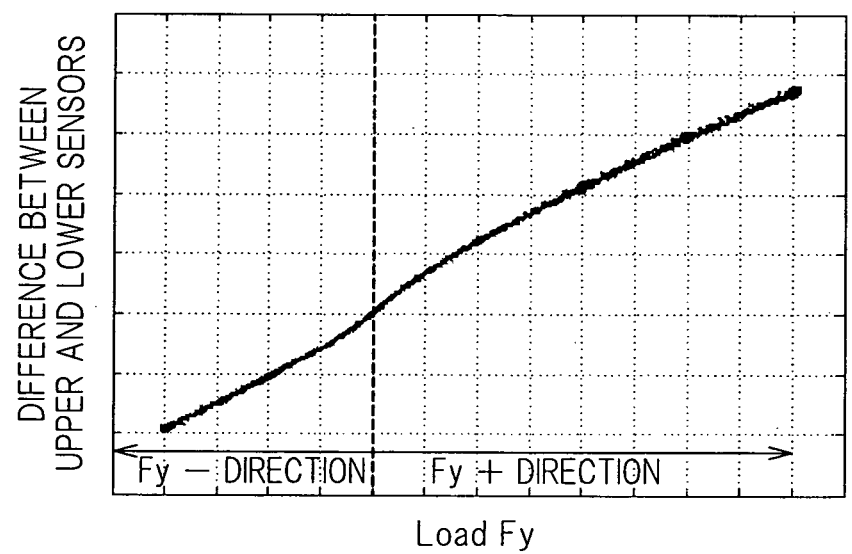
FIG. 50 is a graph showing the relation between the magnitude of the axially acting load and the differential value of the sensor outputs of the upper and lower sensor units.

FIG. 49 illustrates a block diagram showing the flow of the process of calculation of such axially acting load Fy. Referring to FIG. 49, in the calculation processing unit, various processes such as, for example, averaging of the sensor output signals, extraction of the amplitude and temperature correction are performed. FIG. 50 illustrates the relation between the differential value of the amplitudes of the sensor output signals of the sensor unit pair and the direction of the axially acting load Fy.

However, the sensor signal of the sensor unit referred to above responds linearly if the input load is within a small range, but responds non-linearly if it is a large axially acting load Fy such as occurring during the abrupt cornering. For this reason, assuming the linear relation during the calculation to estimate the input load from the sensor output signal of the sensor unit, there is a problem that the estimation error will become large at a region of the high axially acting load Fy.

This estimation error can be reduced if the non-linear relation is modeled, but this in turn brings about such a problem that parameters required for the estimation and calculation of the load will be increased, accompanied by a considerable increase of the amount of calculation. Also, particularly where a drift occurs in the sensor output signal of the sensor unit, a complicated calculation error is convoluted and, therefore, a problem will arise that it will become difficult to secure robustness against the drift.

An object of the fourth and fifth applications of the present invention is to provide a sensor equipped wheel support bearing assembly capable of correcting the non-linearity, contained in a strain response of the bearing unit through a simplified calculation to thereby reduce the load estimation error.

In the first place, the fourth application of the present invention will be described in detail with particular reference to FIGS. 25 to 31. Also, FIGS. 2 to 5 pertaining to the previously described first embodiment of the present invention are equally applicable to this application.

Figure 26:
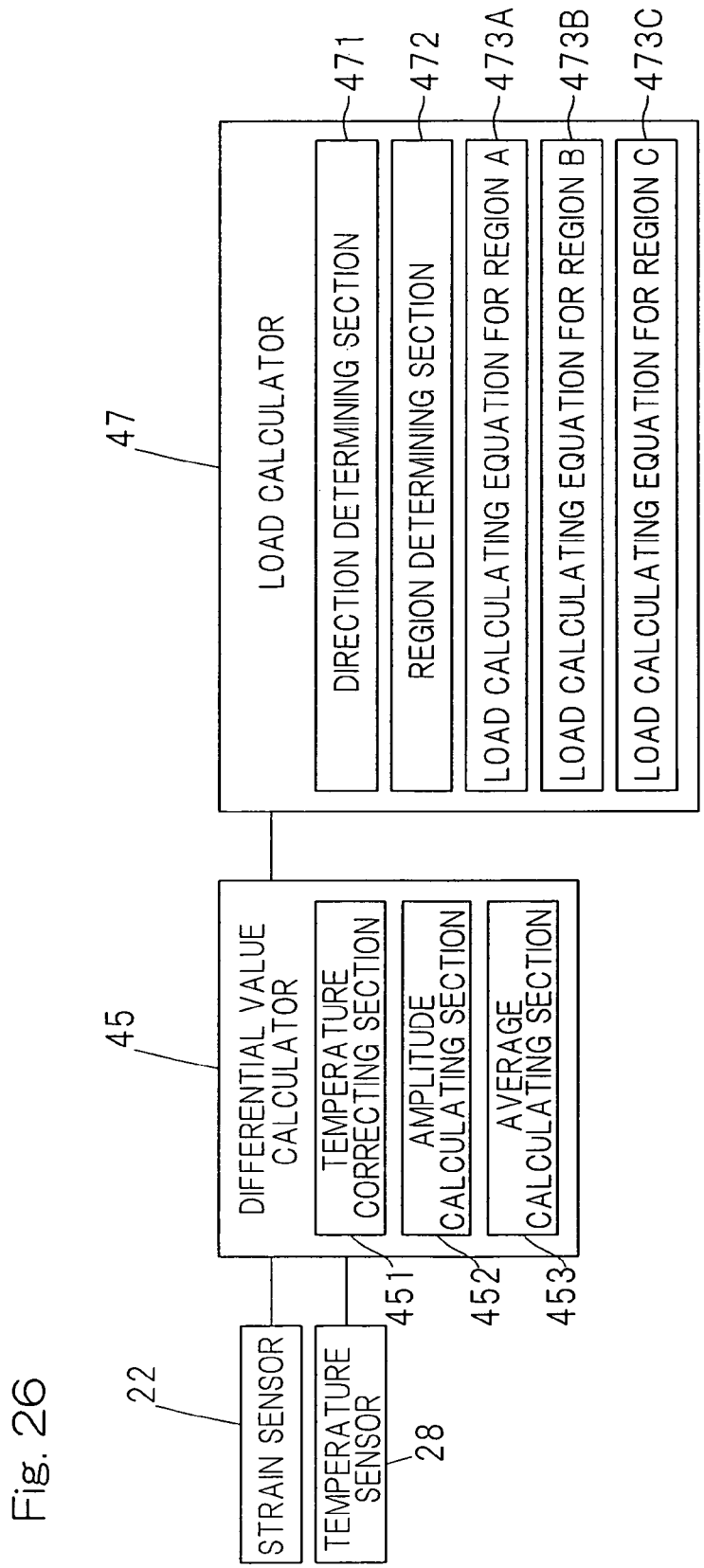
FIG. 26 is a block diagram showing an example of construction of the load estimating section employed in the sensor equipped wheel support bearing assembly in FIG. 25.
Figure 27:
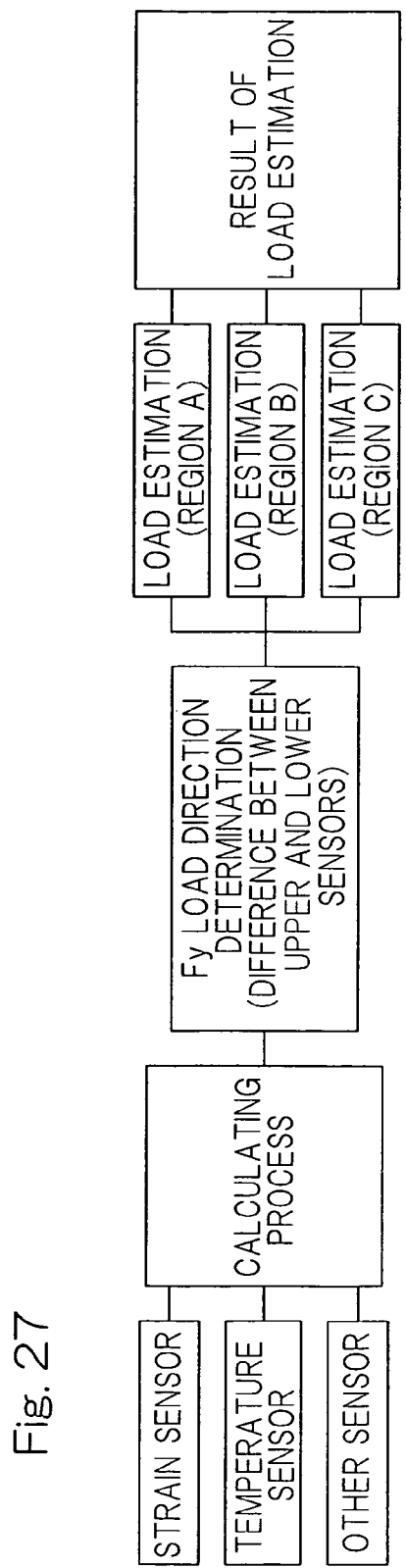
FIG. 27 is an explanatory diagram showing the flow of a calculating process performed by the load estimating section in FIG. 26.
Figure 28:
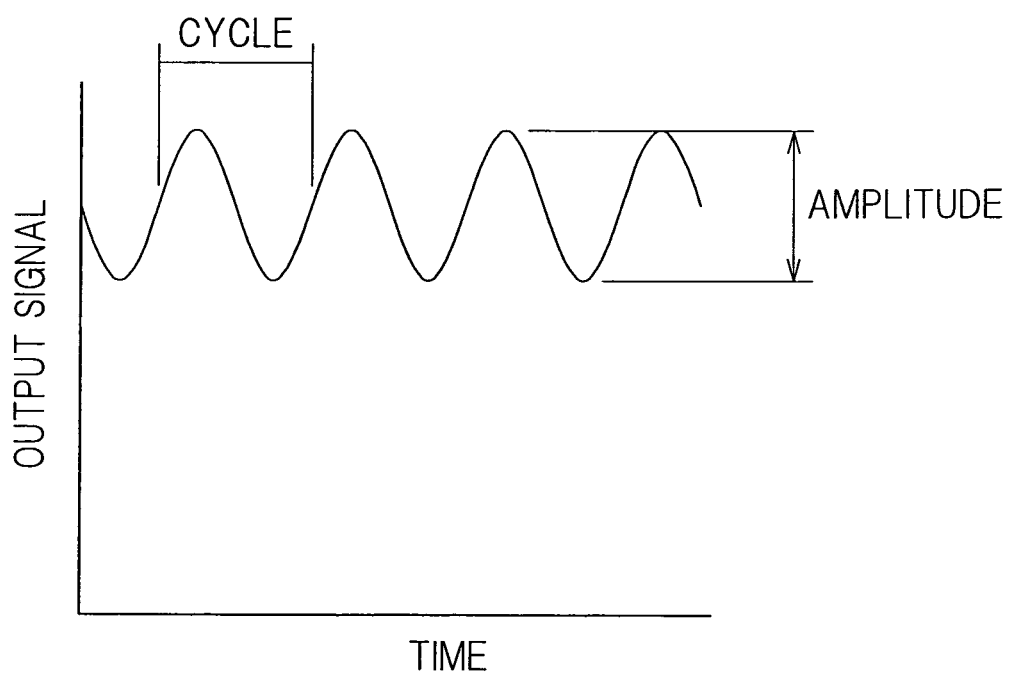
FIG. 28 is a diagram showing the waveform of a sensor output signal of the sensor unit employed in the sensor equipped wheel support bearing assembly in FIG. 25.

The strain sensor 22 of the sensor unit 20 is connected with the load estimating section 30B for estimating the load acting on the vehicle wheel from the output signal thereof. The load estimating section 30B is made up of a computer (including a program executed by such computer) such as, for example, a microcomputer and electronic circuits. In the instance now under discussion, the axially acting load Fy acting on the vehicle wheel, the vertically acting load Fz acting in the vertical direction and the load Fx which will become the driving force or the braking force are estimated. This load estimating section 30B includes, as shown in a block diagram of FIG. 25, a differential value calculator 45 and a load calculator 47. In FIG. 26, the calculating process performed by the load estimating section 30B is shown as a block diagram.

Figure 29A:
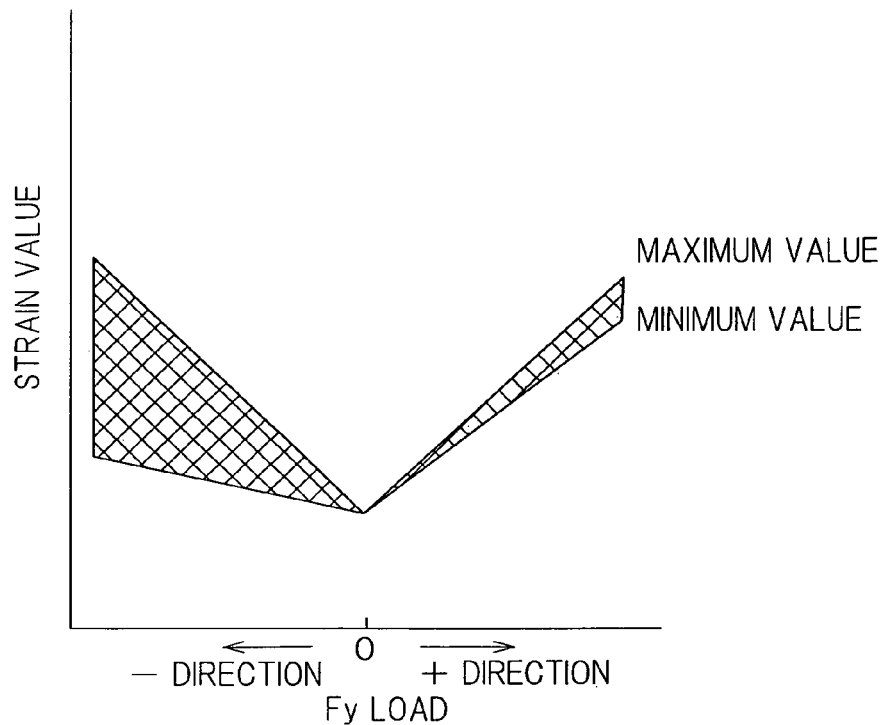
FIG. 29A is a graph showing the relation between the amplitude of the sensor output signal and the direction of an axially acting load at an outer member outer diametric surface top surface portion.
Figure 29B:
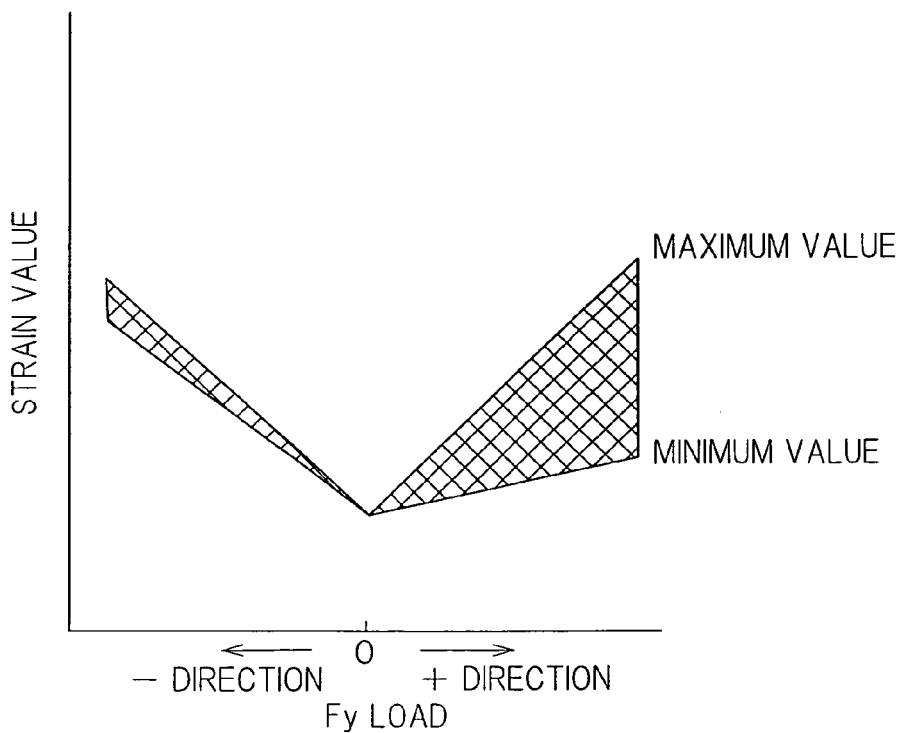
FIG. 29B is a graph showing the relation between the amplitude of the sensor output signal and the direction of an axially acting load at an outer member diametric surface bottom surface portion.

The differential value calculator 45 of the load estimating section 30B is operable to calculate the differential value of the amplitude value of the sensor output signal of the two sensor units 20, which are arranged in opposition to each other with a 180° phase difference formed in the circumferential direction of the outer member 1. In the instance now under discussion, for the two sensor units 20, sensor units 20 arranged one above the other so as to be opposed to each other are selected. FIG. 29A illustrates the sensor output of the sensor unit 20 that are disposed on the upper surface portion of the outer diametric surface of the outer member 1 whereas FIG. 29B illustrates the sensor output of the sensor unit 20 that is disposed on the lower surface portion of the outer diametric surface of the outer member 1. In those figures, the axis of abscissas represents the axial load Fy whereas the axis of ordinates represents the amount of strain occurring in the outer member 1, that is, the output signal of the strain sensor 22, in which the maximum and minimum values mean the maximum and minimum values of the signal, respectively.

From those figures, it will readily be understood that when the axial load Fy lies in a plus (+) direction, the load of the individual rolling elements 5 is small at the upper surface portion of the outer diametric surface of the outer member 1, but large at the lower surface portion of the outer diametric surface of the outer member 1. On the other hand, it will readily be understood that when the axial load Fy lies in a plus (−) direction, the load of the individual rolling elements 5 is large at the upper surface portion of the outer diametric surface of the outer member 1, but small at the lower surface portion of the outer diametric surface of the outer member 1. This makes it clear that the differential value calculated by the differential value calculator 45 indicates the direction of the axially acting load Fy.

Also, as shown in FIG. 26, the differential value calculator 45 includes a temperature correcting section 451 for correcting a drift of the sensor output signal in each of the sensor units 20, which is inputted to the differential value calculator 45, resulting from temperature, an amplitude value calculator 452 for calculating the amplitude value of the sensor output signal in each of the sensor units 20, and an average value calculating section 453 for calculating the average value (direct current component) of the sensor output signal. The average value calculating section 453 may, however, provided in the load calculator 47 with no differential value calculator 45 employed. As is the case with that in the previously described first embodiment of the present invention shown in FIG. 3, the strain generating member 21 in each of the sensor units 20 is provided with a temperature sensor 28 and the output signal of the corresponding strain sensor 22 is corrected in the temperature correcting section 451 on the basis of an output signal of this temperature sensor 28. Also, in the calculation of the differential value in the differential value calculator 45, the amplitude values of the respective sensor output signals of the upper and lower sensor units 20 are utilized.

Figure 30:
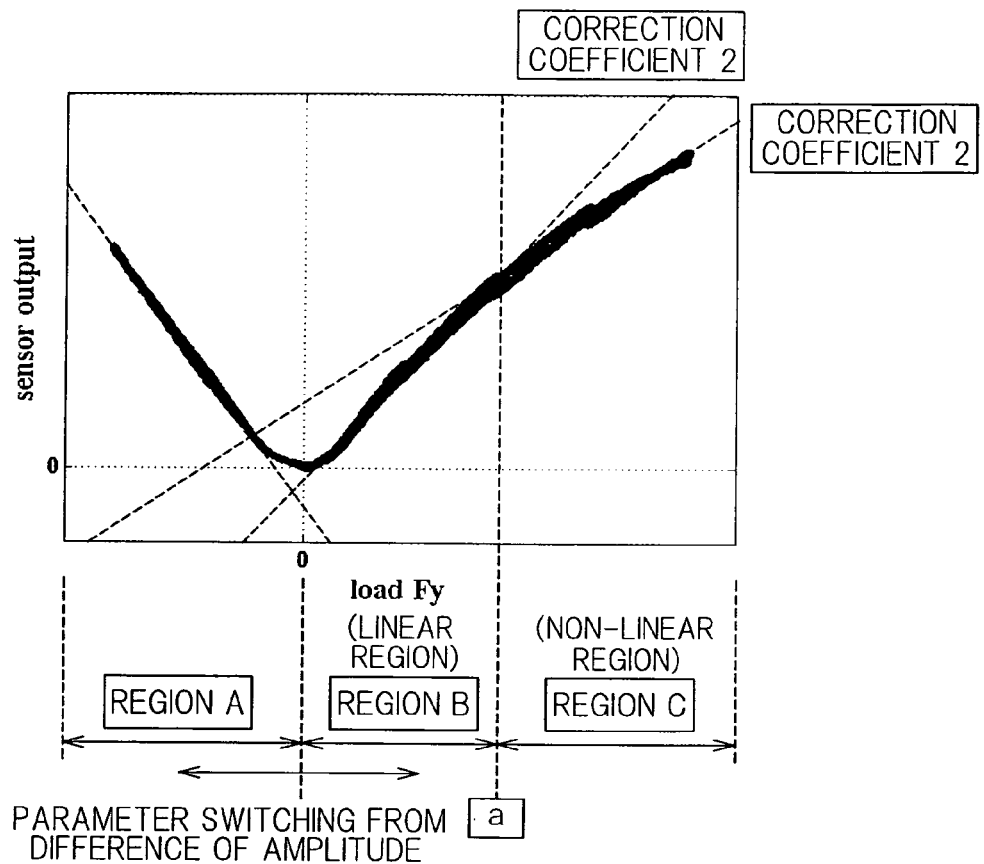
FIG. 30 is a graph showing the relation between the axially acting load and a sensor output of the sensor unit.

In the meantime, since from the differential value calculated by the differential value calculator 45, the direction of the axially acting load Fy can be discriminated, there is the possibility that the load can be estimated accurately if according to the direction of the axially acting load Fy so discriminated, the parameter used in the calculating equation for the estimation of the load is switched to a proper value. However, as shown in FIG. 30 showing the graph representative of the relation between the axially acting load Fy and the sensor output of the sensor unit 20, the response occurs linearly if the input load is within a small range, but non-linearly if it is a large axially acting load Fy such as occurring during the abrupt cornering, and, therefore, no load can be estimated accurately.

Figure 31:
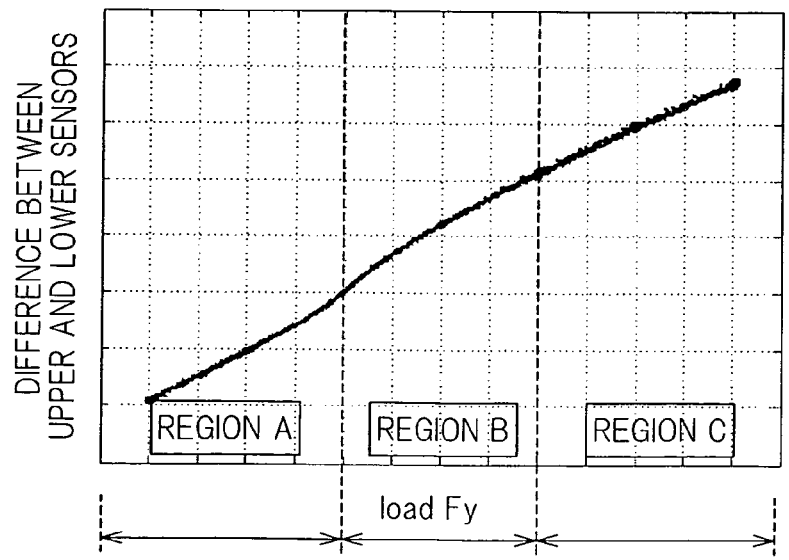
FIG. 31 is a graph showing the relation between the magnitude of the axially acting load and the differential value of respective sensor outputs of upper and lower sensor units.

In view of the above, in the load calculator 47 of the load estimating section 30B, as best shown in FIG. 31, the differential value calculated by the differential value calculator 45 is classified into a plurality of predetermined level regions (for example, into A, B and C regions, in the instance now under discussion) and, at the same time, a plurality of load calculating equations 473A, 473B and 473C having different parameters in correspondence with those level regions as shown in FIG. 26 are provided, and one of the load calculating equations corresponding to the differential value is selected out of the plural load calculating equations so that the loads Fx, Fy and Fz can be estimated. The load calculator 47 includes, as best shown in FIG. 26, a direction determining section 471 for determining the direction of the axially acting load Fy from the differential value, and a region determining section 472 for determining which one of the plural level regions the differential value belongs to.

It is to be noted that for the load calculating equation corresponding to, for example, the region A, three calculating equations are provided which estimate the axially extending load Fy, the vertically extending load Fz and the load Fx which will become the driving force or the braking force, and the parameters differ among those calculating equations. Even though the same calculating equation for the axially acting load Fy, that the parameters differ among the calculating equations for the different regions has been described hereinbefore. This equally applies to the load calculating equations 473B and 473C corresponding to the other level regions B and C.

In such case, the region A is classified into the region in which the direction of the axially acting load Fy is −, the level region B is classified into the region in which the direction of the axially acting load Fy is +, but the input load is small, and the level region C is classified into the region in which the direction of the axially acting load Fy is +, but the input load is large. Accordingly, even in the region in which the input load is large, it is possible to use the load calculating equation employing the parameter that may result in a linear response to the sensor output signal of the sensor unit and, hence, the load estimation error can be reduced.

If the load calculating equation provided for the load calculator 47 is given in the form of a linear expression of a type of linear expression (for example, $Fx=af+b$, wherein f represents a value of the sensor output signal) in which, with the sensor output signal in each of the sensor units 20 taken as a variable, for example, this variable is multiplied by a predetermined correction coefficient, the correction coefficient a and a constant b both appearing in this linear expression form such parameter. Also, as another example of the load calculating equation, a linear expression may be provided for, in which with the average value (direct current component) of the sensor output signal in each of the sensor units 20 taken as a variable, this variable is multiplied by a predetermined correction coefficient. Also, as a further example of the load calculating equation, a linear expression may be provided for, in which with the average value and the amplitude value of the sensor output signal in each of the sensor units 20 taken as respective variables, those variables are multiplied by respective correction coefficients. The value of each of the correction coefficients employed in those linear expressions is determined and set by means of a series of experiments and/or simulations performed beforehand.

The function of this fourth application is basically similar to that of the previously described first embodiment of the present invention and, therefore, the details thereof are not reiterated, but in the case of this application, particularly in the load estimating section 30B, the differential value of the amplitudes of the respective sensor output signals of the two sensor units (upper and lower sensor units, in the instance now under discussion) 20, which are arranged in opposition to each other with the phase difference of 180° formed in the circumferential direction of the outer member 1, is calculated by the differential value calculator 45; out of the plural load calculating equations 473A, 473B and 473C employing different parameters, which equations 473A, 473B and 473C are provided in correspondence with a predetermined plural regions A, B and C formed by classifying the differential value, the load calculating equation in the region corresponding to the differential value is selected; and the sensor output signal in each of the sensor units 20 is substituted into it to estimate each of the loads Fx, Fy and Fz acting on the vehicle wheel by means of the load calculator 47. For this reason, the load estimation error can be easily reduced and the load acting on the vehicle wheel can be accurately estimated. With respect to the axially acting load Fy, the direction thereof is also determined.

Also, since in this application the sensor unit 20 is provided in four in number and those sensor units 20 are disposed at upper, lower, right and left surface portion of the outer diametric surface of the outer member 1, which correspond respectively to the top, bottom, right and left positions thereof relative to a tire tread, in a fashion equidistantly spaced 90° in phase difference from each other in a circumferential direction, the vertically acting load Fz acting on the wheel support bearing assembly, the load Fx which will become the driving force or the braking force, and the axially acting load Fy can be estimated.

Also, since in this application, a temperature sensor 28 is provided in each of the sensor units 20B, in which case in the differential value calculator 45 of the load estimating section 30B, a temperature dependent drift of the output signal of the strain sensor 22 is corrected by the temperature correcting section 451 on the basis of the output signal of the temperature sensor 28, the temperature dependent drift of the output signal of the strain sensor 22 can be corrected.

It is to be noted that although in the above described application, the differential value of the amplitude values of the sensor output signals of the two sensor units 20, which are disposed at the outer diametric surface upper surface portion and outer diametric surface lower surface portion of the outer member 1, respectively, in opposition to each other has been described as calculated in the differential value calculator 45 of the load estimating section 30B, other than that, the differential values of the sensor output signals of the two sensor units 20, which are disposed at the outer diametric left surface portion and right surface portion of the outer member 1, respectively, in opposition to each other may be calculated so that, in the load calculator 47, the load calculating equation for the region corresponding to the differential value can be selected out of the plural load calculating equation having the different parameters, which are provided in correspondence with the predetermined plural regions formed by classifying such differential value, to thereby estimate the loads Fz, Fx and Fy.

As discussed above, by classifying the amplitude differences of the sensor output signals of the left and right sensor units 20 as respective evaluation value, the input load regions can be classified in level relative to a moment load Mz about the axial direction z.

Further, in the differential value calculator 45 of the load estimating section 30B, the differential value of the amplitude values of the sensor output signals of the sensor units 20, which are arranged vertically one above on the outer member 1 in opposition to each other, respectively, and the differential value of the amplitudes of the sensor output signals of the sensor units 20, which are arranged on left and right sides of the outer member 1 in opposition to each other, respectively, may be calculated, so that in the load calculator 47, while a plurality of load calculating equations, which utilize parameters differing from each other in dependence on a plurality of combined regions comprises of a predetermined plural regions formed by classifying respective levels of both of the differential values are provided for, the load calculating equation of the combined region to which both of the differential values correspond is selected to thereby estimate the loads Fz, Fx and Fy.

By way of example, as described subsequently, assuming that the differential value of the respective amplitude values of the sensor output signals of the upper and lower sensor units 20 is expressed by X and the differential value of the respective amplitude values of the sensor output signals of the left and right sensor units 20 is expressed by Z, each of those differential values is classified into a + region and a − region and, while the load calculating equation corresponding to the four combined regions I, II, III and IV each made up of a combination of positive and negative regions are provided for, the load calculating equation of the corresponding combined region is selected from the positive (+) vice versa negative (−) relation of each of the differential values of the amplitude values X and Z, the loads Fz, Fx and Fy are estimated.

| Sign of Z | Sign of X | Calculation Region |
|---|---|---|
| + | + | I |
| + | − | II |
| − | + | III |
| − | − | IV |

As described above, when the differential value of the upper and lower amplitude values and the differential value the left and right amplitude values are combined together to classify the loads in level, the load can be estimated by means of the optimum load calculating equation appropriate to the range of an input load. For this reason, the load estimation error can be further reduced and the load acting on the vehicle wheel can be estimated accurately.

Figure 32:
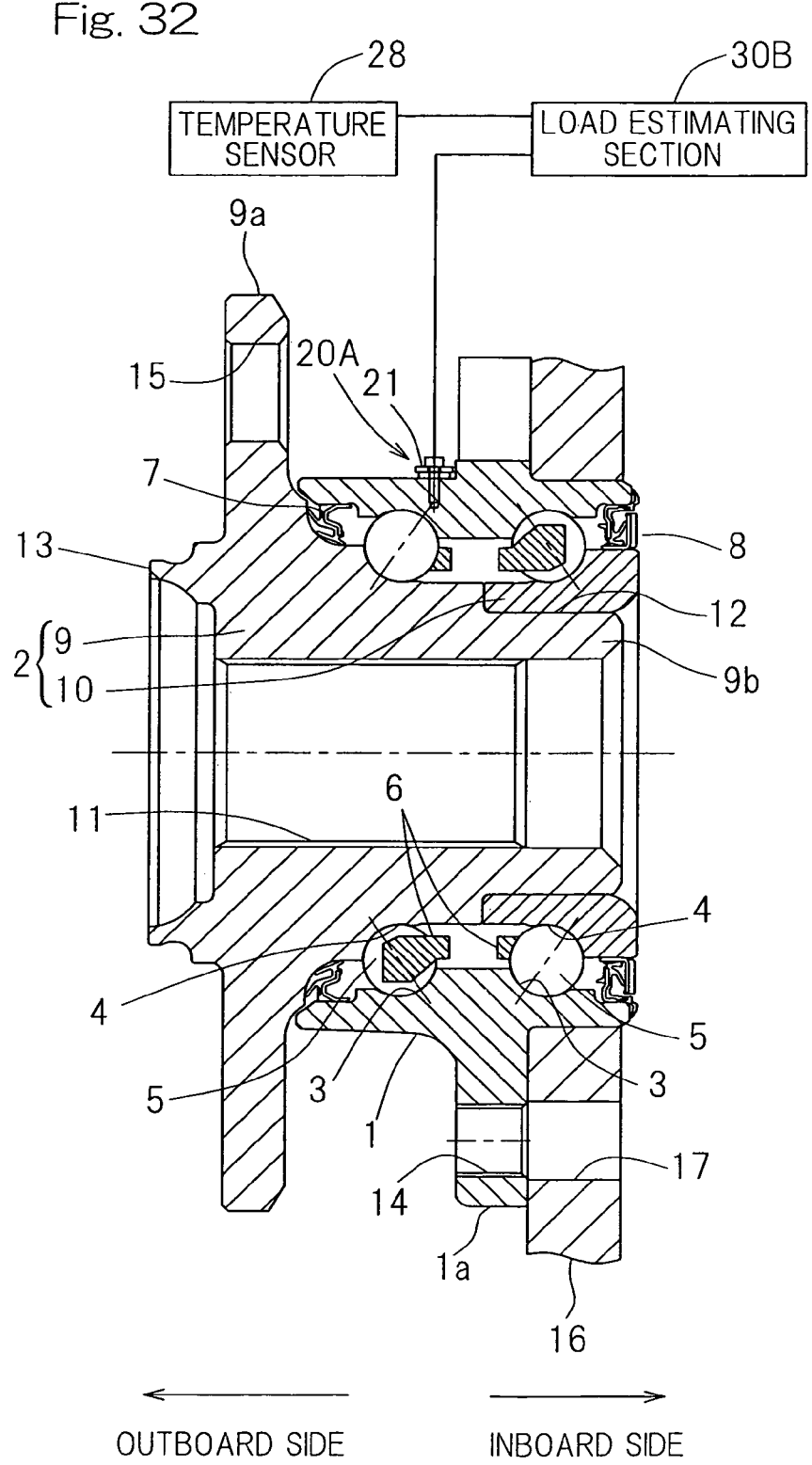
FIG. 32 is a diagram showing a sectional view of the sensor equipped wheel support bearing assembly according to a fifth application of the present invention, shown together with a block diagram of a conceptual construction of the detecting system therefor.

FIG. 32 illustrates a fifth application of the present invention. The sensor equipped wheel support bearing assembly according to this fifth application is similar to that according to the fourth application shown in and described with particular reference to FIGS. 25 to 30, but differs therefrom in that each of the sensor units 20A is so constructed as hereinafter described. In such case, each of the sensor units 20A is similar to that shown in and described with reference to FIGS. 11 and 12 in connection with the second embodiment of the present invention and, therefore, the details thereof are not reiterated. Also, FIGS. 13 and 14 forming parts of the drawings used to describe the second embodiment of the present invention are equally applied to this fifth application.

In the case of this fifth application, in an amplitude value calculating section 452 in the differential value calculator 45 in the load estimating section 30B employed in the practice of the fourth application shown in FIG. 26, the differential value of the respective output signals of the two strain sensors 22A and 22B best shown in FIG. 12 is calculated and is then extracted as an amplitude value. Also, in an average value calculating section 453 shown in FIG. 26, the sum of the respective output signals of the two strain sensors 22A and 22B in each of the sensor units 20A is calculated and is then extracted as an average value. The differential value of the sensor output signals of the upper and lower sensor units 20A is determined as the differential value of the amplitude values of the sensor output signals of the upper and lower sensor units 20A that are determined by the amplitude value calculating section 452 referred to above. The respective output signals a and b of the two strain sensors 22A and 22B are such as shown in FIG. 14.

Figure 33:
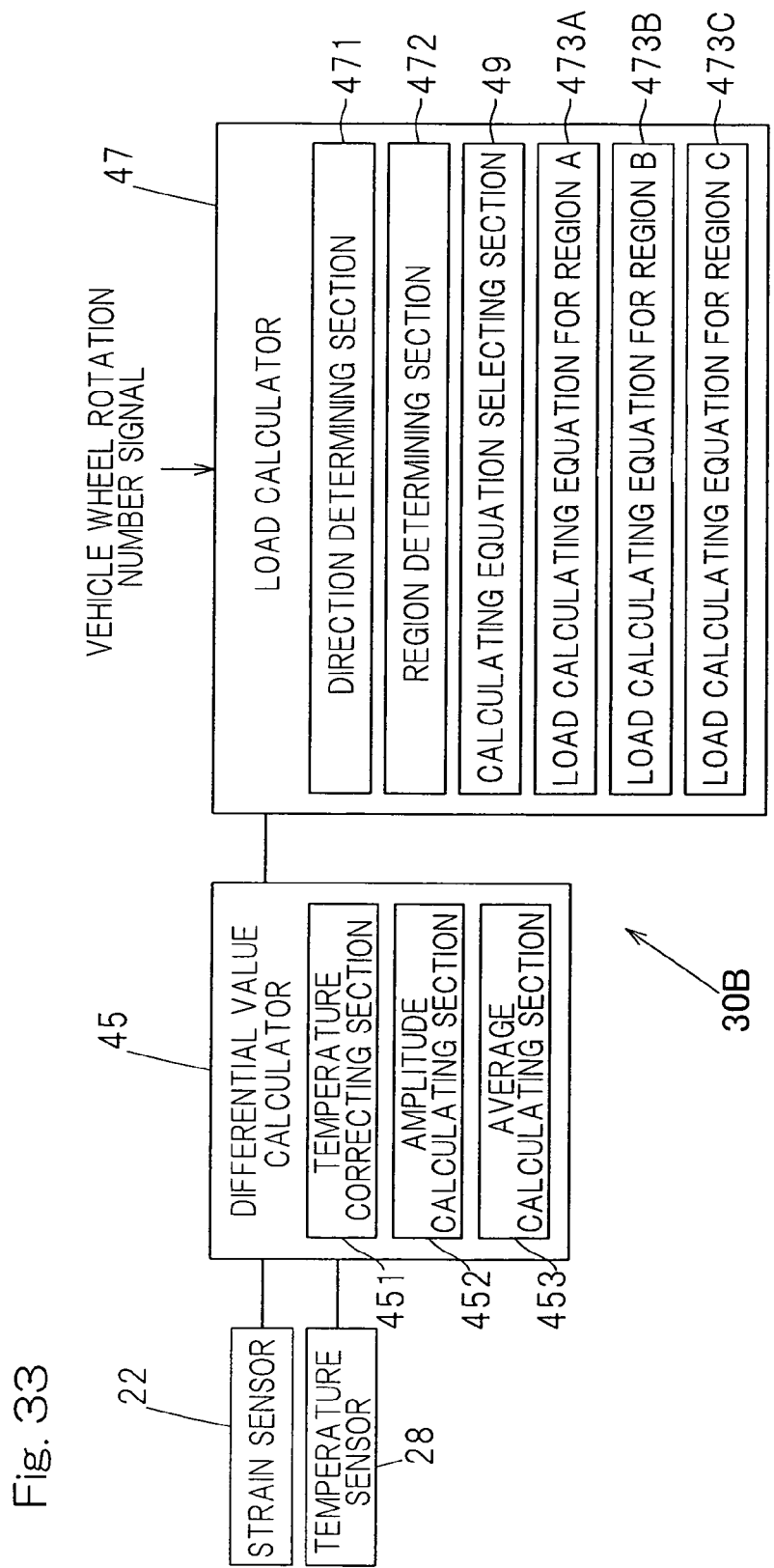
FIG. 33 is a block diagram showing an example of construction of a load estimating calculator employed in the sensor equipped wheel support bearing assembly in FIG. 32.

Also, in this fifth application, as best shown in FIG. 33, as the load calculating equation 473A, 473B and 473C in the respective regions A, B and C provided for the load estimator 47 in the load estimating section 30B, a calculating equation, which utilizes only the average value as a variable and a calculating equation, which utilizes both of the average value and the amplitude value as variables are provided for. Also, the load estimator 47 is provided with a calculating equation selecting section 49 for selecting one of those two calculating equations.

During a low speed rotation of the vehicle wheel, the processing time for detecting the amplitude of the sensor output signal is long and, during the halt, detection of the amplitude itself is impossible to achieve. In contrast thereto, the average value can be detected even during the halt. Accordingly, in the event that the number of revolutions of the vehicle wheel is smaller than a predetermined value, the calculating equation selecting section 49 selects, out from the two load calculating equations in the respective regions, the calculating equation utilizing only the average value, wherefore the load can be estimated and outputted without causing a delay.

The calculating equation selecting section 49 is inputted with information on the number of revolutions of the vehicle wheel from, for example, the outside and, based on this information, selection of one of the calculating equations is carried out. In such case, as the information on the number of the vehicle wheel revolutions from the outside, the use may be made of a rotation sensor signal from the vehicle body side such as, for example, an ABS sensor (rotation detecting sensor used in the anti-lock brake system) to estimate the number of the vehicle wheel revolutions. Also, it may be so constructed that from the host control device connected with the intra-vehicle communication bus on the side of the vehicle body, in place of the information on the number of the vehicle wheel revolutions, the equation selecting section 49 can receive a calculating equation selection command. In addition, as the information on the number of the vehicle wheel revolutions, the frequency of passage of the rolling elements 5 may be detected from the respective output signals a and b of the strain sensors 22A and 22B to thereby estimate the number of the vehicle wheel revolutions.

As hereinabove described, according to the fourth or fifth application of the present invention, the following effects can be obtained.

Since the non-linearity contained in the strain response of the bearing unit is corrected, the load estimation error can be reduced.

Since the regions are classified according to the difference of the amplitude values, the sensitivity to the Fy moment load, which tends to bring about large influences, is high and the classification of the region can be accomplished accurately.

Since the amplitude signal is seldom affected by the influence brought about by temperature, the above described region classification is accomplished accurately, accompanied by an increase of the estimating accuracy.

Also, even when an internal preload condition of the bearing unit is different, the region classification can be accomplished in a stabilized fashion without being affected considerably.

Further, when the sensor signals of the sensor units arranged left and right, respectively, are subjected to the region determination and are also finely classified according to conditions, a further accurate load estimation can be accomplished.

Each of the fourth and fifth applications described hereinbefore includes the following applied mode group II (Mode 13 to Mode 22), in which the load estimation processing section 30, which is essential in the embodiments according to the present invention is not required.

[Mode 13]

The sensor equipped wheel support bearing assembly according to this mode 13 is a wheel support bearing assembly for rotatably supporting a vehicle wheel relative to a vehicle body, which includes an outer member 1 having its inner periphery formed with a plurality of rows of raceway surfaces 3, an inner member having an outer periphery formed with raceway surfaces 4 in face-to-face relation with the rolling surfaces 3, and a plurality of rows of rolling elements 5 interposed between the raceway surfaces 3 in the outer member 1 and the raceway surface 4 in the inner member, in which a plurality of sensor units 20 are provided on an outer diametric surface of one of the outer member 1 and the inner member 2, which serves as a stationary member; each of the sensor units 20 includes a strain generating member 21 having two or more contact fixing segments 21a, which are fixed to the outer diametric surface of the outer diametric surface of the stationary member in contact therewith, and one or more sensors fitted to the strain generating member 21 for detecting a strain induced in the strain generating member 21; and a load estimating section 30B for estimating a load acting on a vehicle wheel from a sensor output signal of the sensor units 20. The load estimating section 30B includes a differential value calculator 45 for calculating a differential value of amplitude values of sensor output signals of the sensor units 20 of the plural sensor units 20, which are disposed having been spaced 180° in phase difference from each other in a direction circumferentially of the stationary member and in opposition to each other; and a load calculator 47 for estimating a load acting on a vehicle wheel from the sensor output signals of the plural sensor units 20 by setting a plurality of parameters for the calculation of the load in correspondence with a plurality of regions, formed by classifying the level of the differential value, and by selecting one of the parameters of the regions, which corresponds to the differential value so calculated by the differential value calculator 45. The classified regions may be a linear region, in which the differential value referred to above can be regarded as, for example, linear, and a non-linear region in which the differential value is larger than that in the linear region and can be regarded as non-linear.

According to the above described construction, the differential value calculator 45 of the load estimating section 30B is such as to calculate the differential value of the amplitudes of the sensor output signals of the two sensor units that are disposed in opposition to each other and spaced 180° in phase difference from each other in the circumferential direction of the outer member. The sensor output signals change as the rolling elements 5 move incident to rotation of the bearing unit, and the magnitude of a component of such change is calculated by the differential value calculator 45 as the above described differential value. The load calculator 47 selects the parameter for the region, to which the differential value calculated by the differential calculator 45 corresponds, out from the parameters for the load calculation that are provided for each of the regions formed by classifying the level, and then estimate the load acting on the vehicle wheel by the utilization of the selected parameter.

Since the load is calculated with the use of the parameter for the load calculation which has been classified into the regions in the manner described above, the load estimation error can be reduced by correcting the non-linearity contained in the strain response of the bearing unit. Since the above described region classification is subjected to the differential value of the amplitude values, the sensitivity is high and the classification of the regions can be accomplished properly. Also, the amplitude signals are less affected by temperature, and therefore the above described region classification is accomplished accurately, accompanied by an increase of the detecting accuracy. Even when the internal preload condition of the bearing unit is different, the stabilized region classification can be accomplished without being considerably affected.

[Mode 14]

In the mode 13 described above, the differential value calculator 45 of the load estimating section 30B may be of a type capable of calculating the differential value of the amplitude values of the sensor output signals of the sensor units 20 which are disposed in opposition to each other at upper and lower locations of the stationary member. If the differential value of the sensor output signals of the upper and lower sensor units 20 is rendered to be an evaluation value, such value changes approximately linearly relative to the axially acting load Fy and has a high sensitivity to the moment load acting in the axial direction and, for this reason, the level classification of the regions can be properly performed with this evaluation value.

[Mode 15]

In the mode 13 described above, the differential value calculator 45 of the load estimating section 30B may be of a type capable of calculating the differential value of the amplitude values of the sensor output signals of the sensor units 20 which are disposed in opposition to each other at left and right locations of the stationary member. If the differential value of the sensor output signals of the upper and lower sensor units 20 is rendered to be an evaluation value, the input load region can be classified in level even to the moment load Mz around the axial direction.

[Mode 16]

In the mode 13 described above, the differential calculator 45 of the load estimating section 30B may be of a type capable of calculating the differential value of the amplitude values of the sensor output signals of the sensor units 20, which are disposed in opposition to each other at upper and lower locations of the stationary member, and the differential value of the amplitude values of the sensor output signals of the sensor units 20, which are disposed in opposition to each other at left and right locations of the stationary member, in which the load calculator 47 of the load estimating section 30B estimates the load by selecting, out of the parameters provided in correspondence with a plurality of combined regions formed by classifying both of the differential values in level, a load calculating equation for the combined region to which both of the differential values correspond.

When as hereinabove described, the upper and lower amplitude differential values and the left and right amplitude differential values are combined to allow the input load to be classified in level, the load can be estimated by the further proper parameter corresponding to the range of an input load. For this reason, the load estimation error can be further reduced and the load acting on the vehicle wheel can be estimated accurately.

[Mode 17]

In the mode 13 described above, the use may be made of three or more sensor units 20, in which case the load estimating section 30B estimates the radially acting load and the axially acting load acting in the radial direction and the axial direction of the wheel support bearing assembly, respectively, from the sensor output signals of the three or more sensor units 20.

[Mode 18]

In the mode 13 described above, the sensor units 20 may be provided in four in number, in which case the sensor units 20 are disposed at upper, lower, left and right portions of the outer diametric surface of the stationary member, which correspond respectively to the top, bottom, left and right positions relative to the tire tread, and spaced 90° in phase difference from each other in the circumferential direction of the stationary member.

With the four sensor units 20 so arranged in the manner as hereinabove described, the vertically acting load Fz acting on the wheel support bearing assembly, the load Fx which will become the driving force or the braking force, and the axially acting load Fy can be estimated.

[Mode 19]

In the mode 13 described above, the load estimating section 30 may be of a type capable of estimating the load acting on the vehicle wheel with the use of one or both of the average value and the amplitude value, each for a plurality of cycles of the rolling element amplitude, in the sensor output signals.

[Mode 20]

In the mode 19 described above, the load estimating section 30B may be of a type in which the combination of the average value and the amplitude value of the sensor signals, which are used in the load estimation, is variable in dependence on the number of revolutions of the vehicle wheel.

The average value, even when the vehicle wheel is halted or held at a low speed condition, can be obtained without requiring an time averaging process to be executed, and the load can be quickly calculated and outputted when a load calculating equation using only the average value as a variable. Also, since when the vehicle wheel is in a ordinal rotating condition, the average value and the amplitude value can be accurately calculated, the load can be accurately calculated and outputted with the use of a load calculating equation using the amplitude value as a variable or a load calculating equation using both of the average value and the amplitude value as variables.

[Mode 21]

In the mode 13 described above, the use may be made of a temperature sensor 28 in each of the sensor units 20, in which case the load estimating section 30B corrects the sensor output signals on the basis of an output signal of the temperature sensor 28. In the case of this construction, the temperature dependent drift of the output signal of the strain sensors 22 can be corrected.

[Mode 22]

In the mode 19 described above, the sensor unit 20A may include three or more contact fixing segments and at least two or more sensors 22, in which the distance between the contact fixing segments 21a is so set that the phase difference of those sensor output signals may be equal to a multiplication of [n+½], n being an integer, of the pitch of arrangement of the rolling elements and the load estimating section 30B makes use of the average value of the output signals of the two sensors 22. In the case of this construction, the output signals of the two sensor have a phase difference of about 180° and the average value thereof represents a value from which a component of change brought about by passage of the rolling elements is cancelled. Also, the amplitude value will be an accurate value from which the influence brought about by temperature and/or the surface slippage between the knuckle and the flange have been removed.

In the description that follows, the sixth and seventh applications, which do not require the use of the load estimation processing section 30 employed in the practice of the present invention. Even the sixth and seventh applications have their object to provide the sensor equipped wheel support bearing assembly designed to resolve the problems and to achieve a similar object, both of which are common to the previously described fourth and fifth applications.

The sixth and seventh applications, which do not require the use of the load estimation processing section 30 necessitated in the present invention will be described with particular reference to FIGS. 34 to 36. FIGS. 2 to 5, forming parts of the drawings used to show and explain the previously described first embodiment of the present invention, and, also, FIGS. 25 to 31, forming parts of the drawings used to show and explain the previously described forth application, can be equally applicable to those sixth and seventh applications. It is to be noted that component parts similar to those of each of the embodiments and the application are designated by like reference numerals and, therefore, the details thereof are not reiterated.

Figure 34:
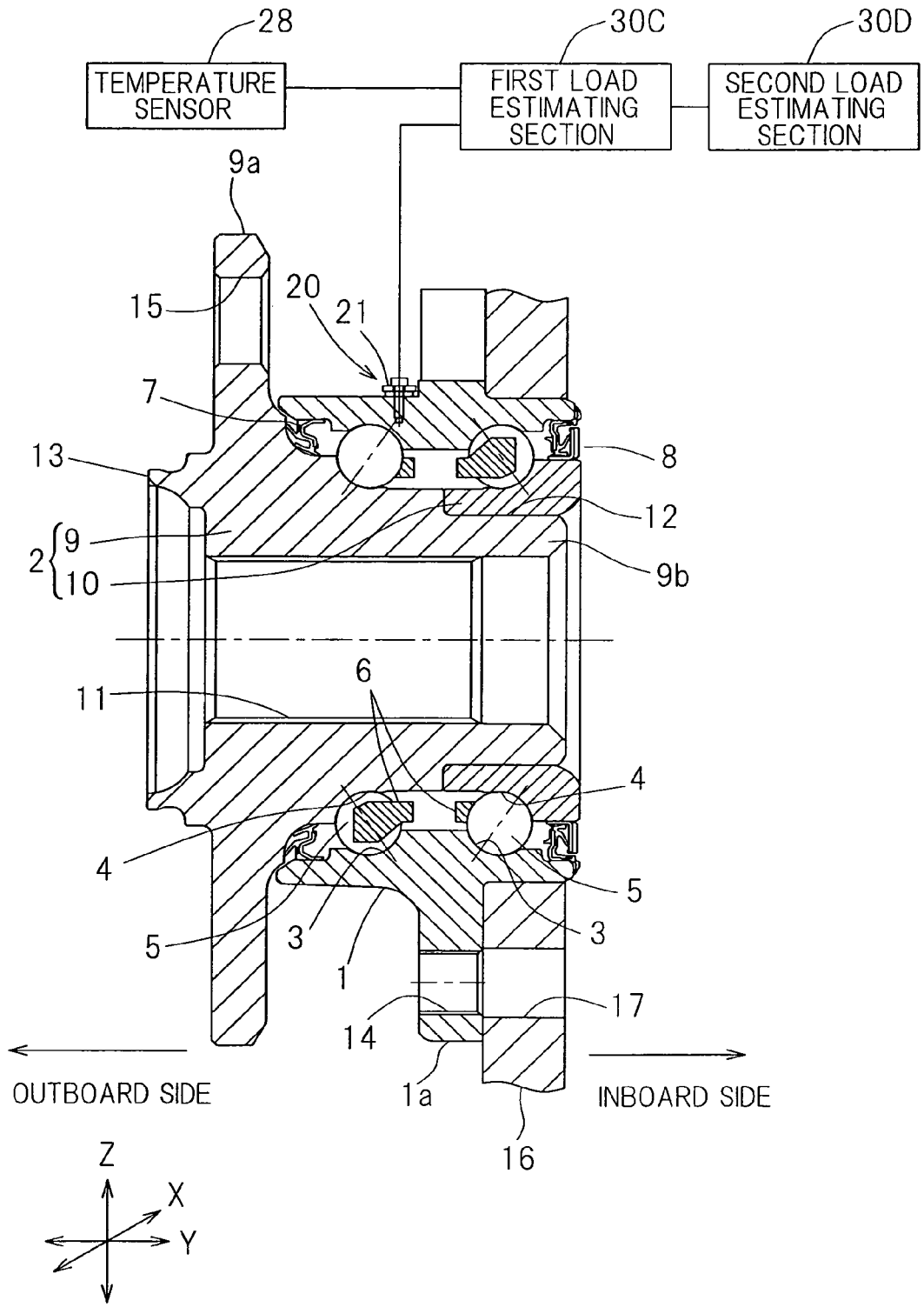
FIG. 34 is a diagram showing a sectional view of the sensor equipped wheel support bearing assembly according to a sixth application of the present invention, shown together with a block diagram of a conceptual construction of the detecting system therefor.

According to the sixth application shown in FIG. 34, the first load estimating section 30C and a second load estimating section 30D are connected with the strain sensors 22 (best shown in FIG. 4) of the sensor unit 20 and the first load estimating section 30C referred to above is connected with a temperature sensor 28. As shown in FIG. 35, which illustrates a block diagram of one example of construction of the first load estimating section 30C and the second load estimating section 30D, which is the load estimating section employed in the sensor equipped wheel support bearing assembly according to this sixth application, the strain sensor 22 of the sensor unit 20 is connected with the first load estimating section 30C. This first load estimating section 30C includes an axially acting load calculator 50 for estimating the axially acting load Fy, acting in the axial direction of the vehicle wheel, by substituting the sensor output signal of the sensor unit 20 into a predetermined load calculating equation. Also, a second load estimating section 30D for estimating from the sensor output signal of each of the sensor units 20, the axially acting load Fy, applied in the axial direction of the vehicle wheel and the radially acting load applied in the radial direction (the vertically acting load Fz and the load Fx which will become the drive force or the braking force, in the instance now under discussion) is provided in a stage subsequent to the first load estimating section 30C. In FIG. 36, a calculating process of the first and second load estimating sections 30C and 30D is shown in a block diagram.

Figure 35:
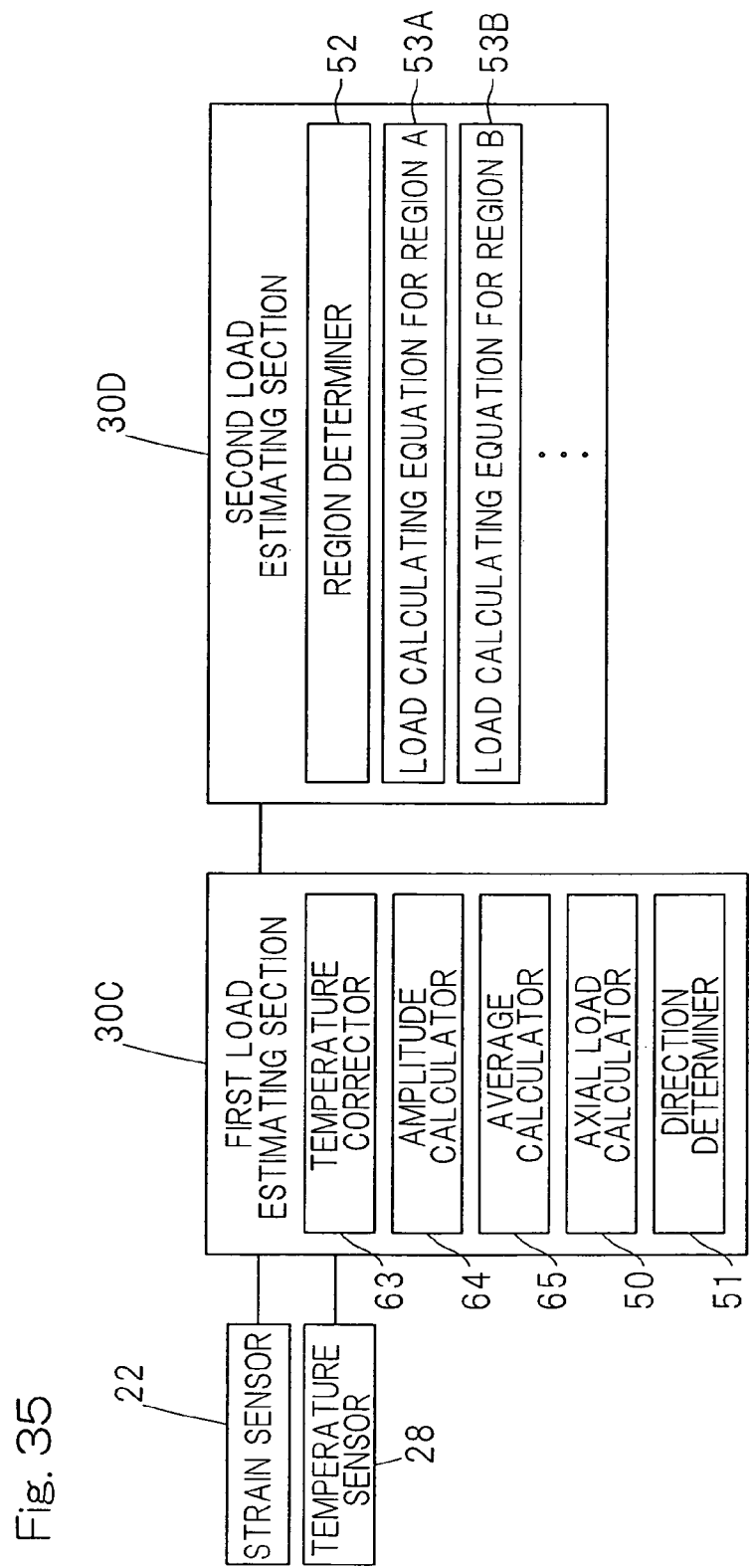
FIG. 35 is a block diagram showing an example of construction of the load estimating section employed in the sensor equipped wheel support bearing assembly in FIG. 34.
Figure 36:
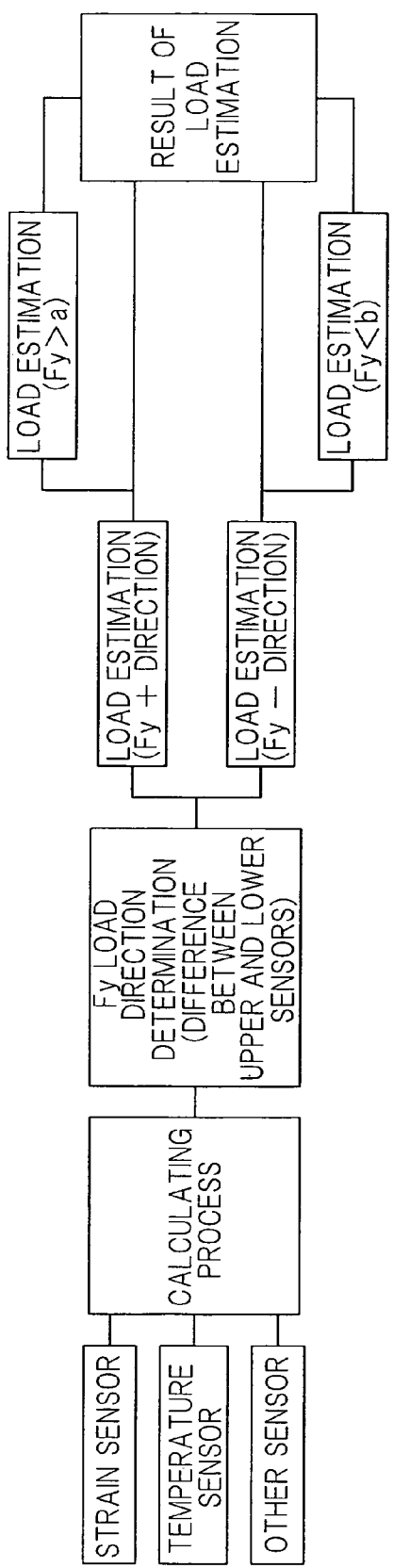
FIG. 36 is an explanatory diagram showing the flow of the calculating process performed by the load estimating section in FIG. 35.

Referring to FIG. 35, the load calculating equation used to estimate the axially acting load Fy (shown in FIG. 36) in the axially acting load calculator 50 of the first load estimating section 30C is expressed in a linear expression in which with the amplitude value of, for example, of the sensor output signal of each of the sensor units 20 taken as a variable, this variable is multiplied by a predetermined correction coefficient. The correction coefficient and a constant in this linear expression will form calculating parameters. Also, as another example of the load calculating equation, the linear expression, in which with the average value (direct current component) of the sensor output signal of each of the sensor units 20 taken as a variable, this variable is multiplied by a predetermined correction coefficient, may be employed. Moreover, as a further example of the load calculating equation, the linear expression, in which with both of the average value and the amplitude value of the sensor output signal of each of the sensor units 20 taken as variables, those variables are multiplied by respective predetermined correction coefficient, may be employed. The correction coefficients and values of constants in the linear expression are determined and set by means of a series of experiments and/or simulations taken place beforehand. For the parameter used in the load calculating equation in this case, a value with which the axially acting load Fy can be accurately estimated within the range of 0 to about 4 kN is desirable.

As shown in FIG. 35, the first load calculating section 30C includes, in addition to the previously described axial load calculator 50, a temperature corrector 63 for correcting a temperature dependent drift occurring in the sensor output signal in each of the sensor units 20 inputted thereto, an amplitude calculator 64 for calculating the amplitude value of the sensor output in each of the sensor units 20, an average value calculator 65 for calculating the average value (direct current component) of the sensor output signal, and a direction determiner 51 for determining the direction of the axially acting load Fy. The strain generating member 21 in each of the sensor units 20 is provided with a temperature sensor 28 as is the case with the first embodiment of the present invention shown in and described with particular reference to FIG. 3, and, based on an output signal of this temperature sensor, the output signal of the corresponding strain sensor 22 is corrected in the temperature corrector 63.

In the direction determiner 51, the differential value of the respective amplitude values of the sensor output signals of the upper and lower sensor units 20, which have been calculated by the amplitude value calculator 64, and, from this differential value, the direction of the axially acting load Fy is determined. FIG. 29A cited here shows the sensor output of the sensor unit 20, which is disposed on the upper surface portion of the outer diametric surface of the outer member 1 whereas FIG. 29B similarly cited here shows the sensor output of the sensor unit 20 disposed on the lower surface portion of the outer diametric surface of the outer member 1. In those figures, the axis of abscissas represents the axially acting load Fy whereas the axis of ordinates represents the amount of strain occurring in the outer member 1, that is, the output signal of the strain sensors 22, and the maximum and minimum values represent the maximum value and the minimum values of the signals. From those figures, it will readily be understood that when the axially acting load Fy acts in a plus (+) direction, the load of the individual rolling elements becomes small at the upper surface portion of the outer diametric surface of the outer member 1 and large at the lower surface portion of the outer diametric surface of the outer member 1. Conversely, it will readily be understood that when the axially acting load Fy acts in a minus (−) direction, the load of the individual rolling elements 5 becomes large at the upper surface portion of the outer diametric surface of the outer diameter 1 and small at the lower surface portion of the outer diametric surface of the outer member 1. Accordingly, the differential value calculated by the direction determiner 51 comes to indicate the direction of the axially acting load Fy.

In the meantime, since the direction of the axially acting load Fy can be determined with the direction determiner 51, and when a parameter of the calculating equation for the load estimation is switched to a proper value appropriate to the determined direction of the axially acting load Fy, there is the possibility that the load can be accurately estimated. However, as shown in FIG. 30 showing the graph descriptive of the relation between the sensor output in the sensor unit 20 and the axially acting load Fy, a linear response occurs if the input load is within a relatively small range, but a non-linear response occurs relative to a large input such as occurring during an abrupt cornering (a portion of the region C in FIG. 30) and lo load can be estimated accurately.

In view of the above, in the second load estimating section 30D, as shown in FIG. 30, the magnitude of the axially acting load Fy calculated by the previously described first load estimating section 30C is classified in level into a predetermined plurality of regions. In other words, the second load estimating section 30D includes a region determiner 52 (shown in FIG. 35) for determining which one of the regions the magnitude of the axially acting load Fy calculated by the first load estimating section 30C belongs to. In the instance now under discussion, if the axially acting load Fy acts in a + direction, the range in which the value thereof is smaller than a is classified as the region A and the range in which the value thereof is larger than a is classified as the region B. And, in correspondence with the regions A and B, the use is made of a plurality of load calculating equations 53A and 53B having respective parameters different from each other and, of those plural load calculating equation, the load calculating equation for the region to which the value of the axially acting load Fy corresponds is selected to estimate each of the loads Fx, Fy and Fz.

In such case, for a boundary value a of the axially acting load Fy to be classified into the regions A and B, it is desirable to set to, for example, 4 kN. At this time, in the load calculating equation 53A for the region A, the parameter effective to estimate the axially acting load Fy of 0 to 4 kN is used, but in the load calculating equation 53B for the region B, the parameter effective to accurately estimate the axially acting load Fy of 4 to 7 kN. Even though the axially acting load Fy acts in the − direction, it is classified in level into a region, in which the value thereof is smaller than, for example, b, and a region in which the value thereof is larger than b; in correspondence with those regions, a plurality of load calculating equations having respective parameters different from each other are set; and the load calculating equation for the region to which the value of the axially acting load Fy corresponds is selected to thereby estimate each of the loads Fx, Fy and Fz.

In the load calculating equation used in the second load estimating section 30D, the amplitude value of the sensor signal in, for example, each of the sensor unit is taken as a variable, and it can be expressed by a linear expression, in which this variable is multiplied by a predetermined correction coefficient. The correction coefficient and a constant in this linear expression become the above described calculation parameters. Also, as another example of the load calculating equation, a linear expression may be provided for, in which with the average value (direct current component) of the sensor output signal in each of the sensor units 20 taken as a variable, this variable is multiplied by a predetermined correction coefficient. Also, as a further example of the load calculating equation, a linear expression may be provided for, in which with the average value and the amplitude value of the sensor output signal in each of the sensor units 20 taken as respective variables, those variables are multiplied by respective correction coefficients. The value of each of the correction coefficients and the value of each of the constants employed in those linear expressions are determined and set by means of a series of experiments and/or simulations performed beforehand.

Accordingly, even in the region in which the input load is large, the load calculating equation, in which the parameter of a kind capable of responding linearly to the sensor output signal of the sensor unit 20, can be used and the load estimation error can be reduced.

It is to be noted that for the load calculating equation 53A corresponding to, for example, the region A, three calculating equations for estimating the axially acting load Fy, the vertically acting load Fz and the load Fx which will become the driving force or the braking force are utilized and the parameters used in those calculating equations are different from each other. This is true of even the calculating equation 53B corresponding to the region B. Also, given the same calculating equation for the axially acting load Fy, that the parameters are different among the calculating equations for the different regions has been described hereinbefore.

The operation of the sixth application hereinabove described is basically similar to that of the previously described the first embodiment of the present invention and, accordingly, the details thereof are not reiterated, but in this sixth application, particularly in the first load estimating section 30C, since the sensor output signal of the sensor unit 20 is substituted into the predetermined load calculating equation to estimate the axially acting load Fy; out of the plural load calculating equations 53A and 53B having the parameters different from each other and provided in correspondence with the predetermined plural regions, which have been defined by classifying the load value, estimated by the first load estimating section 30C, in level, the load calculating equation for the region to which the above described load value corresponds is selected; and the sensor output signal of the above described plural sensor units 20 is substituted into this load calculating equation to thereby estimate each of the load Fx, Fy and Fz acting on the vehicle wheel, the load estimation error can be reduced simply and the load acting on the vehicle wheel can be accurately estimated. With respect to the axially acting load Fy, the direction thereof is also determined.

Also, since in this application the sensor unit 20 is employed in four in number and those sensor units 20 are disposed at the upper, lower, right and left surface portions of the outer diametric surface of the outer member 1, which correspond respectively to the top, bottom, right and left positions relative to the tire tread, and equidistantly spaced 90° in phase difference from each other, the vertically acting load Fz acting on the wheel support bearing assembly, the load Fx which will become the driving force or the braking force, and the axially acting load Fy can be estimated.

Also, since in this application the temperature sensor 28 is provided in each of the sensor units 20 and, in the first load estimating section 30C, by the temperature corrector 63, on the basis of the output signal of the temperature sensor 28 referred to above, the temperature dependent drift of the output signal of the strain sensor 22 is corrected, the temperature dependent drift of the output signal of the strain sensor 22 can be corrected.

FIGS. 37 to 40 illustrates the seventh application. The sensor equipped wheel support bearing assembly according to this seventh application is similar to that shown in and described with reference to FIGS. 34 to 36 in connection with the sixth application, but differs therefrom in that in the place of the sensor output signal of the sensor unit 20 which has been used in estimation of the axially acting load Fy by means of the first load estimating section 30C, an output signal of a different load detecting sensor 67 provided in the outer member 1 is used. Even the load detecting sensor 67 in this case, as is the case with the sensor unit 20, the strain generating member 68 is constructed with a strain sensor 22 for detecting the strain of the strain generating member 68 fitted thereto.

Figure 37:
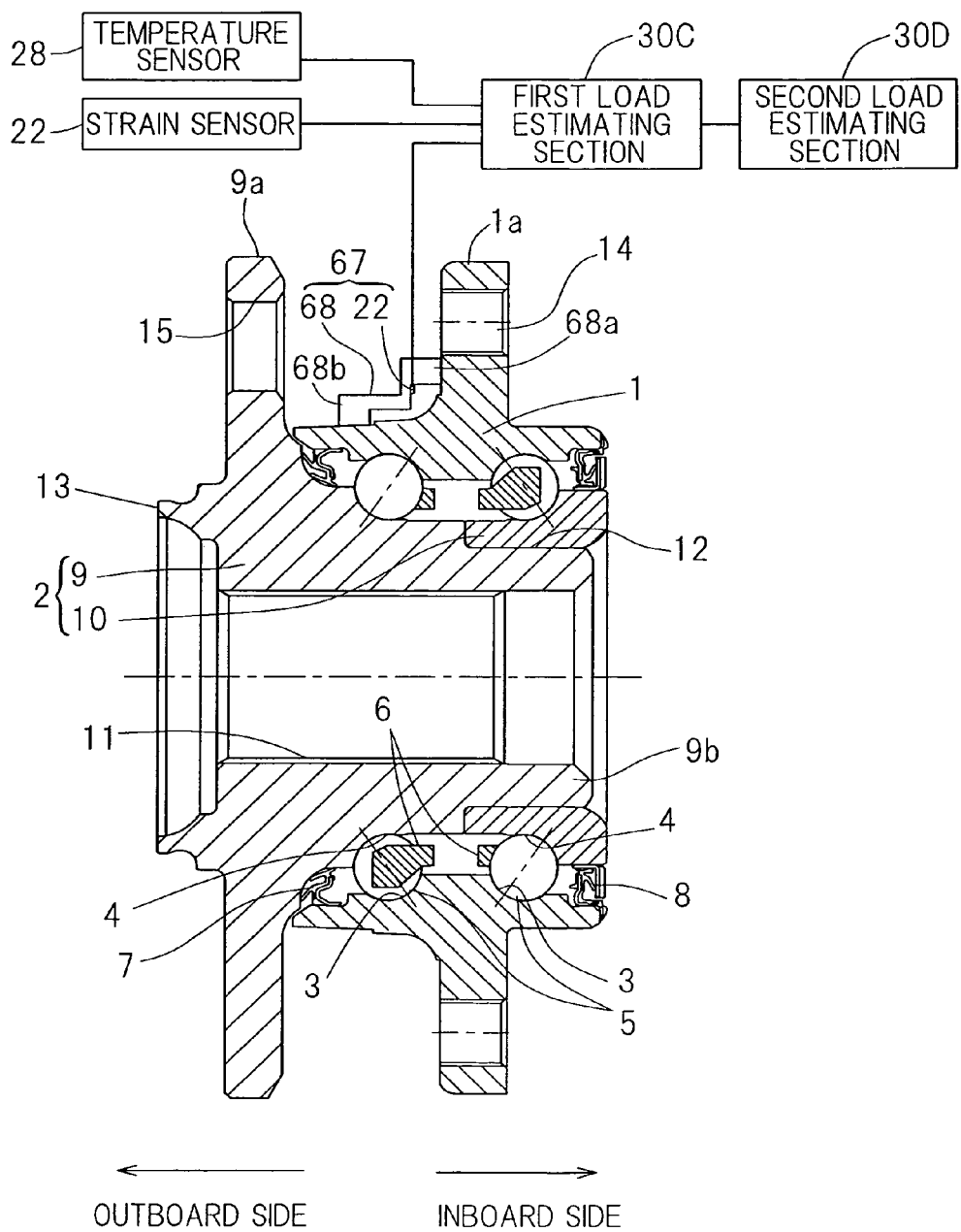
FIG. 37 is a diagram showing a sectional view of the sensor equipped wheel support bearing assembly according to a seventh application of the present invention, shown together with a block diagram of a conceptual construction of the detecting system therefor.
Figure 39A:
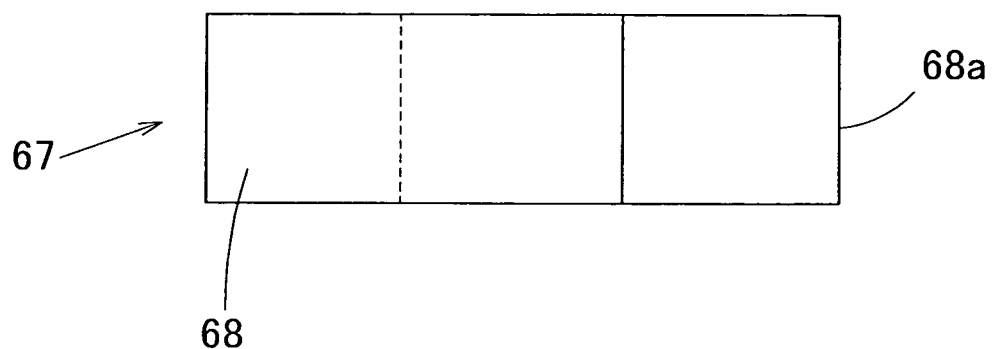
FIG. 39A is a top plan view of a load detecting sensor employed in the sensor equipped wheel support bearing assembly in FIG. 37.
Figure 39B:
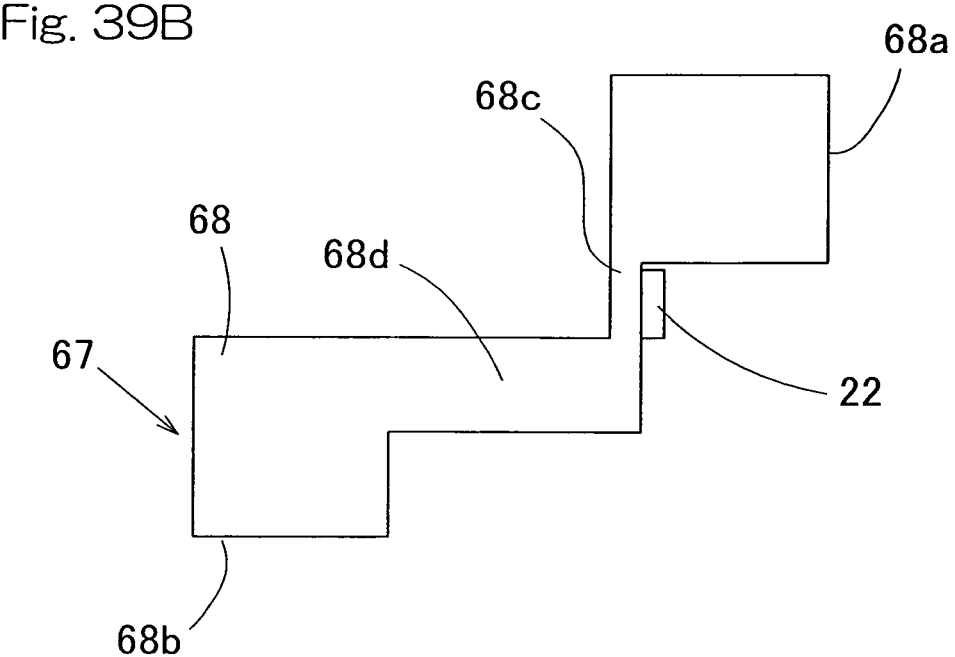
FIG. 39B is a side view of the load detecting sensor shown in FIG. 39A.
Figure 40:
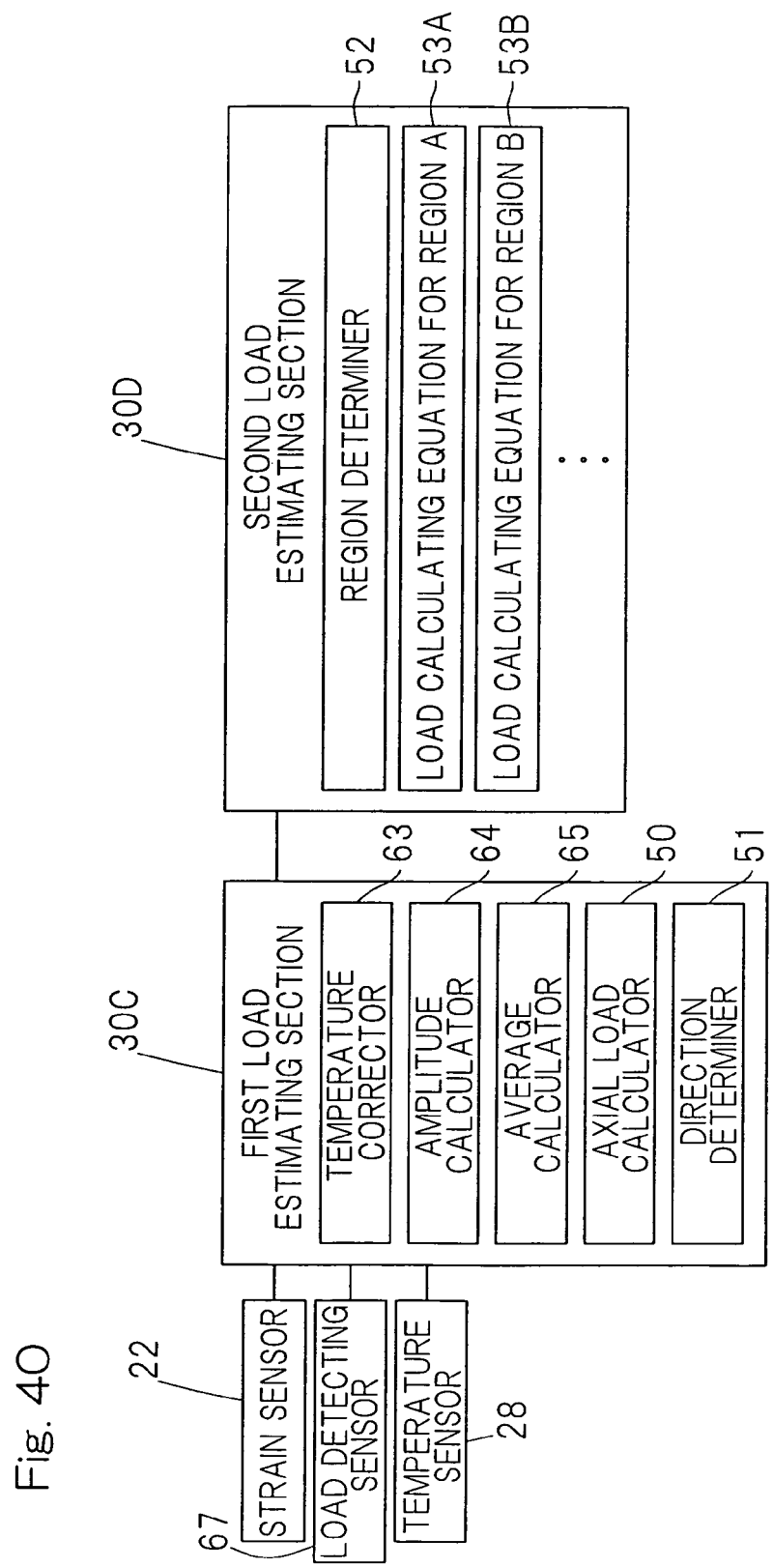
FIG. 40 is a block diagram showing an example of construction of the load estimating section employed in the sensor equipped wheel support bearing assembly in FIG. 37.

The strain generating member 68 is, as best shown in FIG. 37, provided so as to straddle between an outer periphery of the outer member 1 and an outboard oriented flange surface of the vehicle body fitting flange 1*a*. More specifically, as best shown in FIG. 39B, the strain generating member 68 includes a first contact fixing segment 68*a* fixed to a portion proximate to the threaded hole 14 in the vehicle body fitting flange 1*a* in contact therewith and a second contact fixing segment 68*b* fixed to the outer peripheral surface of the outer member 1. Also, the strain generating member 68 is of an L-shaped configuration including a radial portion 68*c*, including the first contact fixing segment 68*a* so as to extend in a radial direction, and an axial portion 68*d* including the second contact fixing segment 68*b* so as to extend in an axial direction.

The radial portion 68c has a wall thickness smaller than that of the axial portion 68d so that the former may have a rigidly lower than that of the latter. The strain sensor 22 is fitted to the radial portion 68c having a lower rigidity.

Figure 38:
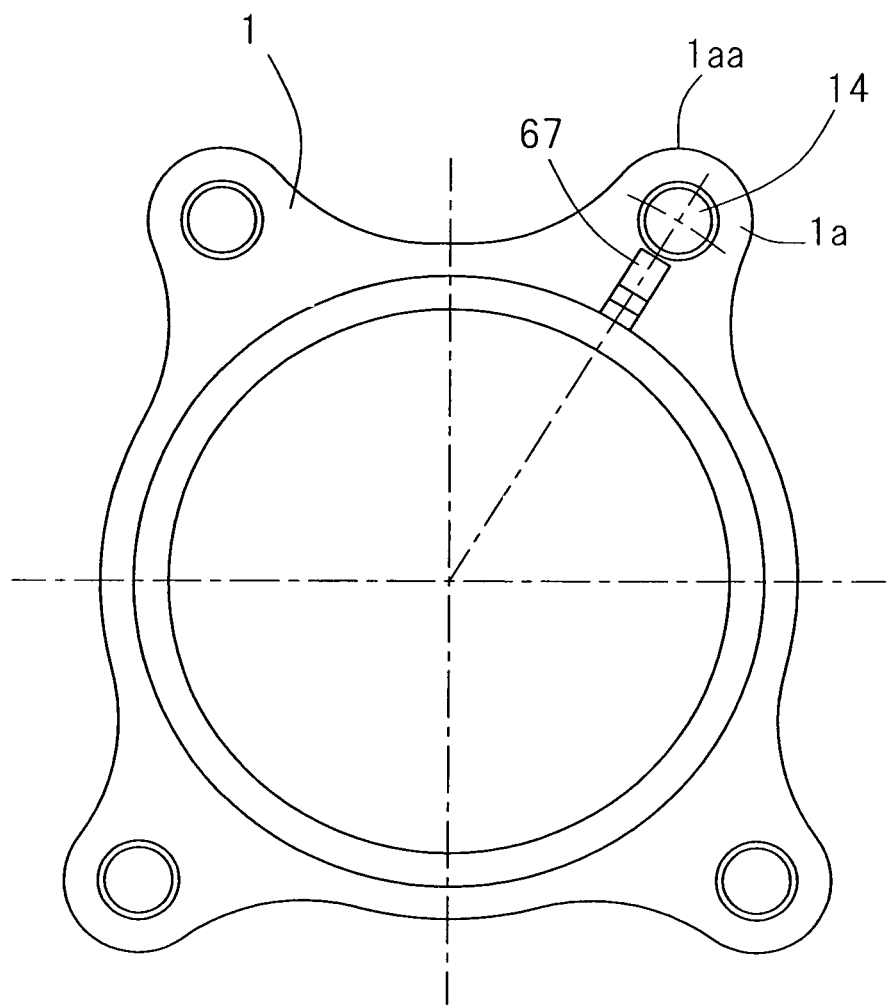
FIG. 38 is a front elevational view showing the outer member in the sensor equipped wheel support bearing assembly in FIG. 37 as viewed from the outboard side.

Also, as best shown in FIGS. 37 and 38, the load detecting sensor 67 is fixed to an outer peripheral portion of the outer member 1 with the first and second contact fixing segments 68a and 68b of the strain generating member 68 held at respective position of the same phase in the circumferential direction of the outer member 1. This strain sensor 22 is fixed to the strain generating member 68 by means of bonding. The strain generating member 68 is of a shape, and made by, a material which will not result in plastic deformation when it is fixed to the outer member 1. Also, that even when the maximum expected load is applied, the strain generating member 68 is so shaped that it will not result in elastic deformation is the same as that of the strain generating member 68 in the sensor unit 20. Other structural features are similar to those of the sixth application shown in and described with particular reference to FIGS. 35 to 37. It is to be noted that in FIGS. 37 and 38, the sensor unit 20 is shown as omitted.

The site of installation of the load detecting sensor 67 is the site where the amount of deformation is large relative to the axially acting load Fy and the sensor output signal thereof is the one in which the axially acting load Fy has been properly evaluated. Accordingly, in the axially acting load calculator 50 in the first load estimating section 30C shown in FIG. 40, the axially acting load Fy can be calculated from the sensor output signal of the load detecting sensor 67. Also, it can be used in determining the direction of the axially acting load Fy in the direction determiner 51 in the first load estimating section 30C. Also, by the temperature corrector 63 in the first load estimating section 30C, based on the output signal of the temperature sensor 28, the temperature dependent drift of the output signal of the strain sensor 22 is corrected.

Also, as is the case with the second embodiment of the present invention shown in and described with particular reference to FIGS. 9 to 14, using the sensor unit 20A made up of the plate-like strain generating member 21 and the two strain sensors 22A and 22B, this sensor unit 20A may be combined with the first load estimating section 30C and the second load estimating section 30D. In such case, as is the case with the sixth application shown in and described with reference to FIGS. 34 to 36, in the amplitude value calculator 64 in the first load estimating section 30C, the difference of the respective output signals of the two strain sensors 22A and 22B (shown in FIG. 12) is calculated and this is extracted as an amplitude value. Also, in the average value calculator 65, the sum of the respective output signals of the two strain sensors 22A and 22B of each of the sensor units 20A is calculated and this is extracted as an average value. In the direction determiner 51, the direction of the axially acting load Fy is determined from the differential value of the respective amplitude values of the sensor output signals of the upper and lower sensor units 20A that are determined by the amplitude value calculator 64.

The above described sixth and seventh applications include an applied mode group III (Modes 23 to 30) which do not require the use of the load estimation processing section 30 that is essential in the embodiments of the present invention.

[Mode 23]

The sensor equipped wheel support bearing assembly according to the mode 23 is a wheel support bearing assembly for rotatably supporting a vehicle wheel relative to a vehicle body, which includes an outer member having an inner periphery formed with a plurality of rows of rolling surfaces 3, an inner member having an outer periphery formed with rolling surfaces 4 opposed to the previously described rolling surfaces, and a plurality of rows of rolling elements 5 interposed between the rolling surfaces 3 in the outer member 1 and the rolling surfaces 4 in the inner member 2, in which a plurality of sensor units 20 are provided in an outer diametric surface of one of the outer member 1 and the inner member 2 which serves as a stationary member; the sensor unit 20 includes a strain generating member 68, having two or more contact fixing segments 68a fixed to the outer diametric surface of the stationary member in contact therewith, and one or more strain sensors 22 fitted to the strain generating member 68 for detecting a strain induced in the strain generating member 68; and a first load estimating section 30C for estimating the axially acting load, acting on the vehicle wheel in the axial direction, from a sensor output signal of the sensor unit 20 or from a sensor output signal of a load detecting sensor 67, which is another sensor, provided in the stationary member and a second load estimating section 30D for estimating a load, acting on the vehicle wheel, with the use of a predetermined parameter for a load calculation from the sensor output signals of the plural sensor units 20 are provided. The second load estimating section 30D is such that the parameters referred to above is set in a plural number in correspondence with a plurality of regions in which the load value estimated by the first load estimating section 30 is classified in level, and the load estimation referred to above is carried out by selecting the parameter according to the magnitude of the axially acting load estimated by the first load estimating section 30C.

The plural regions includes, for example, a first linear region, in which the load value estimated by the first load estimating section 30C is regarded as linear, and a non-linear region in which the load value is larger than that in the linear region and can be regarded as non-linear.

According to the above described construction, the first load estimating section 30C estimates the axially acting load from the output signal of the sensor unit 20 or the separately provided load detecting sensor 67. The second load estimating section 30D switches over the parameter to be used in the calculation by the load value estimated by the first load estimating section 30C and then estimates the load from the sensor output signal of each of the plural sensor units 20.

[Mode 24]

For this reason, the previously described plural regions, for example, are classified into a linear region, in which the load value estimated by the first load estimating section 30C is regarded as linear, and a non-linear region in which the load value estimated by the first load estimating section 30C is regarded as a non-linear, and by setting the parameter corresponding to each of the regions, the load estimation error can be reduced by correcting the non-linearity, contained in a strain response of the bearing unit, with a simplified calculation.

[Mode 25]

In the mode 23 described above, where the first load estimating section 30C estimate the axially acting load from the sensor output signal of each of the plural sensor units, the second load estimating section 30D may be so designed that where the load value estimated by the first load estimating section 30C is within a predetermined region of the plural regions, the load value estimated by the first load estimating section 30C can be outputted as a load value estimated by the second load estimating section 30D. The predetermined region referred to above is a region in which the load value estimated by, for example, the first load estimating section 30C can be regarded as linear.

In the case of the construction described above, the second load estimating section 30D is no longer required to perform tautologically the calculation which has been performed by the first load estimating section 30C and, hence, the calculation is simplified.

[Mode 26]

In the above described mode 23, the sensor unit 20 may be provided in three or more in number, in which case the second load estimating section 30D estimates the radially acting load, acting on the radial direction of the vehicle wheel, and the axially acting load, acting in the axial direction of the vehicle wheel, from the sensor output signals of the three or more sensor units 20. When a proper arrangement the sensor unit 20 is employed in three or more in number, both of the radially acting load and the axially acting load can be estimated.

[Mode 27]

In the above descried mode 23, the four sensor units 20 may be disposed at upper, lower, right and left surface portions of the outer diametric surface of the stationary member, respectively, which correspond to the top, bottom, right and left position relative to the tire tread, that are spaced 90° in phase difference from each other in the circumferential direction of the outer member.

Disposition of the four sensor units 20 in the manner described above is effective to estimate the vertically acting load Fz acting on the wheel support bearing assembly, the load Fx which will become the driving force or the braking force, and the axially acting load Fy.

[Mode 28]

In the above described mode 23, the first load estimating section 30C may be of a type calculating the differential value of the respective amplitude values of the sensor output signals of the two sensor units 20, which are disposed one above the other in opposition to each other and includes a direction determiner 51 for determining the direction of the axially acting load Fy from the differential value. Depending on whether the sensor unit 20 is disposed at an upper side or a lower side, a difference occurs in their outputs and, therefore, the direction of the axially acting load Fy can be determined from the differential value.

[Mode 29]

In the mode 23 described above, the load detecting sensor unit 67 separate from the sensor unit 20 may be of a type including a strain generating member 68, provided so as to straddle between a flange surface of the stationary member and a peripheral surface, and one or more strain sensors 22 fitted to the strain generating member 68 for detecting a strain induced in the strain generating member 68.

[Mode 30]

In the mode described above, the second load estimating section 30D may be of a type capable of estimating the load, acting on the vehicle wheel, with the use of an average value or the amplitude value of a plurality of cycles of the rolling elements 5 in the sensor output signal of each of the sensor units 20, or both of the average value and the amplitude values.

[Mode 31]

In the mode 30 described above, the sensor unit 20A may be of a type including three or more contact fixing segments and at least two or more strain sensors 22, in which the distance of the contact fixing segments 68a is so set that the phase difference of those sensor output signals may be equal to a multiplication of [n+½], n being an integer, of the pitch of arrangement of the rolling elements 5 and the second load estimating section 30D makes the use of the output signals of the two sensors 22 as an average value.

In the case of this construction, the output signals of the two sensors have a phase difference of about 180° and the average value thereof represents a value from which a component of change brought about by passage of the rolling elements is cancelled. Also, the amplitude value will be an accurate value from which the influence brought about by temperature and/or the surface slippage between the knuckle and the flange has been removed.

Further, the eighth and ninth applications, which do not require the use of the load estimation processing section 30 employed in the practice of the present invention, will now be described. Where the load acting on the vehicle wheel is to be measured with the use of the strain sensor in the manner as taught by the previously described patent documents 1 and 2, a drift of the sensor caused by an ambient temperature and an initial drift brought about by a strain induced incident to the fitting of the sensor unit pose a problem.

The drift brought about by the strain induced incident to the fitting of the sensor unit can be removed by performing an offset adjustment in a manner with the strain sensor installed and converting a displacement from that position into a signal output.

Figure 51:
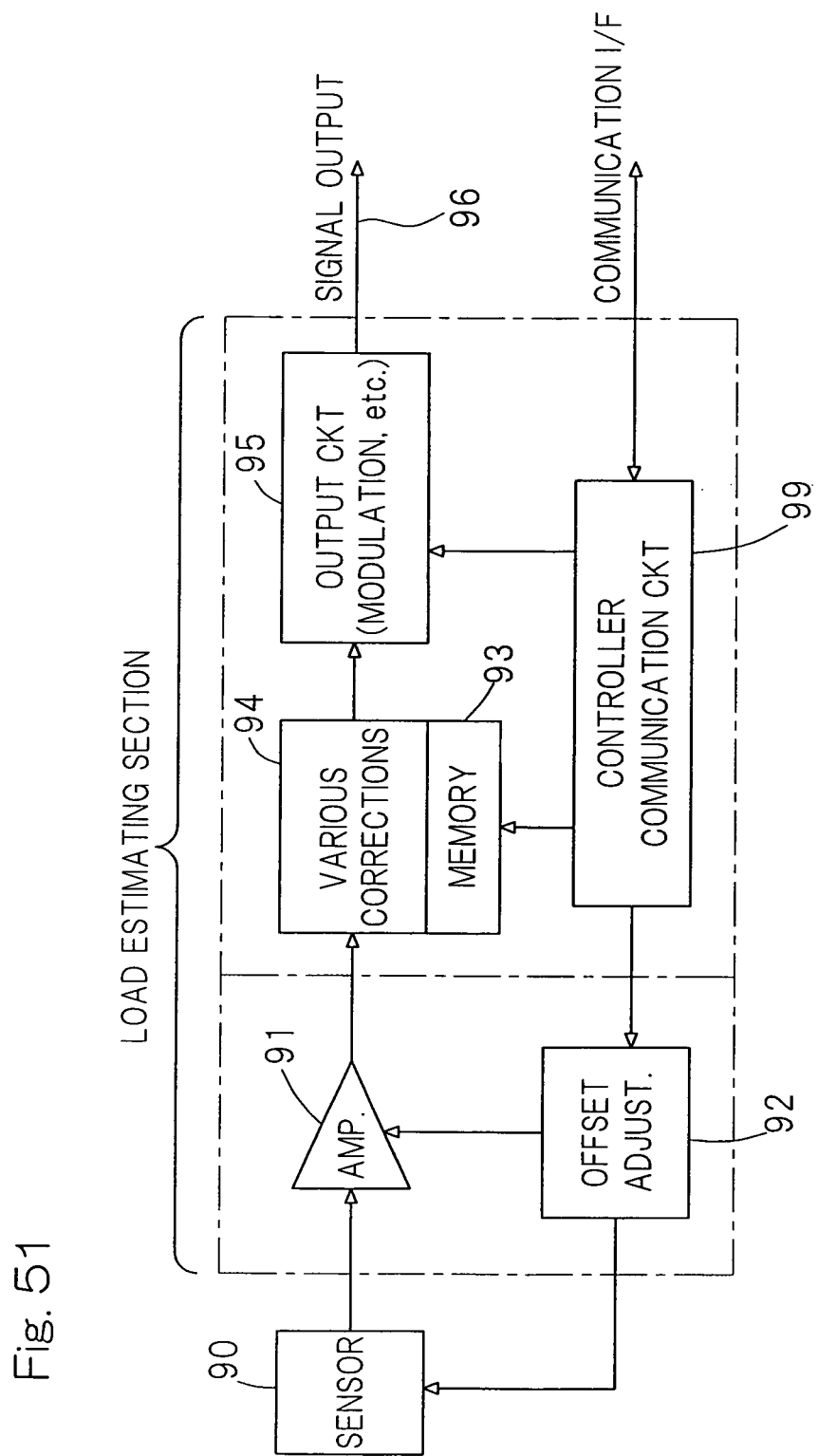
FIG. 51 is a block diagram showing one example of construction of the detecting system employed in the suggested example.

As the load estimating section designed to have an offset function of the sensor output signal described above, the structure shown in a block diagram in FIG. 51, for example, can be contemplated. The sensor unit 90 in this example, is comprised of a strain generating member, fitted to the outer member which is the stationary member of the wheel support bearing assembly, and a strain sensor fixed to this strain generating member.

The load estimating section 30E shown in FIG. 51 includes an amplifier 91, an offset adjusting circuit 92, a storage section 93, various correcting circuits 94, a signal output circuit 96 and a controller communication (control) circuit 99. The controller communication circuit 99 (shown in FIG. 53) performs a control of, for example, the offset adjusting circuit 92, the storage section 93, the correcting circuits 94 and the signal output circuit 96 and, also, digitalize the sensor output signal, to which a preparatory process such as, for example, the offset adjustment has been applied, by an AD converter 55 (also shown in FIG. 53) having a resolving power of about 12 to 16 bits and then calculate and estimate the load, acting on the wheel support bearing assembly, by means of its load calculating function. The offset adjusting circuit 92 is of a type capable of adjusting the initial offset of the sensor unit 90 and/or the offset resulting from the fixture onto the wheel support bearing assembly to a normal value and can be adjusted by the controller circuit 99 or adjusted in response to a command from the outside.

Figure 52:
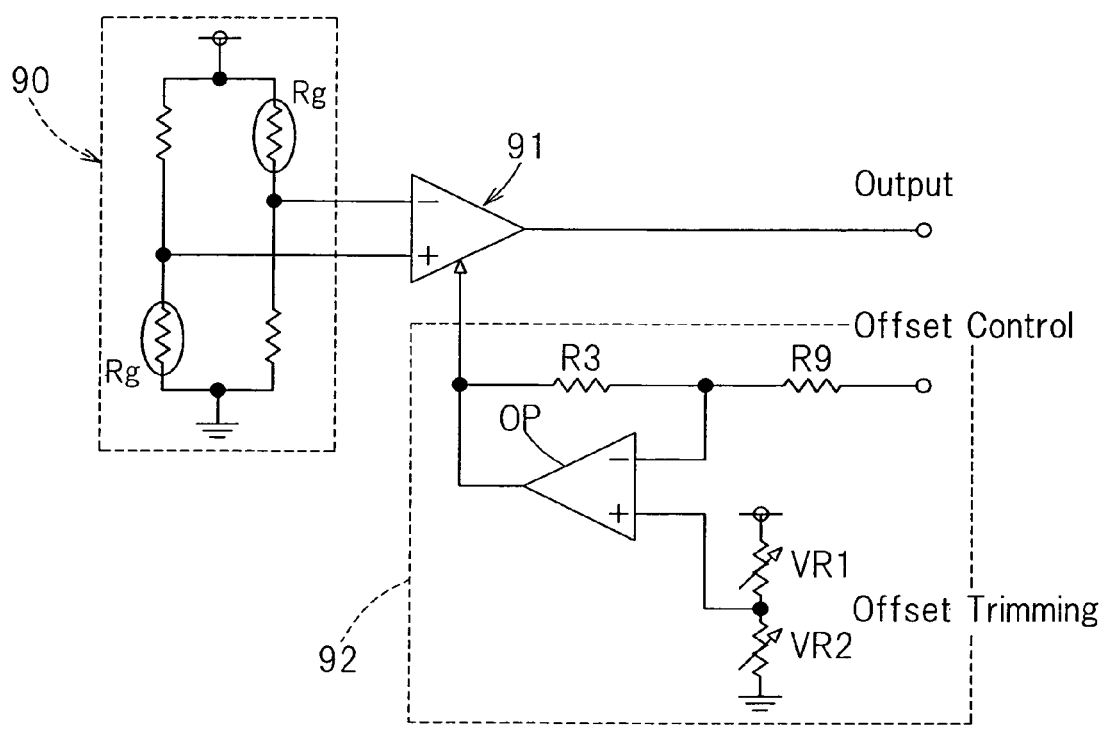
FIG. 52 is a diagram showing a specific circuit construction of an offset adjusting circuit and an amplifying circuit in the detecting system in FIG. 51.

FIG. 52 illustrates am example of specific connecting construction of the sensor unit 90, the amplifier and the offset adjusting circuit 92. The offset adjusting circuit 92 is constructed as an adder comprised of an operational amplifier OP, resistors R3 and R4, variable resistors VR1 and VR2 and others. In this case, so that the sensor output can attain a stipulated value (zero point voltage) immediately upon completion of assemblage of the sensor equipped wheel support bearing assembly, respective resistances of the variable resistors VR1 and VR2 are adjusted and are then fixed.

However, in order to cover the degree of the strain occurring incident to the fitting of the sensor unit 90 and variation in characteristic of a sensor element Rg (shown in FIG. 52) itself even though the load estimating section shown in FIG. 51 is so constructed as hereinabove described, the circuit must have a large width of adjustment of the offset and, hence, its adjusting process is required, accompanied by an increase of the manufacturing cost.

Also, in the event of occurrence of a large offset variation, during the operation for a prolonged period of time, the amplifier 91 in the subsequent stage will be saturated depending on the size thereof, and detection of the load will become difficult to achieve.

Figure 53:
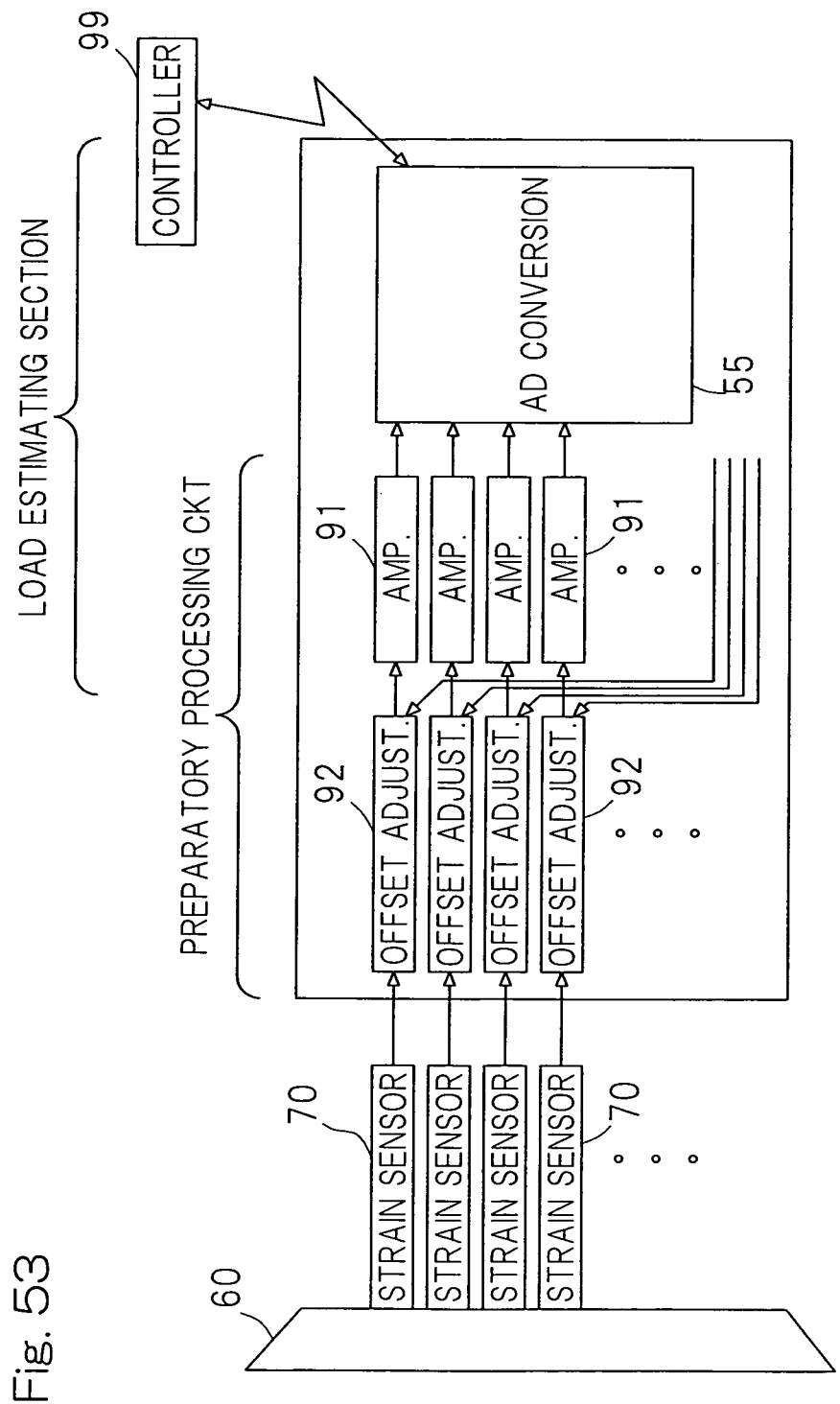
FIG. 53 is a block diagram showing the construction of the detecting system when the number of sensors used increases in the suggested example.

Also, in the event that the number of strain sensors 70 to be mounted on an outer member 60 of the bearing unit increases as shown in FIG. 53, a preparatory circuit including the amplifier 91 and the offset adjusting circuit 92 increases with the number of the elements and, therefore, the size of a circuit substrate will become large, making it difficult to mount on the bearing unit outer ring 60. For this reason, the preparatory circuit must be disposed at a location distant from the bearing unit and a technique is required to pull around the sensor output signal, but in such case, the number of cables tends to increase and a thick wiring is installed from pull-around components to a body side, resulting in reduction in workability and reliability. Also, since the weal sensor output signal is fed through a long wiring, there is a problem that influences brought about noises tend to become considerable.

Objects of the eighth and ninth applications of the present invention are to provide a sensor equipped wheel support bearing assembly capable of accurately detecting the load acting on the bearing unit for the vehicle wheel with a compact structure.

Referring now to FIGS. 41 to 44, the eighth application will be described in detail. It is to be noted that FIG. 2 showing a front elevational view of the outer member 1, employed in the wheel support bearing assembly according to the previously described first embodiment of the present invention, as viewed from the outboard side, is equally applied to the eighth application. As shown in FIG. 2, the sensor unit 20 is employed in four in number and those four sensor units 20 are disposed at the upper, lower, right and left surface portions of the outer diametric surface of the outer member 1, which corresponds to the top, bottom, right and left position relative to the tire tread, in a fashion spaced 90° in phase difference equidistantly in the circumferential direction of the outer member 1.

Figure 41:
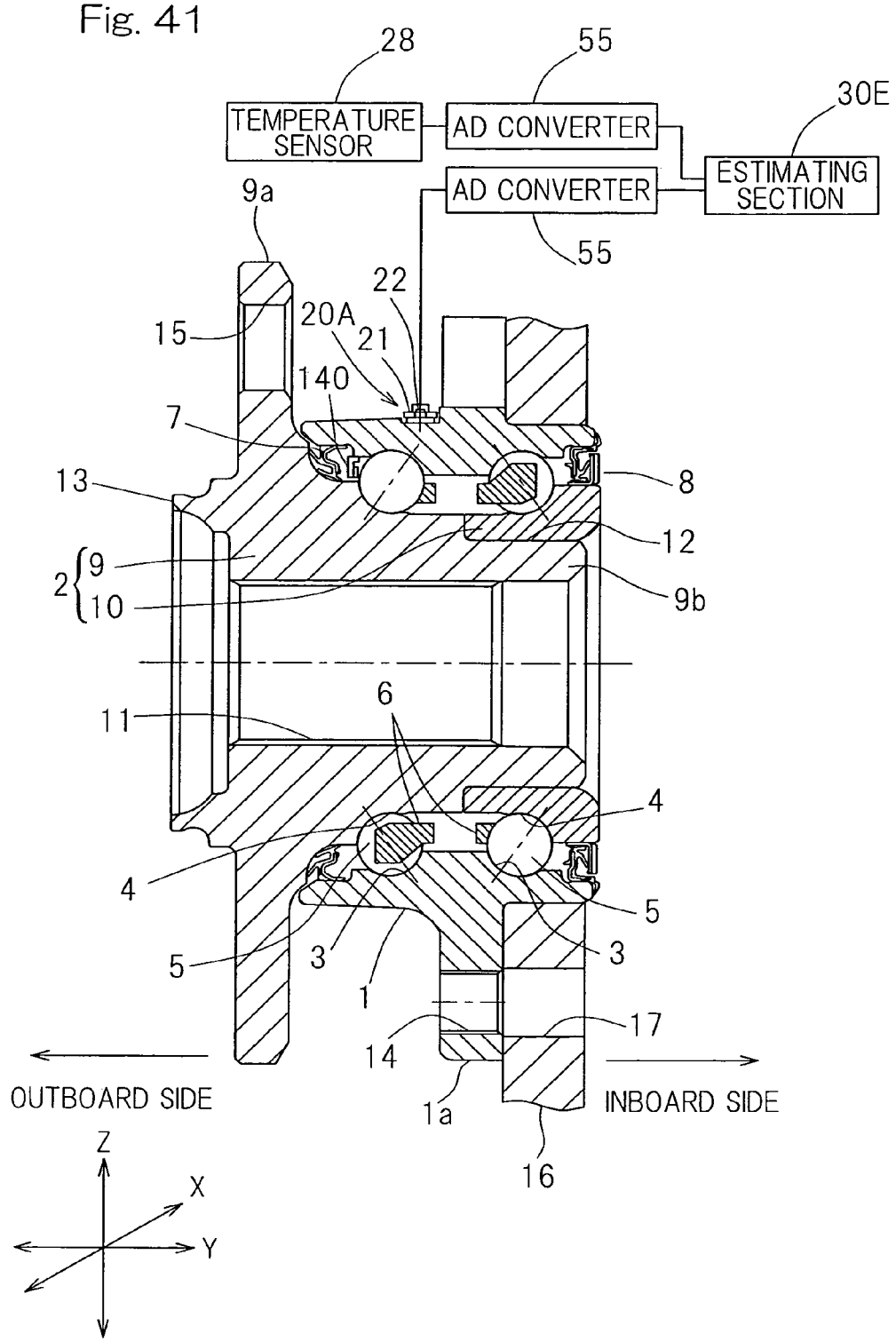
FIG. 41 is a diagram showing a sectional view of the sensor equipped wheel support bearing assembly according to an eighth application of the present invention, shown together with a block diagram of a conceptual construction of the detecting system therefor.
Figure 43:
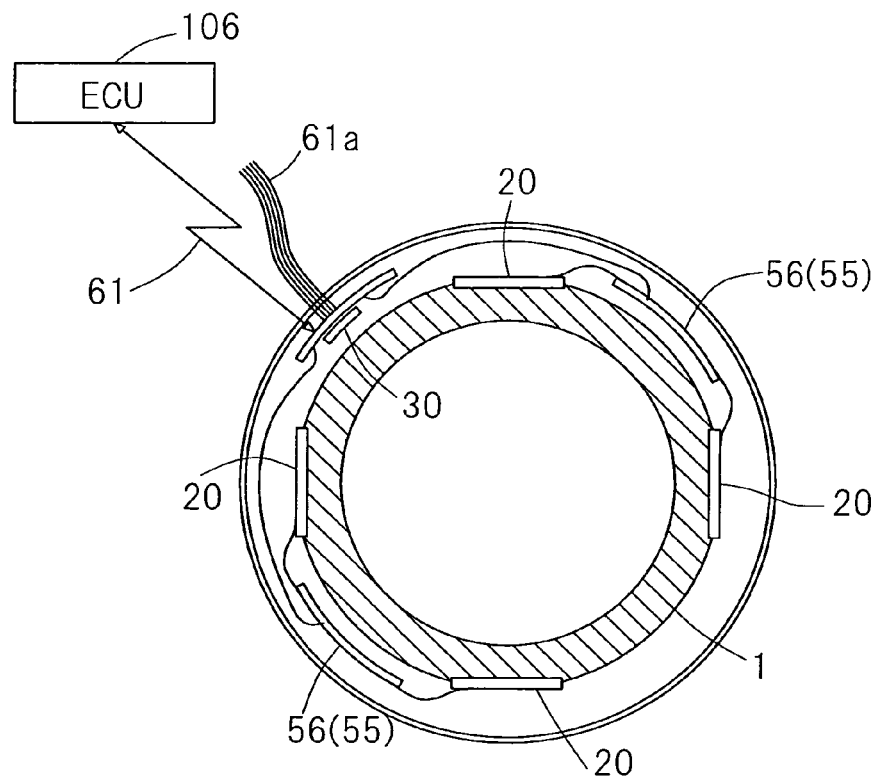
FIG. 43 is a sectional view showing one example of installation of an AD converter in the sensor equipped wheel support bearing assembly in FIG. 41.
Figure 44:
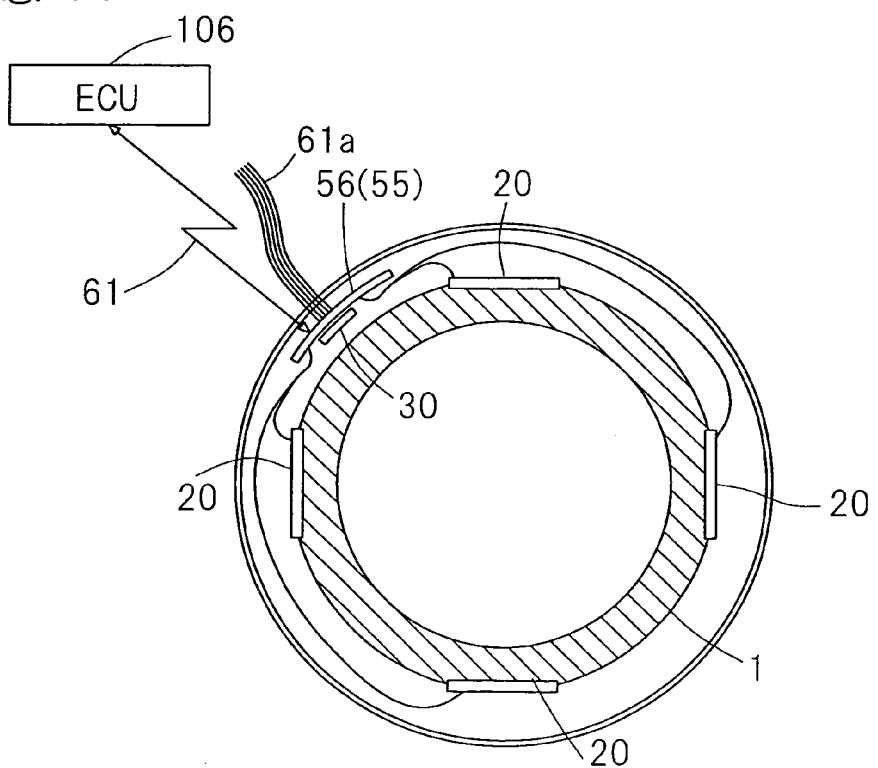
FIG. 44 is a sectional view showing another example of installation of the AD converter in the sensor equipped wheel support bearing assembly in FIG. 41.
Figure 45:
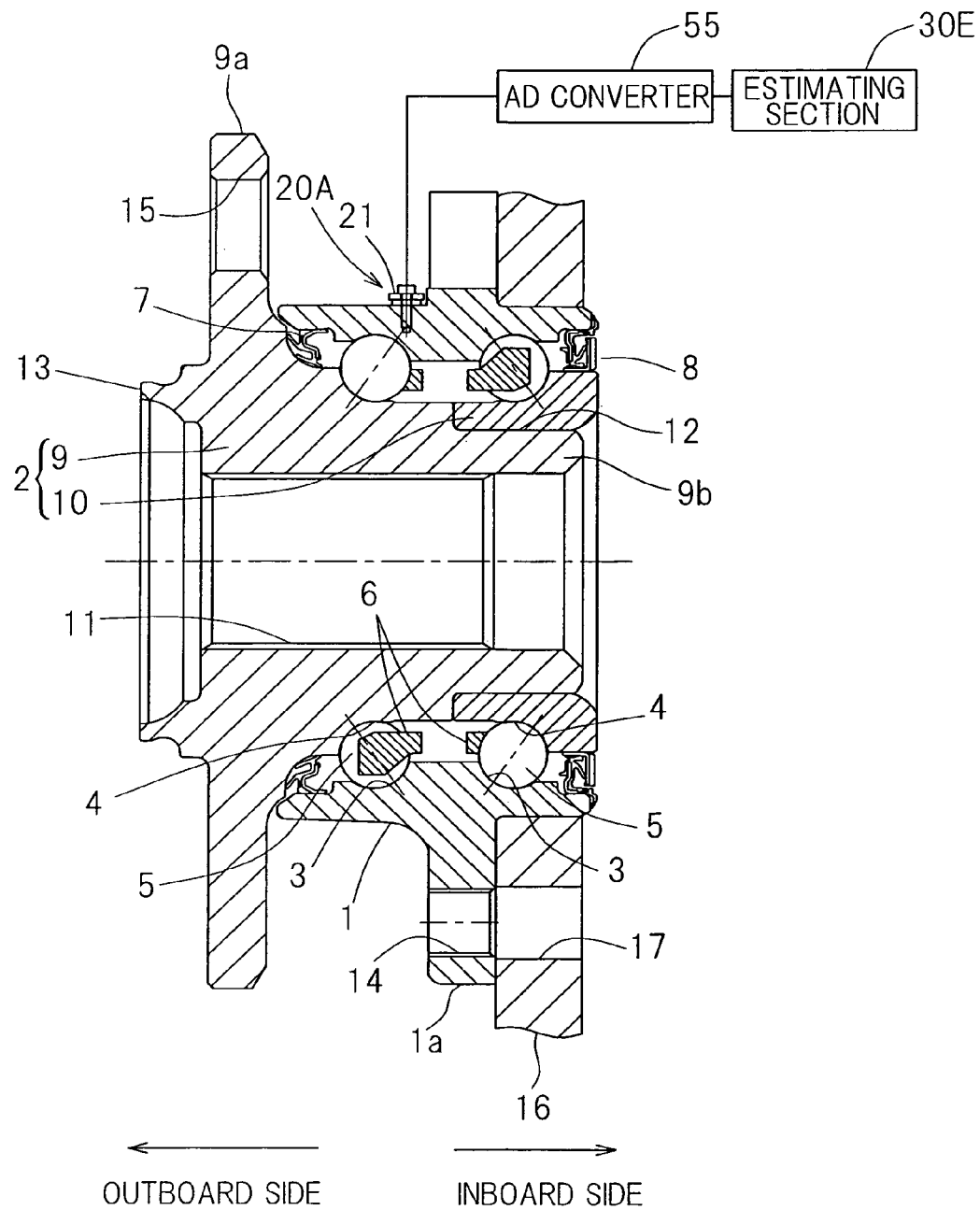
FIG. 45 is a diagram showing a sectional view of the sensor equipped wheel support bearing assembly according to a ninth application of the present invention, shown together with a block diagram of a conceptual construction of the detecting system therefor.
Figure 46:
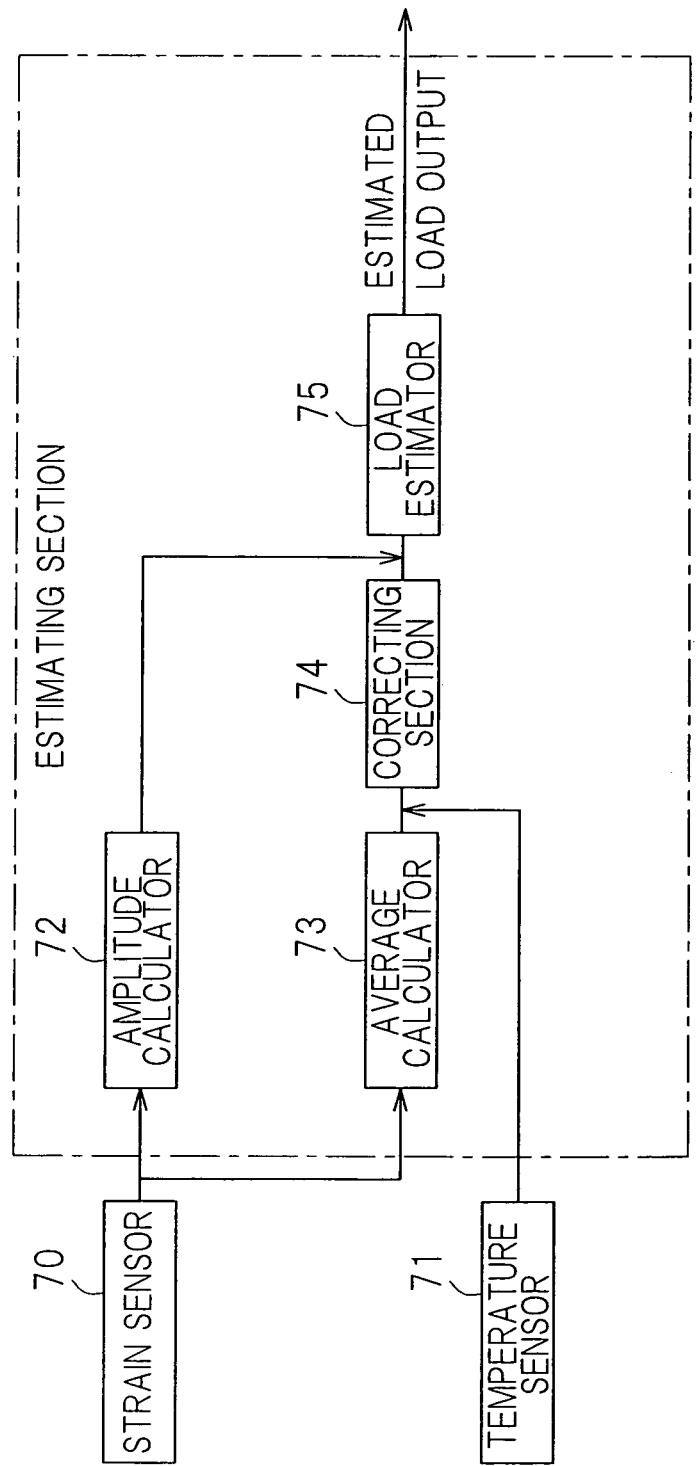
FIG. 46 is a block diagram showing an example of construction of the load estimating section employed in the suggested example.
Figure 47:
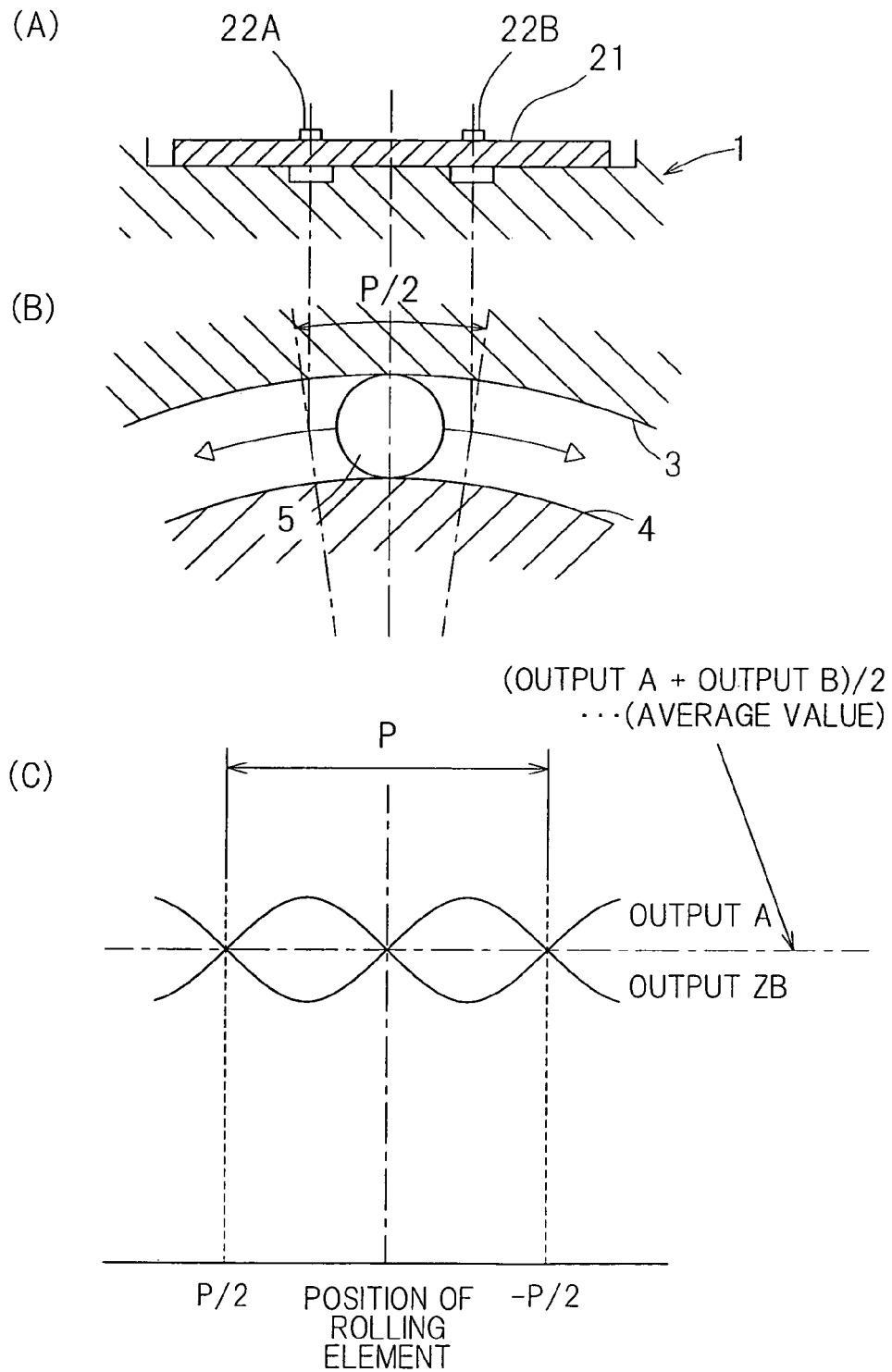
FIG. 47 is an explanatory diagram showing how the position of the rolling elements affects the output signal of the sensor unit.

As best shown in FIG. 41, the strain sensor 22 in each of the sensor units 20 is connected with the estimating section 30E through the AD converter 55. In other words, an output signal of the strain sensor 22 is converted directly by the AD converter 55 and the output signal of the strain sensor 22 having been AD converted inputted to the estimating section 30E. The AD converter 55 is disposed on the sensor unit 20, for example, on the strain generating member 21, and is also in the vicinity of the sensor unit 20 as shown in FIG. 43. For the AD converter 55 in this case, the converter of a type having a resolving power of at least 20 or high bits is employed. Also, the AD converter 55 is a small size element of a type having multi-channel inputs and forms a converting unit 56 capable of converting into digital data after having collect respective sensor output signals from the plural sensor units 20 together on a single substrate as shown in FIG. 44 and this is preferably installed on the wheel support bearing assembly. The converting unit 56 is disposed on a member on the side of the stationary member, which is one of the outer member 1 and the inner member 2 of the wheel support bearing assembly, for example, the outer member in the application now under discussion. In the example of construction shown in FIG. 43, the sensor output signals of the two sensor units 20 at the top and right positions, respectively, are digitalized by a single converting unit 56 and the respective sensor output signals of the two sensor units 20 at the bottom and left positions, respectively, are digitalized by another single converting unit 56. Also, in the example of construction shown in FIG. 44, the respective sensor output signals of the four sensor units 20 at the top, bottom, left and right positions are digitalized by a single converting unit 56. In the example of construction shown in FIG. 44, the converting unit 56 is disposed on, for example, the same wiring substrate at a location proximate to the estimating section 30E. The system of the AD converter 55 is preferably delta sigma type converter as the type has a highly precise, relatively high speed feature.

The estimating section 30E is a section capable of estimating from the AD converted output signal of the strain sensor 22 in the sensor unit 20, a force (the vertically acting load Fz, the load Fx which will become the driving force or the braking force, and the axially acting load Fy) acting on the wheel support bearing assembly or between the vehicle wheel and the road surface (tire tread), and is comprised of, for example, a microcomputer. The estimating section 30E comprised of this microcomputer may be either a type having various electronic components mounted on a single substrate, or one chip, and is disposed on the outer member 1 of the wheel support bearing assembly as best shown in FIGS. 43 and 44 or on the strain generating member 21 of the sensor unit 20.

The estimating section 30E includes, for example, an offset adjusting circuit 101, a temperature correcting circuit 102, a filter processing circuit 103 such as, for example, a low pass filter, a load estimation calculating circuit 104, a controller circuit 105. The offset adjusting circuit 101 is of a type capable of adjusting the initial offset of the strain sensor 22 or the offset resulting from the fixture onto the wheel support bearing assembly to a proper value and can be adjusted by the controller circuit 105 or adjusted in response to a command from the outside to perform the offset control. As hereinabove described, the cause of the offset lies in the variation of the strain sensor 22 and/or the strain resulting during the fixture of the sensor and, therefore, it is desirable to perform the offset adjustment at the stage of completion of the assemblage following the fitting of the sensor unit 210 in the wheel support bearing assembly.

As hereinabove described, if subsequent to the completion of assemblage of the sensor equipped wheel support bearing assembly, the offset is adjusted by the offset adjusting circuit 101 so that the output signal of the strain sensor 22 may attain the stipulated value, it is possible to set the sensor output to zero at the time the sensor equipped wheel support bearing assembly is completed, and, therefore, the quality of the sensor output signal can be secured.

Also, the output signal of the strain sensor 22 contains a drift amount resulting from temperature characteristics of the strain sensor 22 itself or a temperature induced strain occurring in the outer member 1 which is the stationary member. The temperature correcting circuit 101 referred to above is a circuit for correcting the drift resulting from the temperature of the output signal of the strain sensor 22 of which offset has been adjusted. In order to correct the drift resulting from the temperature, the use is made of the temperature sensor 28 in at least one sensor unit 20 as shown in FIG. 3 forming a part of the drawings used to show and describe the first embodiment of the present invention and the output signal of this temperature sensor 28 is, after having been digitalized by the AD converter 55, inputted to the temperature correcting circuit 101.

In the load estimation calculating circuit 104, the load estimating calculation is carried out based on the digitalized output signal of the strain sensor 22, which has been subjected to an offset adjusting process, a temperature correcting process and a filtering process by means of the offset adjusting circuit 101, the temperature correcting circuit 102 and the filter processing circuit 103, respectively. This load estimation calculating circuit 104 includes a relation setting section (not shown), in which relations between the output signal of the strain sensor 22 and any one of the vertically acting load Fz, the load Fx which will become the driving force or the braking force, and the axially acting load Fy are set forth in a table or the like, and, with the use of the relation setting section, a working force (the vertically acting load Fz, the load Fx which will become the driving force or the braking force, and the axially acting load Fy) is estimated from the output signal of the strain sensor 22. The preset contents of the relation setting section referred to above are determined and set by means of a series of experiments and/or simulations carried out beforehand.

As shown in the example of construction shown in FIGS. 43 and 44, the load data obtained by the load estimation calculating circuit 104 of the estimating section 30E are outputted up to a host electric control unit (ECU) 106 mounted on the vehicle body side through an intra-vehicle communication bus (for example, CAN bus) 61 or the like. This communication bus may be designed to be a wireless route in which a transmitter-receiver on each of the bearing unit side and the vehicle body side is installed to enable the load data or the like to be outputted. In this case, if the sensor is activated by wiring and connecting cables required for the supply of an electric power source and the data so obtained are transmitted wireless, the number of the required cables can be reduced and the mounting onto the vehicle body can be facilitated. Referring to FIGS. 43 and 44, a cable 61a connected with the estimating section 30E is a wiring forming the intra-vehicle communication bus 61 referred to above. The electric control unit 106 is a section for controlling, for example, the automotive vehicle as a whole and is comprised of a microcomputer or the like. If required, design may be made to output in the form of an analog voltage.

Regarding the influence brought about by the position of the rolling elements 5 on the output signal of the sensor unit as hereinbefore described in connection with the second embodiment of the present invention with particular reference to FIG. 14, in the load estimation calculating circuit 104 (shown in FIG. 42) employed in this eighth application, the average value (direct current component) of the amplitude of the output signal of the strain sensor 22 is calculated as data determinative of the load. For this calculation, in the practice of the eighth application, the use is made of a rolling element detecting sensor 140 on the inner periphery of the outer member 1, as best shown in FIG. 41, for detecting the position of the rolling elements 5, and a detection signal of the rolling element detecting sensor 140 is inputted to the load estimation calculating circuit 104 best shown in FIG. 42. Accordingly, the influence brought about by the passage of the rolling elements can be removed from the load value calculated by the load estimation calculating circuit 104 shown in FIG. 42.

While the operation of the eighth application is basically similar to that according to the previously described first embodiment of the present invention and, therefore, the details thereof are not reiterated, in the case of this eighth application, particularly before the output signal of the strain sensor 22 is inputted to the estimating section 30E for estimating the load, it is converted by the AD converter 55 directly into digital data and, accordingly, there is no need to employ the offset adjusting circuit and the amplifying circuit relative to the analog signal such as employed in the suggested example and, hence, the space for installation of circuits can be reduced, resulting in compactization. Also, digitalization of sensor date in the manner described above allows all of the preparatory processes, including the offset adjustment and the temperature correction, to be performed in the estimating section 30E. As a result, the adjusting process relying on an auto-calibration can be considerably simplified and a long term drift can be accommodated. Also, no problems associated with the saturation of the amplifying circuit occur.

Since as hereinabove described, the signal processing circuit can be compactized, the wiring for the feeble analog signal, which is the output signal of the strain sensor 22, can be shortened and, as a result, it will become less sensitive to the influence brought about by noises, resulting an increase of the final load detecting accuracy.

Figure 42:
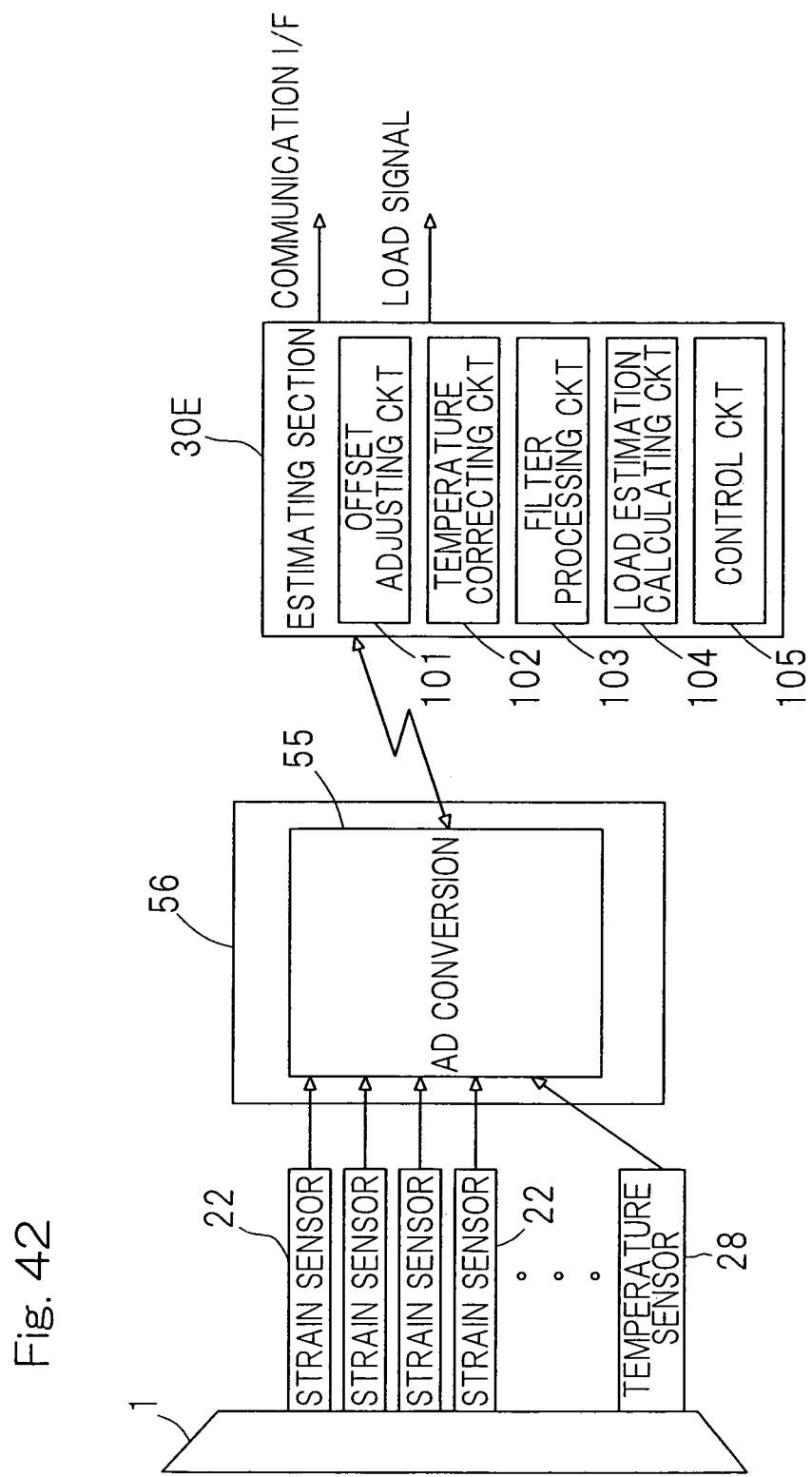
FIG. 42 is a block diagram showing the entire construction of the detecting system employed in the sensor equipped wheel support bearing assembly in FIG. 41.

Also, since in this eighth application, the temperature sensor 28 is provided in at least one sensor unit 20 such that in the temperature correcting circuit 102 best shown in FIG. 42 in the estimating section 30E, the drift of the output signal of the strain sensor 21 can be corrected based on the output signal of the temperature sensor 28, the temperature dependent drift of the output signal of the strain sensor 21 can be corrected.

Now with reference to FIG. 45 and FIGS. 10 to FIG. 14, which are used in showing and describing the second embodiments of the present invention and are referred to as common drawings, the ninth application of the present invention will be described. This sensor equipped wheel support bearing assembly according to the ninth application differs from that according to the eighth application shown in and described with reference to FIGS. 41 to 44, in that for each of the sensor units 20A, a sensor unit of the structure shown in and described with particular reference to FIGS. 10 to FIG. 14 is employed, noting that other structural features than those described above are similar to those in eighth application, the details thereof are not reiterated.

In the case of this ninth application, in the load estimation calculating circuit 104 in the estimating section 30E employed in the eighth application shown in and described with reference to FIGS. 41 to 44, the sum or difference of the respective output signals of the two strain sensors 22A and 22B in each of the sensor unit 20A is calculated and the resultant sum and difference are extracted as an average value and an amplitude value, respectively.

Even in this case, effects similar to those described in connection with the previously described second embodiment of the present invention with particular reference to FIG. 14 can be obtained and the load acting on the wheel support bearing assembly or the tire tread can be accurately estimated by the utilization of the resultant average value and amplitude value.

Each of the eighth and ninth applications described hereinbefore includes applied mode group IV (Modes 32 to 42) which do not require the use of the load estimation processing section 30 which is necessitated in the embodiments of the present invention.

[Mode 32]

The sensor equipped wheel support bearing assembly according to the mode 32 is a wheel support bearing assembly for rotatably supporting a vehicle wheel relative to a vehicle body, which includes an outer member 1 having its inner periphery formed with a plurality of rows of raceway surfaces 3, an inner member having an outer periphery formed with raceway surfaces 4 in face-to-face relation with the rolling surfaces 3, and a plurality of rows of rolling elements 5 interposed between the raceway surfaces 3 in the outer member 1 and the raceway surface 4 in the inner member, in which a sensor unit 20 for the detection of a load is provided in one or more on the diametric surface of one of the outer member 1 and the inner member 2, which serves as a stationary member, and the sensor unit 20 includes a strain generating member 21 having two or more contact fixing segments 21a fixed to the stationary member in contact therewith and one or more strain sensors 22 fitted to the strain generating member 21 for detecting a strain induced in the strain generating member, and in which an AD converter 55 having a resolving power of at least 20 bits or higher and operable to AD convert output signals of the sensors 22 directly and the use is made of an estimating section 30E for estimating a load, acting on a vehicle wheel, from the AD converted output signals of the sensors. It is to be noted that the wording "(to) AD convert directly" referred to above means that the output signals of the sensors 22 are inputted to the AD converter 55 without passing through the signal processing section and then AD converted.

When a load acts between the tire of the vehicle wheel and the road surface, the load is also applied to the stationary member (for example, the outer member) of the wheel support bearing assembly, accompanied by deformation. Since in this mode the two or more contact fixing segments 21a of the strain generating member 21 of the sensor unit 20 are fixed to the outer member 1 in contact therewith, the strain occurring in the outer member 1 is apt to be transmitted to the strain generating member 21 after having been amplified, and such strain is detected by the sensors 22 with a high sensitivity, resulting in a reduction of the hysteresis appearing in the output signal thereof.

In particular, since the output signal of the sensors 22 are directly AD converted by the AD converter 55 having the resolving power of at least 20 bits or higher, based on the AD converted output signals of the sensors 22, and the load acting on the vehicle wheel is estimated by the estimating section 30E, the load detecting system can be constructed compact and the load acting on the bearing unit of the vehicle wheel can be detected accurately.

[Mode 33]

In the mode 32 described above, the AD converter 55 referred above may be a single AD converter of a multi-channel input signal capable of AD converting the respective output signals of the plural sensors 22. In the case of this construction, since the AD conversion of the sensor output signals from the plural sensor units 20 can be accomplished solely by the single AD converter 55, the space for installation can be reduced and the detecting system in its entirety can be disposed in the wheel support bearing assembly.

[Mode 34]

The AD converter 55 referred to above may be provided in at least one in number to the sensor unit 20. Even in the case of this construction, the space for installation of the AD converter 55 can be reduced.

[Mode 35]

In the mode 32 described above, at least one of a converting unit including a plurality of the AD converters 55 may be provided in the wheel support bearing assembly separate from the sensor unit 20. Even in the case of this construction, the space for installation of the AD converters can be reduced.

[Mode 36]

In the Mode 32 described above, the AD converter 55 is preferably in the form of an AD converter of a delta sigma conversion type.

[Mode 37]

In the above described mode 32, the sensor unit 20 may be of a type including two contact fixing segments 21a and one sensor 22.

[Mode 38]

In the above described mode 32, the sensor unit 20 includes three or more contact fixing segments 21a and two sensors 22, in which the distance between two of the contact fixing segments 21a is so set that the phase difference of sensor outputs thereof may be equal to a multiplication of [n+½], n being an integer, of the pitch of arrangement of the rolling elements 5 and the second load estimating section 30E makes the sum of the output signals of the two sensors to cancel a component of change to thereby determine an average value. In the case of this construction, the output signals of the two sensors 22 in the sensor unit 20 have a phase difference of about 180° relative to each other and the average value thereof represents a value from which the change component resulting from the passage of the rolling elements has been cancelled.

[Mode 39]

In the mode 31 described above, the use may be made of the three or more sensor units 20, in which case the estimating section 30E estimates a radially acting load and an axially acting load, acting in a radial direction and an axial direction of the wheel support bearing assembly, respectively, from sensor output signals of the three or more sensor units 20.

[Mode 40]

In the above described mode 32, the sensor unit 20 may be disposed at upper, lower, right and left surface portions of the outer diametric surface of the stationary member, which correspond to the top, bottom, right and left positions relative to a tire tread, in a fashion equidistantly spaced 90° in phase difference in a circumferential direction.

With the four sensor units 20 arranged in the manner described above, the vertically acting load Fz acting on the wheel support bearing assembly, the load Fx which will become the driving force or the braking force, and the axially acting load Fy can be estimated.

[Mode 41]

In the above described mode 32, the use may be made of at least one temperature sensor in the sensor unit 20, in which case the estimating section 30E corrects a temperature dependent drift of the sensor output signal based on an output signal of the temperature sensor 28. In the case of this construction, the temperature dependent drift of the output signal of the strain sensor 22 can be corrected.

[Mode 42]

In the mode 32 described above, the estimating section 30E may be connected with an intra-vehicle communication bus on the side of a vehicle body, in which case a load signal estimated by the estimating section 30E is outputted to the vehicle body side through communication.

It is to be noted that in describing any one of the previously described embodiments of the present invention and, also, any one of the applications descried hereinbefore, the outer member 1 has been shown and described as the stationary member, but the present invention is not necessarily limited thereto and is applicable to the wheel support bearing assembly in which the inner member 2 serves as the stationary member. In such case, the sensor unit 20 is provided on a peripheral surface which forms the inner periphery of the inner member 2.

Also, although in describing any one of the previously described embodiments of the present invention and, also, any one of the applications descried hereinbefore, reference has been made to the wheel support bearing assembly of the third generation type, the present invention can be equally applied to the wheel support bearing assembly of the first or second generation type, in which a bearing portion and a hub form respective component parts independent from each other, or to the wheel support bearing assembly of the fourth generation type in which a portion of the inner member is constituted by an outer ring of a constant velocity universal joint. Yet, this sensor equipped wheel support bearing assembly can be applied to a wheel support bearing assembly for the support of a driven vehicle wheel and, also, to a wheel support bearing assembly employing tapered roller of any generation type.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

| | |
|---|---|
| 1 | Outer member |
| 2 | Inner member |
| 3, 4 | Rolling surface |
| 5 | Rolling element |
| 20, 20A, 20B | Sensor unit |
| 21 | Strain generating member |
| 21a | Contact fixing segment |
| 22, 22A, 22B, 22C | Strain sensor |
| 28 | Temperature sensor |
| 29 | Vehicle mounted sensor |
| 30 | Load estimation processing section |
| 30A | Load estimating section |
| 30B | Load estimating section |
| 30C | First load estimating section |
| 30D | Second load estimating section |
| 30E | Estimating section |
| 31 | Principal load estimating section |
| 32 | Average value calculating section |
| 33 | Correcting section |
| 34 | Combined use calculating section |
| 35 | Amplitude value calculating section |
| 36 | Amplitude processed load estimating section |
| 37 | Drift amount estimating section |
| 37a | Load condition limiting section |
| 38 | External monitor |
| 39 | Input device |
| 40, 40A | Average value calculator |
| 41, 41A | Amplitude value calculator |
| 42, 43 | Temperature correcting section |
| 44 | Selecting and outputting section |
| 45 | Differential value calculator |
| 47 | Load calculator |
| 48 | Temperature correcting section |
| 49 | Calculating equation selecting section |
| 50 | Axially acting load calculator |
| 51 | Direction determiner |
| 52 | Region determiner |
| 53A, 53B | Load calculating equation |
| 54 | Load detecting sensor |
| 55 | AD converter |
| 56 | Converting unit |

What is claimed is:

1. A sensor equipped wheel support bearing assembly for rotatably supporting a vehicle wheel relative to a vehicle body structure, the wheel support bearing assembly comprising:
   an outer member having an inner periphery formed with a plurality of rolling surfaces;
   an inner member having an outer periphery formed with rolling surfaces held in face-to-face relation with the respective rolling surfaces;
   a plurality of rows of rolling elements interposed between the opposed rolling surfaces;
   a sensor unit for detecting a load acting on one of the outer member and the inner member that serves as a stationary member, the sensor unit including
   a strain generating member having two or more contact fixing segments adapted to be fixed to the stationary member, and
   one or more sensors fitted to the strain generating member for detecting a strain induced in the strain generating member; and
   a load estimation processing section for estimating a load acting on the vehicle wheel, from an output signal of the sensor of the sensor unit, the load estimation processing section including
   a principal load estimating section for estimating the load acting on the vehicle wheel, the principal load estimating section having an average value calculating section for calculating an average value of the output signal of the sensor of the sensor unit and a correcting section for correcting the average value, which has been calculated by the average value calculating section,
   an amplitude processed load estimating section for calculating an amplitude processed load estimated value, which corresponds to the load acting on the vehicle wheel, from an amplitude value of a signal waveform of the output signal of the sensor, which is caused by passage of the rolling elements, and
   a drift amount estimating section for estimating a drift amount of the output signal of the sensor appearing in the output of the estimated load, the drift amount being estimated by comparing the output of the estimated load, which is estimated by the principal load estimating section, with the amplitude processed load estimated value, wherein
   the correcting section of the principal load estimating section is operable to correct the output of the estimated load with the drift amount estimated by the drift amount estimating section.

2. The sensor equipped wheel support bearing assembly as claimed in claim 1, wherein the principal load estimating section includes a combined use estimating section for calculating the output of the estimated load with the use of both of the average value, which has been corrected by the correcting section, of the output signal of the sensor, and the amplitude value of the output signal of the sensor.

3. The sensor equipped wheel support bearing assembly as claimed in claim 1, wherein three or more of the sensor units are provided, and the load estimation processing section estimates, out of the load acting on the vehicle wheel, a forward and rearward oriented load, a vertically oriented load and an axially oriented load, from output signals of the sensors in the three or more sensor units.

4. The sensor equipped wheel support bearing assembly as claimed in claim 1, wherein a plurality of the sensor units are provided, the sensor units being disposed at each of upper, lower, right and left surface portions of the outer diametric surface of the stationary member, which correspond respectively to top, bottom, right and left positions relative to a tire tread.

5. The sensor equipped wheel support bearing assembly as claimed in claim 1, wherein at least one of the sensor units is provided with a temperature sensor, and the principal load estimating section includes a temperature correcting section for correcting the average value, which has been calculated by the average value calculating section and is to be inputted to the correcting section, with a temperature detected by the temperature sensor.

6. The sensor equipped wheel support bearing assembly as claimed in claim 1, wherein the sensor unit includes three or more contact fixing segments and two sensors for detecting the strain induced in the strain generating member, one of the sensors being fitted between the neighboring first and second contact fixing segments and the other of the sensors being fitted between the neighboring second and third contact fixing segments, and the distance between the neighboring contact fixing segments or the distance between the neighboring sensors in a circumferential direction of the stationary member is chosen to be ½+n times a pitch of arrangement of the rolling elements, where n is an integer, and the average value calculating section of the principal load estimating section utilizes the sum of respective output signals of the two sensors as an average value.

7. The sensor equipped wheel support bearing assembly as claimed in claim 1, wherein the drift amount estimating section determines a relation between the amplitude processed load estimated value outputted by the amplitude processed load estimating section, and the output of the estimated load outputted by the principal load estimating section, by applying a least square estimation and then estimates the drift amount of the output of the estimated load from the determined relation.

8. The sensor equipped wheel support bearing assembly as claimed in claim 7, further comprising a load condition limiting section for determining from an output signal of one or more sensors provided in a vehicle body as to whether or not a condition of the load acting on the bearing unit during travel of the automotive vehicle satisfies a preset load condition, and extracting in accordance with a preset extracting condition, an amplitude processed load estimated value that is utilized by the drift amount estimating section in an estimating process of a drift amount, out from amplitude processed load estimated values outputted by the amplitude processed load estimating section in the event that the condition of the load acting on the bearing unit fails to satisfy the preset load condition.

9. The sensor equipped wheel support bearing assembly as claimed in claim 1, wherein the load estimation processing section is connected with an intra-vehicle communication bus so that the drift amount estimated by the drift amount estimating section and the output of the estimated load from the principal load estimating section can be outputted through the intra-vehicle communication bus to an external monitor.

10. The sensor equipped wheel support bearing assembly as claimed in claim 9, wherein the load estimation processing section is connected with a vehicle mounted input device through the intra-vehicle communication bus, so that the load estimation processing section can respond to an input from the input device to enable parameters to be set, the parameters being used in calculation of the estimation of the load acting on the vehicle wheel, including the estimation of the drift amount by the drift amount estimating section.

\* \* \* \* \*